United States Patent [19]

Arnold et al.

[11] Patent Number: 4,558,176
[45] Date of Patent: Dec. 10, 1985

[54] COMPUTER SYSTEMS TO INHIBIT UNAUTHORIZED COPYING, UNAUTHORIZED USAGE, AND AUTOMATED CRACKING OF PROTECTED SOFTWARE

[76] Inventors: Mark G. Arnold, 1400 Grand Ave., Laramie, Wyo. 82070; Mark D. Winkel, 1518 Gloria, Loveland, Colo. 80537

[21] Appl. No.: 420,562

[22] Filed: Sep. 20, 1982

[51] Int. Cl.[4] .............................................. H04K 9/00
[52] U.S. Cl. .............................. 178/22.08; 178/22.09; 364/900
[58] Field of Search ........................ 178/22.08, 22.09; 364/200, 300, 900; 340/825.34

[56] References Cited

U.S. PATENT DOCUMENTS

| | | | |
|---|---|---|---|
| 3,958,081 | 6/1976 | Ehrsam et al. | 364/200 |
| 3,996,449 | 12/1976 | Attanasio et al. | 340/825.34 |
| 4,087,856 | 5/1978 | Attanasio | 364/200 |
| 4,120,030 | 10/1978 | Johnstone | 364/900 X |
| 4,168,396 | 9/1979 | Best | 364/900 X |
| 4,183,085 | 1/1980 | Roberts et al. | 364/200 |
| 4,193,131 | 3/1980 | Lennon et al. | 178/22.09 X |
| 4,200,770 | 4/1980 | Hellman et al. | 178/22.11 |
| 4,238,854 | 12/1980 | Ehrsam et al. | 364/200 X |
| 4,246,638 | 1/1981 | Thomas | 364/200 |
| 4,278,837 | 7/1981 | Best | 364/900 X |
| 4,306,289 | 12/1981 | Lumley | 364/200 |
| 4,319,079 | 3/1982 | Best | 178/22.09 X |
| 4,446,519 | 5/1984 | Thomas | 364/300 |
| 4,454,594 | 6/1984 | Heffron et al. | 364/900 |
| 4,458,315 | 7/1984 | Uchenick | 364/200 |
| 4,471,163 | 9/1984 | Donald et al. | 364/200 |

OTHER PUBLICATIONS

Diffie et al., "Privacy & Authentication: An Introduction to Cryptography", IEEE Trans. Inform. Theory, Mar. 1979, pp. 397-427.
Kunheim, Alan, Cryptograph: A Primer, 1981, pp. 6-8, 285, 286, 294, 334, 335.

Primary Examiner—Salvatore Cangialosi
Assistant Examiner—Brian Steinberger

[57] ABSTRACT

A method and apparatus are provided for inhibiting unauthorized copying, unauthorized usage and automated cracking of proprietary software used in computer systems. The computer systems execute protected programs, which are protected by encapsulation and/or encryption. To provide security against unauthorized copying of software, means are provided that detect and inhibit automated cracking of protected programs. These means will destroy or make inaccessible information in the CPU during conditions when automated cracking could occur. These means will also store interrupt contexts in secret to prevent implementation of automated cracking. Additional features may be provided to allow operation as a general purpose computer system, where protected programs are distributed using public key cryptography and a means is provided to convert from this distribution form to the protected execution form.

12 Claims, 13 Drawing Figures

COMPUTER SYSTEMS TO INHIBIT UNAUTHORIZED COPYING, UNAUTHORIZED USAGE, AND AUTOMATED CRACKING OF PROTECTED SOFTWARE

FIELD OF THE INVENTION

This invention relates to digital computers and more particularly, to computer systems incorporating cryptographic and/or architectural features to inhibit unauthorized copying, unauthorized usage, and automated cracking of proprietary software.

BACKGROUND AND SUMMARY OF THE INVENTION

The burgeoning growth of the computer industry has brought with it a concomitant increase in unauthorized copying and usage of commercially successful proprietary software. This theft of software, known as software piracy, is of growing concern to industry. Vendors of software for general purpose computers lose millions of dollars of revenue annually as a result of software piracy. Software piracy also concerns manufacturers of equipment that use a computer as a dedicated controller, such as a video game.

Legal means for preventing software piracy have largely failed because of the problems of enforcement. The only practical way to protect proprietary software is to design computers with special features so that it is much cheaper to buy the proprietary software than to copy or crack it. Methods for preventing software piracy that have relied solely on software methods offer little protection. For example, the common technique of storing the program in an unusual format on a diskette can be circumvented through the use of a copy-all program.

Computer designs for discouraging software piracy that incorporate rudimentary encryption techniques which do not greatly increase the difficulty of copying proprietary software are known in the prior art, typified by the teachings of U.S. Pat. Nos. 4,168,396, 4,246,638, and 4,319,079. The prior art will not protect proprietary programs against software piracy since prior art interrupt and architectural features make the prior art susceptible to automated cracking techniques. These techniques allow a software pirate to crack proprietary software run on prior art computers so the software can be copied at a cost lower than the purchase price of the software. Another disadvantage of the prior art is that encryption must be done by the manufacturer of the computer, who will have a monopoly on this service. A further disadvantage of the prior art is that each protected program must run on a separate computer, which defeats the usefulness of a general purpose computer system.

While cryptographic systems that provide secure communications between computer systems are also known in the prior art as exemplified by U.S. Pat. Nos. 3,958,081, 4,200,770, and 4,238,854, they are limited in that they do not prevent software piracy.

While a third type of computer system that incorporates hardware features to insure operating system security are well known in the prior art as exemplified by U.S. Pat. No. 4,087,856, such systems are also limited in that they do not prevent software piracy.

Accordingly, it is an object of the present invention to inhibit unauthorized copying and usage of proprietary software by incorporating special hardware features in the design of a computer.

Another object of the present invention is to allow the user to protect proprietary software, thereby eliminating the previous need for an intermediary, such as the manufacturer of the computer, to protect the software.

Still another object of the present invention is to allow a user to combine protected proprietary software with unprotected programs, as well as to combine different protected proprietary programs rightfully obtained from others, for use on a general purpose computer system.

Still a further object of the present invention is to insure that protected software will load and execute with reasonable speed.

Still another object of the present invention is to retain compatability with current hardware and software practices.

Still a further object of the present invention is to allow the user to make as many backup copies of a protected program as he wishes for use on his general purpose computer system.

Still another object of the present invention is to allow the user of a general purpose computer system to customize a protected program in a way that does not reduce the security of the protection method.

Still a further object of the present invention is to allow a dedicated computer system to execute a protected program directly from a read only memory.

Still another object of the present invention is to minimize the amount of extra hardware required for protection of software in a dedicated computer system.

Still a further object of the present invention is to insure that the hardware required for protection of proprietary software is inexpensive and easy to fabricate.

These and other objects are accomplished in accordance with the illustrated preferred embodiments of the present invention by protecting proprietary software for use on a general purpose computer system with encryption. The protected programs are executed on a computer system that includes: a device for translating between a distribution encryption form of a protected program to an execution encryption form of the program, a device for executing the execution form of the program and also unprotected programs, and a device to detect and inhibit actions indicative of automated cracking techniques. The distribution encryption form of protected proprietary software utilizes public key cryptography thereby permitting anyone to protect software. The distribution encryption is unique for each general purpose computer system that uses the invention. The translation device is capable of translating many protected proprietary programs into the same execution encryption thereby allowing the user of a general purpose computer system to combine proprietary software rightfully obtained from others. The program execution device is capable of executing protected (encrypted) and unprotected (unencrypted) programs. Special hardware is provided to detect conditions that are likely to occur when the user attempts to implement automated cracking. Upon detection of these conditions, the hardware alters the state of the computer system, thereby invalidating any information the pirate might have gained. The hardware also causes a delay, which slows the automated cracking process so much that it requires several years to complete.

In accordance with another embodiment of the present invention, proprietary programs for use on a dedicated application computer system are protected by encryption and are executed on a computer system including: a device for executing the protected program and a device to detect and inhibit actions indicative of automated cracking techniques. The program execution device may be capable of executing both encrypted and unencrypted programs or the program execution device may be designed so it can only execute encrypted programs. Special hardware is provided to detect conditions that are likely to occur when a pirate attempts to implement automated cracking. Upon detection of these conditions the special hardware permanently alters a write once memory which makes the program execution device inoperative from then on, thereby invalidating any information the pirate might have gained. Alternatively, crucial parts of proprietary programs for use on a dedicated application computer system are protected by physical encapsulation and are executed on a computer system including: a device for executing the protected program, and a device to detect and inhibit actions indicative of automated cracking techniques. The program execution device can fetch instructions from either an internal, physically isolated memory means or the external memory. Special hardware is provided to detect conditions that are likely to occur when a pirate attempts to implement automated cracking of those instructions that reside in the internal physically encapsulated memory means. Upon detection of these conditions the special hardware prevents the execution of further instructions, thereby invalidating any information the pirate might have gained. The dedicated application computer system that protects with encryption and the dedicated application computer system that protects with encapsulation share many common features and therefore may be combined into a dedicated application computer system that allows the designer to select which protection method (encryption or encapsulation) will be used.

GENERAL DESCRIPTION INTRODUCTION TO THE PREFERRED EMBODIMENT

Figure 1:
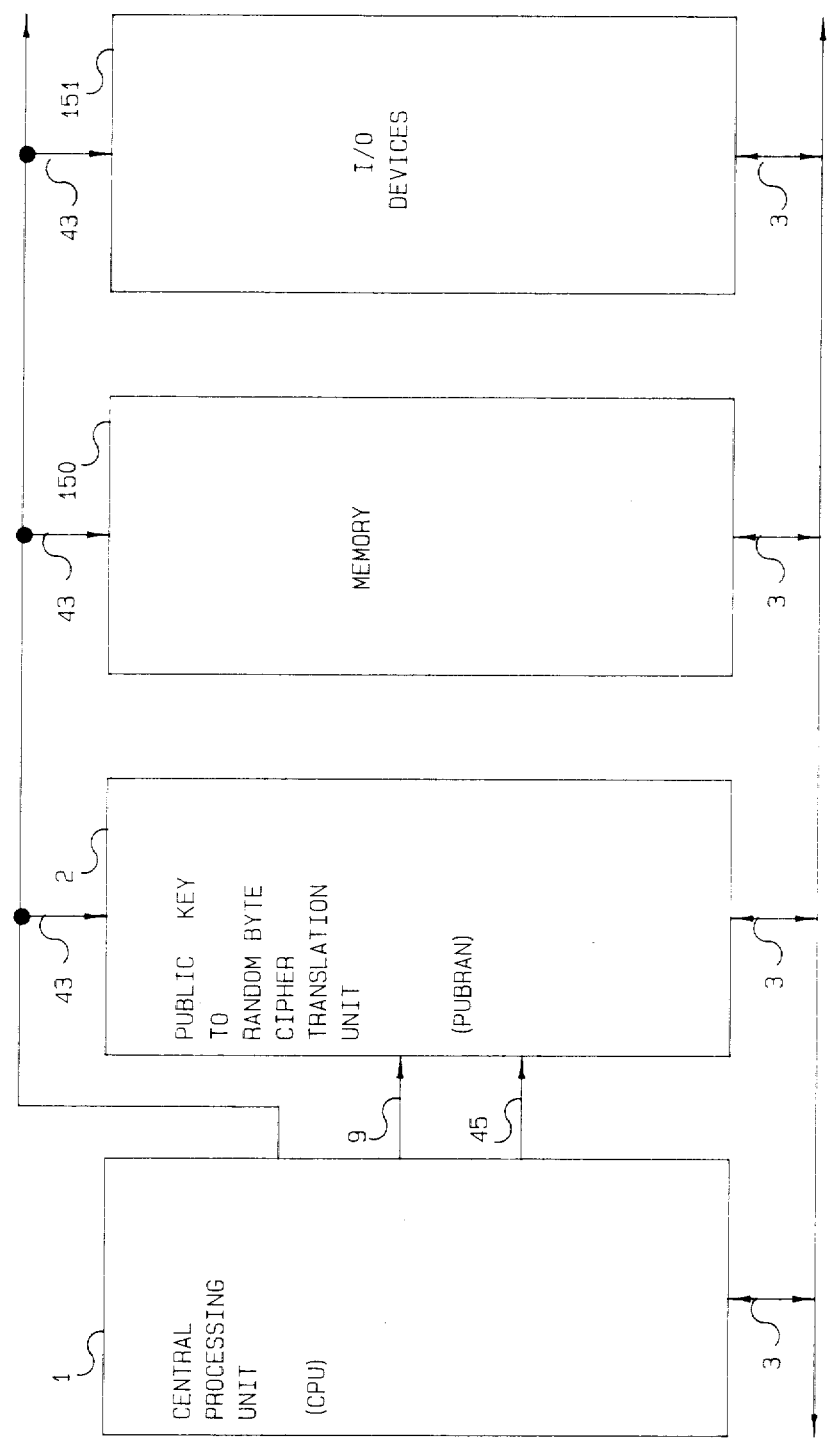
FIG. 1 is a block diagram of a general purpose computer system with separate translation (PUBRAN) hardware and program execution (CPU) hardware, constructed in accordance with the preferred embodiment of the present invention.

The preferred embodiment of the invention is a general purpose computer system having three primary features: the ability to execute encrypted programs, the ability to translate from the distribution form of a program to its execution form, and the ability to detect and inhibit cracking efforts. The corresponding names for these features are: the security CPU (Central Processing Unit), the PUBRAN Hardware, and the Destroy Key feature. The interaction of these components provides the requisite security and allows operation as a general purpose computer.

The security CPU has two modes of operation. In the unencrypted mode, it executes unencrypted programs and is fairly similar to prior art CPUs. In the encrypted mode, it executes encrypted programs. Since these programs are decrypted only inside the security CPU, which is enclosed in an impenetrable package (e.g., a microprocessor integrated circuit), the potential software pirate will not have access to the decrypted form of the program. He will be able to copy the encrypted program, but this will not help him make a usable copy since each microprocessor has a different decryption function. The unauthorized copy of a program will not execute on another computer. The decryption function is chosen so that it is difficult to mount a cryptanalytic attack. Therefore, it costs more to crack a program than to purchase it, and so the basic principle of protection is not contradicted.

It is desirable for protected programs to have reasonable execution speeds. This implies that the execution time decryption must be done quickly. Therefore, the form of the program that is executed must have been encrypted with a small block substitution cipher. Unfortunately, such ciphers are not secure enough for program distribution. Thus, two encryption formats are required: distribution encryption and execution encryption.

The distribution encryption does not utilize traditional encryption methods, but instead uses public key cryptography, which avoids the need for monopolies on encryption. Traditional methods use the same key for encryption and decryption. If the computer owner knew the key for his computer, he would be able to decrypt programs and make unauthorized copies. To prevent this, some intermediary such as the computer manufacturer, would have to be trusted with the encryption and decryption key for all such computers. This would create a monopoly on encryption.

Public key cryptographic systems avoid this problem by permitting secure communication directly between two parties. These cryptosystems utilize two keys: an encryption key and a decryption key. The encryption key is made public but the decryption key is kept private. Knowing the encryption key does not feasibly allow one to determine what the decryption key is. This implies that a software vendor can encrypt a program for a customer's computer without going through an intermediary. Methods of public key cryptography are given in "Privacy and Authentication: An Introduction to Cryptography," IEEE Trans. Inform. Theory, March 1979, pp. 397-427. Block ciphers, such as the Data Encryption Standard (DES) are also described.

In the preferred embodiment, the distribution format consists of two parts: a public key preamble, followed by the program encrypted using a large block cipher, such as DES. The software vendor will first select a DES key which will be used to encrypt the program. Then the vendor forms the public key preamble by encrypting the DES key using a public key algorithm with the public encryption key for the customer's computer. (Note that each computer will have a unique decryption key built into it and a corresponding encryption key that is made public.) This system provides good security while making distribution easy and permitting reasonable program load time.

The preferred execution encryption is a polyalphabetic nonperiodic, byte substitution cipher. This is also known as an address dependent byte substitution cipher. This allows protected programs to execute as fast as unprotected programs.

The present invention has a mechanism for converting from the distribution format to the execution format, which is called the PUBRAN hardware. It translates from the PUBlic key distribution form to the RANdom key execution form. Every time software is loaded, the PUBRAN hardware selects a new random key that is used to re-encrypt the software into the execution form. To accomplish this the present invention includes one or more WARMSTART instructions which cause the PUBRAN hardware to select a new random key. Also, the PUBRAN hardware selects a new random key when power is applied to the system.

The present invention also has a mechanism, called the "PUBRAN Only Once" (multiple translation prevention) feature, which insures that software that is loaded using the same execution key will not overlap in the same address space. If the "PUBRAN Only Once" feature were not used, or if a constant execution key were used, the system could be cracked quite quickly. For example, consider an eight bit computer with 64K bytes of address space. The software pirate would first have the PUBRAN hardware encrypt a "program" consisting of 64K bytes, each of which is zero. He would save the PUBRAN's output. He would then repeat the process with program consisting of 64K twos, 64K threes, etc. until he has encrypted all possible values at every memory location (i.e., after he has encrypted 64K bytes of 255's.) Once this is done, he will have created a decryption table that he can use to decrypt any program he desires. This type of attack is precluded by the PUBRAN hardware's selection of a random execution key and the "PUBRAN Only Once" feature. These insure that information gained at one load time will not be valid for the next load time.

The third and last primary feature of the invention is the Destroy Key mechanism. This causes the information in the CPU (i.e., the contents of registers and the execution key) to be destroyed upon detection of conditions that are likely to occur when a user attempts to crack a protected program. Execution of an unused opcode is one of several conditions that can trigger the destroy key feature.

A surprising result of the design of prior art CPUs is that they are susceptible to automated cracking procedures, one of which hereinafter is called an instruction test. An instruction test is a program that determines what an instruction is by examining the effects of its execution under controlled conditions. It involves: setting up preconditions (i.e., setting up registers and flags), executing the encrypted instruction in question, immediately dumping the postconditions (i.e., the registers and flags after the unknown instruction executes) and analyzing the changes in the status of the computer. Since the invention utilizes an address dependent execution encryption, the instruction to be tested must be executed at the address where it was loaded. Consequently, it may be necessary to modify some of the protected program to insert the instructions which set up the preconditions and the instructions to dump the postconditions. In doing this the pirate cannot be sure his modification will avoid an unused opcode. Execution of an unused opcode will destroy the execution key. In such a case, the pirate would be forced to reload the software and start all over. The invention is designed such that there is a high probability that modification will activate the Destroy Key mechanism and force reloading. In addition, the load time is long enough so that pirate will spend more time cracking a program than he would spend writing a similar program.

The essence of the first embodiment of the invention is a computer system having: (1) the capability to execute unencrypted and encrypted programs, (2) the capability to translate a program from its secure public key distribution form (encrypted software instructions) to the fast execution form (re-encrypted software instructions) using randomly chosen keys, and (3) the capability to detect and inhibit cracking of protected programs.

INTRODUCTION TO THE SECOND EMBODIMENT

There are many applications of computers where the program to be protected against software piracy resides in ROM. The system just described could accommodate such a program in ROM; however, the nature of the PUBRAN hardware and the random execution key require that the program be translated from ROM into RAM before it can be executed. In a general purpose computer system, this will not add additional hardware, since a large amount of RAM must be provided for user programmable memory. However, there are many applications of microcomputers which are not general purpose computer systems, but are dedicated controllers with a minimum of extra hardware. Many of these systems have highly valuable proprietary programs in ROM—video games, for example. For such dedicated applications there is a second embodiment of the invention which eliminates many of the features of the first embodiment in order to reduce the hardware requirements for the CPU and also allow direct execution of programs that reside in ROM.

There are two ways to implement the second embodiment. The first is to use encryption to protect a proprietary program which resides in a ROM that is external to the dedicated application CPU. The second way is to use encapsulation to protect that portion of a proprietary program which resides in a ROM that is fabricated on the same integrated circuit as the dedicated application CPU. A surprising result of prior art computer design is that even total encapsulation of a proprietary program is not enough to protect against software piracy, because both encrypted and encapsulated programs are susceptible to automated cracking techniques, such as the instruction test.

This introduction to the second embodiment will consider how the features of the first embodiment can be modified to implement protection by encryption in a dedicated application CPU. This introduction to the second embodiment concludes with an explanation of how encapsulation can be used as a protection method.

ENCRYPTION AS A PROTECTION METHOD

In the first embodiment of the invention there must be RAM into which the PUBRAN hardware can store the reencrypted program, which was encrypted using the randomly chosen execution key. In order to allow direct execution of programs stored in ROM, the PUBRAN hardware must be eliminated. Additional features must be added to the CPU, while others must be removed, in order to compensate for the security problems introduced by the elimination of the PUBRAN hardware. Since there is no PUBRAN hardware in the second embodiment, the hardware in the CPU for secret communications between the PUBRAN hardware and the CPU can be eliminated. There is no bus provided for the CPU to receive a random key, and instead the key must be programmed into an internal ROM (or other non-volatile memory) inside the CPU.

The primary feature that inhibits automated cracking of a protected program in the first embodiment of the invention is the destroy key feature. This causes the CPU to destroy the information in the registers of the CPU as well as the contents of the execution (random) key register. For example, the destroy key feature could trigger a clear on all of these registers. In the second embodiment of the invention, with a ROM holding the execution key, there will have to be an extra feature to implement the destroy key mechanism.

This extra feature has a single bit write once, read always, non-volatile memory. An example of such a memory is a fuse in a fusible link ROM. For reasons of security and power consumption, a more complicated implementation may be required, but conceptually a write once memory can be thought of as a fuse. When the CPU issues the destroy key signal (for instance, as the result of execution of an illegal instruction) the second embodiment of the invention will have the CPU destroy the registers and flags as it would in the first embodiment. However, instead of trying to destroy the information in the execution key ROM, the second embodiment will set the write once memory. For example, if a fuse were used, the destroy key signal would cause the fuse to be permanently blown. This action will thereafter indicate that the destroy key feature was invoked on that particular CPU.

In order to provide at least as much security as the random key of the first embodiment, the write once memory in the second embodiment is tested whenever the CPU attempts to execute an instruction. If the bit from the write once memory indicates that the destroy key feature was invoked, the CPU will refuse to execute any instructions. If the CPU is powered down, the bit in the write once memory is retained, so that when it is powered back up the CPU will still refuse to execute any instructions.

While this write once memory provides at least as much security as the first embodiment, it has a side effect that is unacceptable on a general purpose computer system: software errors can physically destroy the hardware. For this reason the second embodiment can only be used in dedicated applications.

ENCAPSULATION AS A PROTECTION METHOD

The discussion thus far has assumed that encryption will be used to protect the instructions in a proprietary program, however, there is a more direct way to protect the instructions: encapsulation of a memory for storing the protected program in the same integrated circuit as the CPU. Encapsulation could be used for either a general purpose computer system, in which case the encapsulated storage means would be RAM, or for a dedicated application computer system, in which case the encapsulated storage means could be ROM. Since the size of the encapsulated memory is limited due to the fact it will be fabricated on the same integrated circuit as the CPU, encapsulation is more practical for a dedicated application computer system than for a general purpose computer system, which would tend to have larger programs.

Even in a dedicated application computer system, the program size could easily exceed the size of the internal encapsulated ROM. To over come this restriction, means must be provided to allow execution of unprotected instructions from outside the internal encapsulated ROM. However, in allowing execution of unprotected instructions, the opportunity for a software pirate to implement an automated cracking procedure is also allowed in the absence of a means to inhibit automated cracking.

The means that detects and inhibits automated cracking in a computer system using encapsulation as the protection method need not check for illegal instructions, since the software pirate is not able to modify the contents of the internal ROM. However, a surprising result of the design of prior art CPUs is that they are susceptible to an instruction test procedure, even when the program is encapsulated inside an internal ROM. An instruction test is a program that determines what an instruction is by examining the effects of its execution under controlled conditions. It involves: setting up preconditions, executing the encapsulated instruction in question, dumping the postconditions, and analyzing the changes in the status of the computer. In order to set up an instruction test, a software pirate must be able to branch to an encapsulated instruction, allow execution of the instruction and branch back to the instruction test program (which will be unprotected). The way the software pirate would implement the requirements of an instruction test involves interrupts and branch instructions. Therefore, the means which detects and inhibits automated cracking of an encapsulated program must restrict the way in which branches and interrupts can occur. The Destroy Key feature of a computer system that uses encryption as the protection method will also restrict branches and interrupts, however it will add additional restrictions beyond those required in a system that uses only encapsulation.

DISCUSSION OF THE INVENTION

The present invention is complex and consists of many interrelated features. There are many trade-offs that can be made when implementing the present invention. The purpose of this section is to give the rationale behind the embodiments of the present invention and also to indicate alternative designs.

The description of the present invention begins by examining some software piracy methods, also known as cracking techniques, that a software pirate would use. This is followed by a discussion of the features common to all embodiments that are needed to inhibit such attacks. A discussion of the preferred embodiments will then explain why various features are required and how the invention is operated. It will also describe alternative methods of implementing the invention. Additional formulas and related technical information are also provided.

SOFTWARE PIRACY METHODS

As was previously noted, protection of software against piracy can only be achieved by incorporating special hardware into the design of computers. This hardware will require that software be customized for a specific computer. This is typically done by encryption and/or encapsulation. By themselves, such protection methods are inadequate since there are several automated cracking techniques that a pirate can use to crack protected programs. Two of the most powerful automated cracking techniques are the execution history and the instruction test. A study of these two techniques illustrates why the features of the present invention are required and how they inhibit automated cracking attacks.

The first automated cracking method is the execution history attack. An execution history is simply a record of all signals received by and emanating from the central processing unit (CPU). The essence of the execution history attack is that protected instructions can be discerned by observing the effects of their execution. Obviously, this method allows the pirate to crack only that part of the protected software that was executed. This attack can be accomplished with current technology at a price that is within the resources of most organizations and many individuals. The way a software pirate could obtain an execution history would be to use a separate computer, known as a probe computer, to monitor the activities of the security computer. The probe computer should be capable of: recording the state of all signals emanating from the security computer, feeding signals to the security computer (e.g. interrupts, halt, I/O) and modifying memory (this might involve swapping in another bank of memory). It could be programmed to analyze the protected program and perform automated attacks. It should be noted that a logic analyzer can serve as a simple probe computer.

The second automated cracking method is the instruction test attack. This attack is an extension of the execution history attack. Its basic premise still is that cracking of a protected instruction can be done by observing the effects of its execution, however this is not done in one step but rather in four steps. The first step is to establish the precondition. This involves setting flags, loading registers, providing timing signals or whatever else is required to put the security computer in a desired state. Secondly, the protected instruction is executed thereby altering the state of the computer. The third step is to completely dump the status of the computer, thereby forming the postcondition. This is usually accomplished by stores from registers to memory. Finally, the postcondition is then analyzed to infer what the protected instruction was. This is done by comparing the observed change in the status of the computer, caused by executing the protected instruction, with the known changes caused by each instruction in the instruction set. If the results are ambiguous, then a different precondition is set up and the process is repeated until there is only one instruction that can account for the observed change in the computer's status. The pirate then knows that this single instruction is actually the same as the protected instruction.

An unexpected feature of prior art computers is that the instruction test is quite effective in cracking protected software and can be accomplished with a rather short program. This, coupled with a probe computer, permits significant automated cracking of protected software. A further characteristic of the instruction test is that the pirate has complete control over which protected instructions are cracked. This is unlike the execution history where the pirate can only gain information about those sections of the program that were executed.

An important characteristic of the instruction test is that the pirate must have control of branching. For example, cracking a protected instruction might require setting up three preconditions to disambiguate it. Clearly, the software pirate requires branch control so that he can stop the execution flow, set up the next precondition and then reexecute the protected instruction in question. This branch control will rely on causing interrupts and/or selective modification of the protected program (when possible).

Figure 12A:
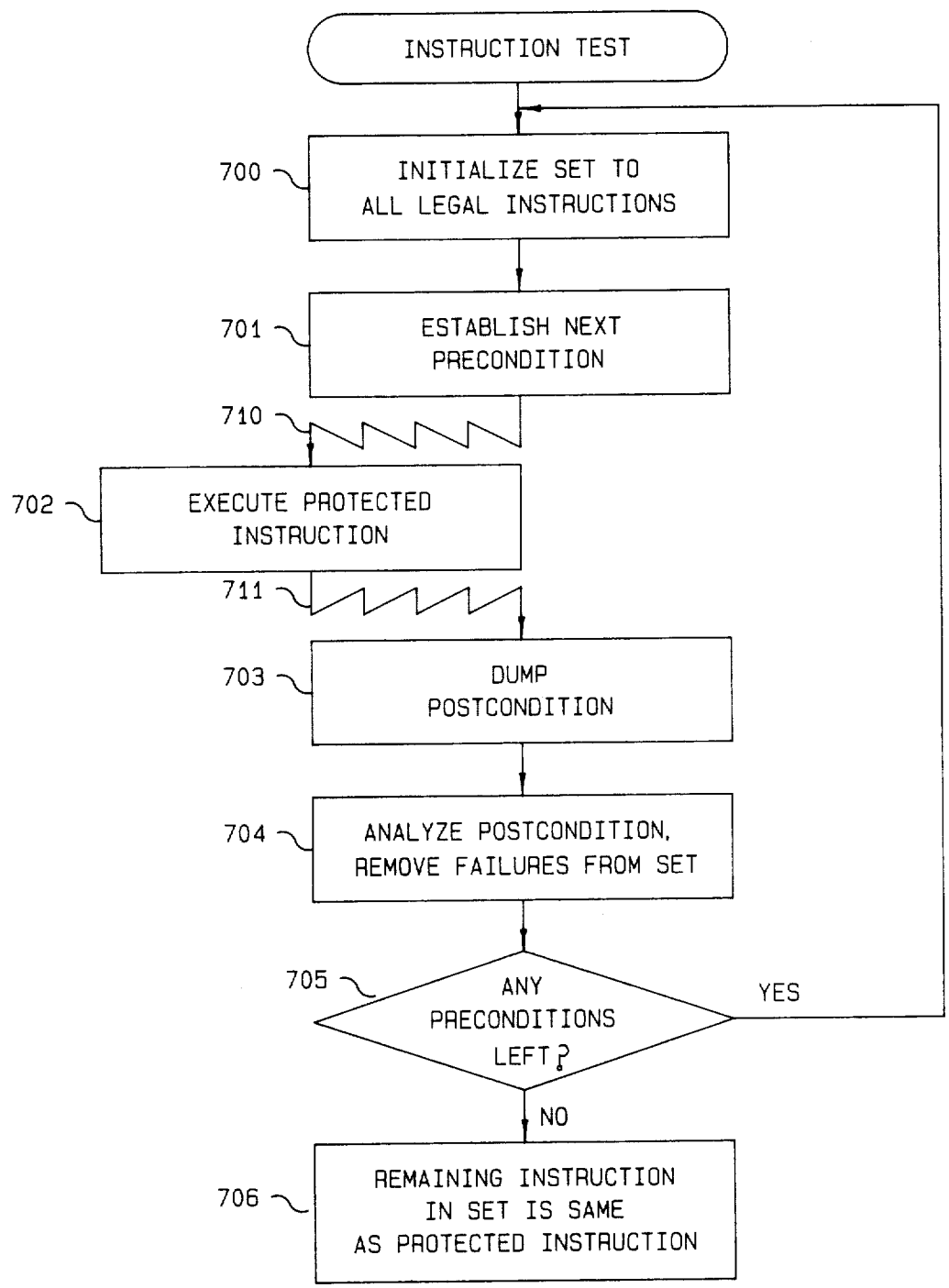
FIG. 12A is a flowchart of an instruction test procedure.

Referring to FIG. 12A, an instruction test procedure cracks a protected instruction by repeatedly executing the protected instruction under different preconditions and analyzing the results of execution. A software pirate could use an instruction test procedure, such as the one described, to circumvent prior art protection methods. The instruction test begins at step 700 by initializing the set of instructions to the set of all legal instructions in the instruction set of the computer running the protected program. At step 701, one of a list of preconditions is established in the registers and flags of the computer running the protected program. A surprising result of the design of prior art computers is that a software pirate can easily determine a short list of preconditions that will identify all unambiguous instructions in the instruction set of the computer running the protected program. The software pirate is able to create the list of preconditions based solely on the information contained in the published description of the instruction set.

Once one of these preconditions has been established in the registers and flags, the instruction test proceeds to step 702, at which time the protected instruction is executed. This usually involves the use of branching and/or interrupts (lines 710 and 711) to cause the protected instruction to be executed in isolation. After the protected instructions has executed, the contents of the registers and flags will have been modified.

At step 703 the modified contents of the registers and flags are dumped out of the computer running the protected program, thereby forming a postcondition. At step 704 the postcondition is analyzed to determine the identity of the protected instruction. This analysis proceeds by removing, from the set, those instructions that cannot account for the generation of the postcondition.

Since more than one precondition may be required to identify an instruction, step 705 tests if there are preconditions that have not yet been used. If there are any unused preconditions, control returns back to step 701. When there are no preconditions left from the list of preconditions, the protected instruction will have been identified, since it will be the only remaining element of the set. At step 706 this remaining instruction is given as the result of the instruction test of the particular protected instruction. If the software pirate desires to crack other protected instructions in the protected program, the instruction test procedure must be repeated starting at step 700, using another protected instruction.

Figure 12B:
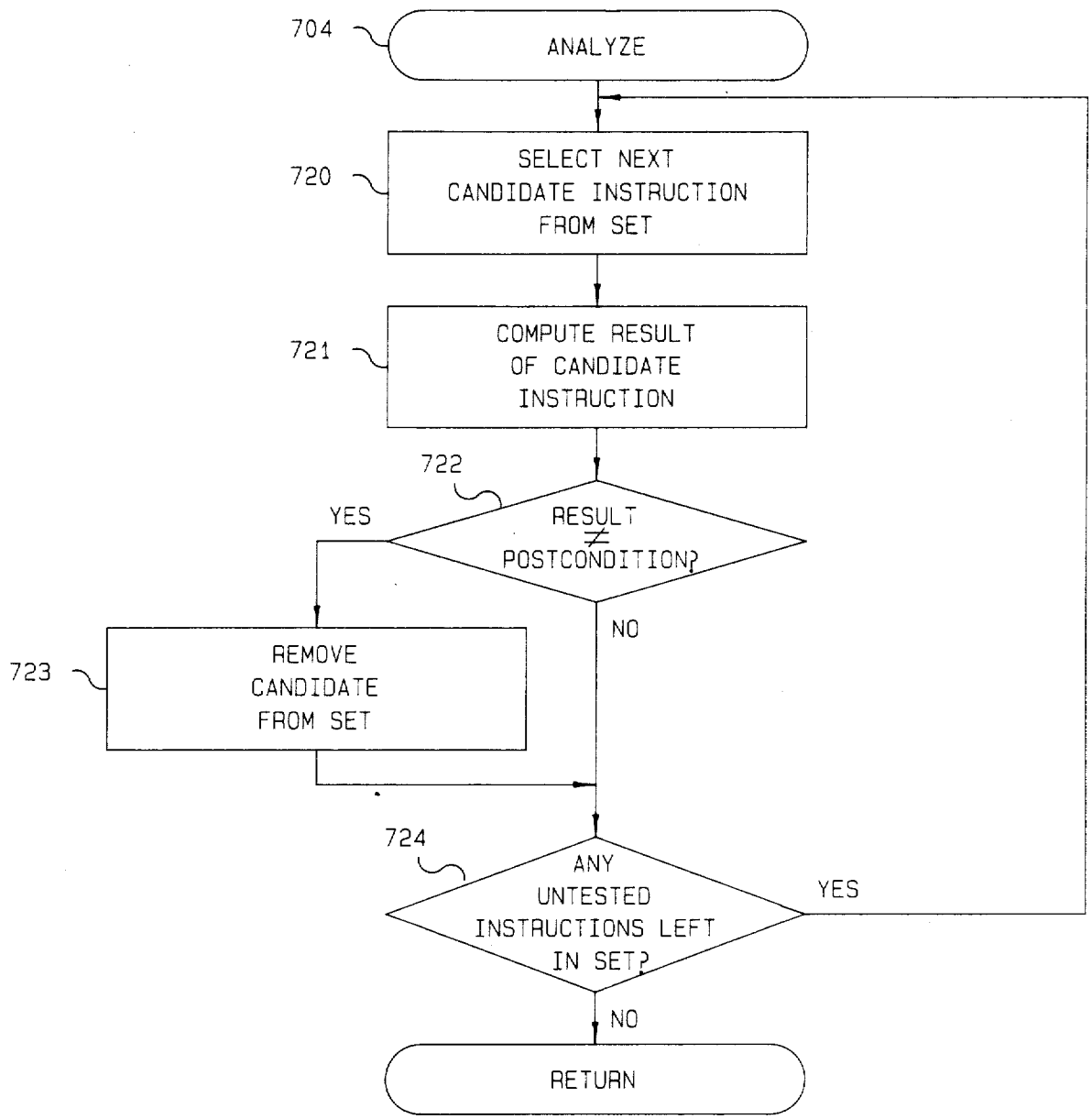
FIG. 12B is a flowchart showing the details of the analyze step of FIG. 12A.

Referring to FIGS. 12A and 12B, the analyze step 704 of the instruction test procedure flowchart removes candidate instructions from the set based on the precondition and the postcondition. At step 720, the next instruction in the set which has not yet been examined by the analyze routine is selected as a candidate for the protected instruction. At step 721 the result of this new candidate instruction is computed. There are several ways the result of the candidate instruction can be computed. Since the result of the candidate instruction is a function of the instruction and the same precondition used when executing the protected instruction, one way would be to use a table lookup method. A better way is to execute the candidate instruction after having set up the precondition in the registers and flags, thereby forming the result. This is analogous to steps 701, 702 and 703, however interrupts and/or branching (lines 710 and 711) may not be required since the candidate instruction is not a protected instruction.

Once the result of the candidate instruction has been computed, the flowchart proceeds to step 722. Step 722 tests if the result of the candidate instruction is not equal to the postcondition of the protected instruction. If the result is not equal to the postcondition, the candidate instruction is removed from the set. The current candidate instruction could not have accounted for the postcondition of the protected instruction, and so the current candidate instruction should not be considered as a candidate in the future. If the result of the candidate instruction is equal to the postcondition of the protected instruction, the candidate instruction remains in the set, however this does not mean that the candidate instruction is equivalent to the protected instruction. The candidate instruction simply remains a candidate at this point. Whether or not the candidate was removed from the set, the flowchart proceeds to step 724.

Step 724 tests if there are any instructions in the set which have not yet been selected as candidates during this execution of the analyze routine. If there are, the flowchart proceeds to step 720, where the next one of these untested candidates is selected. If all candidate instructions have been tested, control returns back to step 705. The net effect of executing the analyze portion of the flowchart is to remove all instructions from the set that cannot be candidates for the protected instruction, based on the current precondition and postcondition.

An instruction test is typically run under the control of a probe computer, which is used to create interrupts, swap memories, modify selected memory locations, and so forth. In such a system, the probe computer is responsible for all aspects of the instruction test other than executing the protected instruction and communicating the preconditions and postconditions. In other words, only step 702 and branching on lines 710 and 711 must be executed completely on the security computer. Steps 701 and 703 involve communication between the probe computer and the security computer.

COMMON PROTECTION FEATURES

All embodiments of the present invention have certain common features which are necessary to prevent the execution history attack and the instruction test attack. The discussion of these common features starts with those features designed to inhibit the execution history attack, then those designed to inhibit the instruction test attack, and concludes with those designed to inhibit both attacks.

The principle of the execution history attack is that protected instructions can be discerned by observing the effects of their execution. The first line of defense against this attack is to make it difficult to observe the inner workings of the CPU. Therefore, the present invention requires that the CPU be enclosed in an impenetrable package. Any attempt to pry open the package should destroy the CPU. An example of this is the standard epoxy package commonly used to encase integrated circuits, such as microprocessors. In addition to resisting mechanical entry, the package should be impervious to attack by chemicals, radiation, electric fields, magnetic fields, and so forth.

The efficacy of the execution history attack also depends upon the visibility of the instructions. An instruction is visible if its execution produces readily detectable effects. For example, all input/output instructions can be found by watching the I/O lines. Therefore, the present invention is designed so that instruction execution provides as little information as possible. The best architecture is one that has many registers in the CPU since instructions that manipulate things completely internal to the CPU (such as registers) will present few indications of their action. Note that for CPUs utilizing a stack architecture, it is imperative that the top levels of the stack reside in a memory internal to the CPU. Regardless of the architecture, all flags must be kept internal to the CPU. The flags (also known as condition codes, status bits, or program status words) are affected by many instructions and thus are a potent tool for determining the identity of a protected instruction.

Another way to reduce the visibility of instructions is to insure that their execution times are not unique. If each instruction took a different amount of time to execute, then the execution history could identify each protected instruction simply by measuring the time required for each instruction to execute. To avoid this problem, instructions should be classified in a small number of groups. All instructions in a particular group should have the same execution time. Note that this might require increasing the execution time of some instructions slightly.

A consequence of the execution history is that it makes it difficult to protect temporary variables. The only secure way to do this is to use a special scratch pad RAM internal to the CPU. This RAM would be used only for storing those temporary variables that are to be protected. This approach suffers from two problems, namely: only a limited number of temporary variables can be stored in the RAM, and the cost of manufacturing the present invention will be higher due to the added complexity of incorporating the RAM in the CPU.

Temporary variables could also be protected by encryption, although this also has disadvantages. A secure encryption scheme (such as DES) would involve substantial overhead time whenever a temporary was accessed. If smaller ciphers are used, then the changing value of the temporary will allow quick cracking of the cipher. This would certainly be the case if the pirate could find a loop-index that was stored in memory after each iteration of the loop.

For reasons of economy and efficiency, the data protection features described above are not used in the preferred embodiments. For those applications demanding additional security, it would be possible to incorporate these features.

Another attack is the instruction test attack. An instruction test attack requires that the pirate have the ability to create branches in the execution flow by using interrupts or selective modification of the protected program. The present invention inhibits the instruction test by insuring that modification of execution flow will cause conditions that can be detected with a high degree of probability. Once such a condition has been detected, the status of the computer will be altered. This could be implemented so that the computer is rendered permanently inoperable or temporarily inoperable. In the latter case, it is best to incorporate an artificial delay before the computer can re-execute the protected software that was being cracked. If this delay time is properly chosen, the total time required to complete the automated cracking will be so long that it will not be economically worthwhile for a software pirate to crack the protected program.

The execution history and the instruction test both illustrate the need for having a secure control stack. If the control stack is accessible to external observation, it will permit the pirate to locate subroutines and determine their probable function. If the control stack could be modified, it would be an important method for the pirate to create the branching necessary for the instruction test. Therefore, the present invention insures the security of the control stack by encapsulating it in the CPU, where it will be inaccessible to external observation and modification. This stack will have enough levels to be able to handle typical programs and programs with limited recursion. An alternative design could be used to prevent control stack overflow for programs that are highly recursive. This would be done with a dynamically managed content addressable memory.

The execution history and the instruction test attacks also demonstrate the need for keeping the status of the CPU secure during interrupts. Prior art interrupt mechanisms usually store the complete status of the CPU in an external memory that a pirate could access directly. A pirate could readily crack protected programs on such machines simply by causing an interrupt after each instruction executes. This would display the contents of all registers and status flags. With this information, it would be a trivial task to determine what instructions were executed.

It might appear that secure status on interrupt could be achieved by encrypting the status before it is stored in the memory. However, the requisite security could only be achieved with a large block cipher (such as DES). Such ciphers usually have slow encryption speeds and consequently a computer utilizing them would not respond quickly to an interrupt. Small block ciphers offer faster encryption but are not secure. This is especially true if the pirate is creating interrupts, in which case the pirate knows two things: the address of the instruction to be executed upon return from the interrupt, and the encrypted return address placed on the control stack by the interrupt. In other words, the pirate knows the cleartext and encrypted form of the return address. Consequently, the encryption function is easily cracked simply by causing an interrupt after executing each instruction.

The best way to provide secure interrupt contexts is to store the interrupt context (including the return address) in a special RAM internal to the CPU. This memory is called the Interrupt Context Memory (ICM). Note that the ICM need only store the contexts of those interrupts that occur during execution of protected software. Since the ICM is internal to the CPU, it will be inaccessible to the pirate. Also note that all registers and flags should be altered after the interrupt context is stored in the ICM. If this were not done, then all the pirate would have to do is write his own interrupt routine to dump the registers and flags. In summary, any interrupt routine running on the present invention should not be able to access the status of the computer at the time of the interrupt.

The ICM could be designed in a number of ways. One would be to have special memory locations in the ICM for each level or type of interrupt. In other words, the highest priority interrupt would have a reserved place for its interrupt context, the next lowest interrupt would have a different reserved spot in the ICM and so forth. Although such a design is suitable for many applications, there are applications where a different ICM design would be required. For example, consider a multi-tasking operating system that uses an interval timer to activate and suspend processes. Where a timer interrupt occurs, the active process would be suspended, and its interrupt context would overwrite the interrupt context of a previously suspended process. Consequently, there would be no way to reactivate the previously suspended process.

A better design is to have the ICM contain storage for a certain number of interrupts. This storage is allocated not by interrupt priority or by the type of interrupt but rather to each successive interrupt. When an interrupt context is stored, it is associated with an environment number. This number is left in one of the registers. Restoration of an interrupt is done by executing a special instruction which specifies which interrupt environment number is to be restored (e.g. RESINT 5). The ICM is finite and thus a limit is imposed on the number of concurrent processes.

A third possible ICM design would allow only one interrupt from a protected program. This would be the least expensive and also the most inflexible way to implement an ICM.

In any design, the ICM should also be designed so that an interrupt context is not restored more than once. This could be accomplished by having a tag bit that would be set on the storing of an interrupt context and cleared on restoration of the interrupt context. Such a design would prohibit creation of loops via interrupts. This is important since many of the techniques a pirate would use for writing instruction tests would require such looping.

DISCUSSION OF THE FIRST EMBODIMENT

The common protection features described above, and summarized in Table I, must be augmented with additional protection mechanisms as required by the architecture and application of the security computer. For a general purpose security computer, these mechanisms must protect proprietary software and still permit the user to make back up copies. The user should also be able to execute unprotected programs and combine programs (protected or unprotected) rightfully obtained from others. The user should be able to protect software that he has created. These protection features must allow reasonable execution speed and also inhibit automated cracking.

These requirements are met in part by the system in the section entitled "Introduction to the First Embodiment." Of the features introduced in that section and summarized in Table II, the primary ones are: a CPU which executes encrypted programs, a public key cryptosystem for secure program distribution, a PUBRAN unit to translate the distribution form into an execution form, and features to destroy the state of the computer upon detection of conditions indicative of automated cracking.

TABLE I

| Features Common to All Embodiments of the Present Invention | |
|---|---|
| Type of Attack | Associated Protection Features in the CPU |
| Execution History | impenetrable packaging many internal registers designed so that few instructions have unique execution times |
| Instruction Test | destroy mechanism |
| Features Required by both the Execution History Attack and the Instruction Test Attack | renders the computer either permanently or temporarily inoperable secure control stacks interrupt context memory |

The details of these mechanisms are given in Table II and will be discussed below. The explanation starts with a review of how the fundamental security features preclude an exhaustive mapping attack. Ways to inhibit the instruction test attack and other related attacks are then discussed, followed by a description of miscellaneous aspects of the present invention. Notes on operation and usage conclude the discussion of the general purpose security computer.

EXHAUSTIVE MAPPING ATTACKS ON THE FIRST EMBODIMENT

An exhaustive mapping attack is one in which a pirate tries to compile a complete table of the encryption function, which he then uses to decrypt the encrypted software. This type of attack is precluded by the design of the present invention, which insures that neither the PUBRAN translation hardware nor the execution encryption can be exploited to create such a table.

The PUBRAN translation hardware cannot be subverted due to the synergistic interaction of three features: the address dependant execution encryption, the PUBRAN Only Once, and the generation of random execution keys. As was mentioned in the "Introduction to the Preferred Embodiment", a pirate could attempt to create an exhaustive mapping table by writing nonsense programs which would be loaded onto his general purpose security computer.

TABLE II

| Features of the first embodiment (in addition to those given in Table I) | | |
|---|---|---|
| CPU | Translation (PUBRAN) Hardware | Software Distribution |
| executes encrypted and unencrypted software | translates from secure distribution format to execution form | body of program encrypted in a large block cipher |
| SWITCH instruction switches between execution modes | requires LEE and PUBRAN instruction | (e.g. DES) |
| small block cipher for fast execution | unique public encryption key and private decryption key | preamble utilizing public key cryptosystems Preamble contains: |
| address dependent execution cipher | generates random crytographic key for execution cipher | encryption key for body of program |
| contents of the execution key register and other registers are destroyed for following conditons: illegal/unused instructions | checks for nonrandom performance due to external fields accomplished by the WARMSTART instruction | WARMSART (load) times program length |
| branch out of program bounds. Checked by ULBTU hardware. | performs relocation with RELOC units | |
| branch out of relative branch range | establishes and maintains program bounds PSTOP register implements "PUBRAN Only Once" (multiple translation prevention means) | large block cipher is address dependent |
| secure communication means between CPU and Translation Hardware internal bus if computer system is fabricated on one chip if CPU and translation hardware are seperate chips, then communication is done with a "one time pad" (OTPRNG hardware, etc.) | | |
| CVC, HSK, RETCVC instructions for interpackage communication and control | variable load (WARMSTART) times public key cryptosystem is used for placing manufacturer's digital signature on the translation unit | |
| separate encryption functions for each instruction field | | |

A table could readily be compiled simply by associating the instructions (or data) in the nonsense program with their execution encrypted form. A pirate might think that a nonsense program consisting of the 256 hexadecimal numbers OOH to FFH (assuming a byte architecture) would allow compilation of a complete table. This is not true due to the address dependency of the execution encryption. Since each location has a different encryption function, a complete table would require loading all 256 possible values into all memory locations. This is prohibited by the PUBRAN Only Once feature which does not permit overwriting a previously loaded memory location until a new random execution key is generated. Generation of a new random key invalidates the partial table created from a previous load, thereby thwarting the pirate's exhaustive mapping attack.

Prevention of exhaustive mapping attacks also requires that different instruction fields be encrypted with different encryption functions. Consider what would happen if the same encryption function was used for instruction opcodes and operand addresses. A pirate would first locate a load instruction, since execution of a load allows the pirate to compile a table giving the encryption function for the load's operand field. This table could be created by saving the encrypted operand field on a disk file, executing the load instruction, and observing what address is placed on the address bus. If the pirate can set up a loop around the load instruction, then he can try all possible patterns for the encrypted operand address and see the corresponding cleartext address on the address bus. In other words, the pirate will have created a table giving the encryption function for the location containing the operand address. However, since only one encryption function was used, the table is also the encryption function for instruction opcodes. Thus the table could be used to encrypt a load instruction for the location that was cracked. The whole process is then applied to this new load instruction. It would only be a matter of minutes before all of memory was cracked. This clearly points out the need for using different encryption functions for different fields.

INSTRUCTION TEST ATTACKS ON THE FIRST EMBODIMENT

The instruction test attack is another potent attack that a general purpose security computer must withstand. Instruction test attacks are readily implemented on prior art computers simply by moving the instruction in question into a specific location and then jumping to that location. This will not work on a general purpose security computer due to the address dependent execution cipher. On a security computer, an instruction test attack must branch to the encrypted instruction in question, execute the instruction and return to the rest of the instruction test attack. On a general purpose security computer system, there are three ways that a pirate could try to create the modifications required for such branching. The first is to attempt to patch the protected program by loading over it with the appropriate program. The features that prohibit exhaustive mapping attacks also protect against this. The second is to bypass the PUBRAN translation hardware and directly modify locations in the encrypted program (with the aid of a probe computer). This is a trial and error process which will create conditions that can be detected, thereby causing activation of the destroy key mechanism. The third and last method is to write the instruction test attack as a separate program which will be loaded concurrently with the encrypted program that is to be cracked. Protection against this attack requires special features which place restrictions on interaction of programs. The features necessary to prevent implementing the instruction test attack via these three approaches are described below.

Implementing the instruction test attack by overlaying an encrypted program is prevented by the PUBRAN Only Once, the random execution key, and the address dependent execution encryption. The PUBRAN Only Once feature insures that a random key for execution encryption/decryption is selected before a program can be loaded over a currently loaded program. This means that a pirate cannot modify a program by trying to load another program over it. The only way to load a program over another program is to reinitialize the PUBRAN hardware by executing a WARMSTART instruction. This causes the PUBRAN unit to generate a new random key, which means that the CPU will not be able to execute programs previously loaded into memory, since they were encrypted with the old execution key.

The random cryptographic key used for the execution format guarantees that information obtained by attacks at one load time will not be applicable at later load times. This prohibits the pirate from inserting a program segment (e.g., instruction test) into a protected program with the following procedure: (1) the pirate has the PUBRAN hardware load the program segment; (2) the pirate saves the re-encrypted instructions in external storage; (3) the pirate re-initializes the PUBRAN hardware by executing a WARMSTART instruction; (4) the pirate has the PUBRAN hardware load the protected program; (5) the pirate alters the protected program by swapping in the modifications from external storage, thereby bypassing the protection provided by other parts of the system. Since the WARMSTART instruction causes a new key to be selected, the pirate cannot use the above procedure.

The address dependent execution cipher insures that the execution of the program, which involves decryption internal to the CPU, can be done only at the location at which the program was loaded. Shifting the program around in memory will prevent it from being decrypted properly and thus the program will not execute properly. This prevents the pirate from modifying the program by: (1) loading the program at one location, (2) loading modifications at another location, and (3) patching the program by moving the modifications into it.

Protection from the instruction test attack, implemented by directly modifying memory locations, requires all of the mechanisms mentioned in the "Common Protection Features" section. It also requires making it highly improbable that a pirate could bootstrap an instruction test attack by modifying memory locations. The goal is to make it so difficult that, on the average, it would take many years to crack a program. This is best done by limiting the rate at which modifications can be made. The present invention accomplishes this with the destroy key feature. Additional security can be achieved by incorporating a variable load time into the PUBRAN hardware.

The destroy key mechanism destroys, or alters, the CPU's execution key and internal state upon activation. This means that the pirate will have to reload the protected program and start all over with his attack. The destroy key mechanism is activated whenever conditions indicative of an attack are detected while the CPU is in encrypted execution mode. These special conditions are the occurrence of: an illegal instruction, a branch out of package bounds, a branch out of relative branch bounds, and indirect branches.

A feature of the present invention is that there are a number of instruction opcodes which cause activation of the destroy key mechanism when the CPU is in encrypted execution mode. In unencrypted execution mode, these opcodes may be treated as NOPs (no operation) or other legitimate instructions. However, if they are not treated as NOPs, they should be little used instructions since it would be undesirable to have a class of instructions that could be used in unencrypted mode but not encrypted mode.

The illegal instructions make it difficult for a pirate to modify an encrypted program. If he makes a modification, he runs the risk that the modification will be interpreted as an illegal instruction. In such a case, the execution key would be destroyed, thus forcing the pirate to reload the software that he is trying to crack. The PUBRAN hardware would reload it with a different random key which means that the encrypted form of the illegal instructions would have changed. Consequently, the pirate would not even be able to avoid the illegal instructions by a process of elimination. Every time he is forced to reload, he starts from scratch.

The probability that the pirate will make a successful modification is controlled by the number of illegal and warmstart instructions and the number of locations that must be modified to create an attack. For example, $2.6 \times 10^{10}$ trials would be required to modify 10 locations in an encrypted program for a computer that had 9 illegal instructions and one WARMSTART instruction in its instruction set. More information on this is given in the section entitled "Modification Probabilities."

Illegal instructions are useful for inhibiting instruction test attacks, however it is possible for a pirate to successfully implement an instruction test program on a prior art computer that is augmented with illegal instructions. Therefore, the present invention includes features which inhibit such methods. One such feature activates the destroy key mechanism whenever an attempt is made to branch out of the bounds of an encrypted program. (Note that branches are not restricted in unencrypted mode.) The branch out of bounds could be implemented by examining the address field of all branch instructions or by comparing the contents of the program counter with the package bounds before fetching the next instruction. The latter method is preferred since it detects all conditions that attempt to execute outside of program bounds, such as relative branches or just sequential execution to the end of the package. (The only exceptions are some special instructions that facilitate interpackage communications. These will be covered toward the end of this section.)

This greatly enhances the security of the present invention by increasing the chance that the destroy key feature will be activated. For example, consider a 16K program that runs on a security computer having a 64K address space. The probability of successfully modifying an absolute branch address without triggering the destroy key feature will be one out of 49,153. If ten absolute branches had to be modified at the same time, the probability of success would be one out of $8.2 \times 10^{46}$.

The branch out of bounds feature requires some additional hardware in the CPU to store package bounds and also to determine if execution has branched out of bounds. The package bounds information is obtained from the PUBRAN hardware which keeps track of the program bounds in order to implement the PUBRAN Only Once feature.

For adequate security, the branch out of bounds feature requires that absolute branch addresses be encrypted as a large unit such as sixteen bits. This insures that a modified branch address will most likely cause a branch out of package bounds. Encryption of addresses on a byte level would offer some security but is not preferred. A pirate could modify the low order byte of an address with relative impunity since this would only cause the modified branch target to be at most 256 locations from the original branch target. Most programs are larger than 256 instructions, and so the pirate would run little risk of branching out of the program's bounds if encryption of branch addresses is only done on a byte level. If the branch addresses are sufficiently long, then it is possible to encrypt them in units, however the low order unit should still contain a large number of bits. For example, a 24 bit address could be encrypted with a high order byte of 8 bits and a low order word of 16 bits. (Note that although absolute branches were discussed here, the same argument would apply for any branch instruction that has large address fields. For example, relative branch addresses should be encrypted as a single unit on computers that use a 16 bit relative branch.) Additionally, branch address modifications can cause illegal instructions to be executed, which in turn will activate the destroy key mechanism. Suppose that a pirate has modified an absolute branch without causing a branch out of bounds. If the modified branch points to an instruction in the program, then no illegal instructions will be encountered. If the branch points to the program's data, then the data will be treated as instructions, which the CPU will try to execute. There is a chance that this will lead to execution of an illegal instruction. A similar situation can occur with instruction misalignment on computers that have variable length instructions. For example, consider branch address modification on a computer that has single, double, and triple byte instructions. A modified branch inside the package might not point to the beginning of an instruction but rather to the middle or end of the instruction (e.g., operand or address fields). This misalignment could cause the CPU to execute an illegal instruction.

Branch out of relative branch range is another feature that may be implemented to provide additional security. Relative branches, which typically use an 8 bit address, can provide enough branch control to implement an instruction test attack. The limited range of a relative branch (typically $\pm 127$) means that modifications of a relative branch will seldom cause an out of package bounds condition (unless the relative branch instruction is close to the beginning or end of the program.) The remedy for this is to restrict the range of a relative branch. Any branch out of the range would activate the destroy key feature. For example, the present invention could be implemented with an 8 bit two's complement relative branch with a valid range of $\pm 120$. This means a relative branch address that decrypted within the ranges 127 to 121, and $-128$ to $-121$ would activate the destroy key feature.

In order to allow a non-pirate user to combine unencrypted software (such as an I/O driver) directly with encrypted software, the present invention includes a SWITCH instruction, which changes the execution mode from encrypted to unencrypted, or vice versa. An unexpected consequence of including such a simple SWITCH instruction in the present invention would be to allow a software pirate to implement an instruction test easily. If a pirate were able to place a SWITCH instruction in a protected program by modification, he could follow the SWITCH with whatever unencrypted software he desires. Therefore, it is imperative that the SWITCH instruction be implemented in one of the following two ways. The first method is to have the SWITCH instruction clear all registers in the computer before changing modes. This prohibits a pirate from dumping the status of the CPU immediately after the SWITCH and determining what the preceeding instructions are. This also means that memory will have to be used for transfer of information between encrypted and unencrypted programs. The second implementation requires the SWITCH instruction to have an opcode that is many bits long. The length of the opcode should be such that it is as difficult to create a SWITCH instruction by modification of an encrypted program as it is to create a complete instruction test attack by modification. An opcode length of 64 bits is probably sufficient and could be implemented as eight bytes. The probability of successfully creating a 64 bit SWITCH instruction is one out of $2^{64}$, since on a byte architecture the first byte determines that the instruction is a SWITCH, and the last seven bytes (56 bits) determine whether the destroy key mechanism will be activated. All but one combination of the last 56 bits of the SWITCH instruction will activate the destroy key. If greater security is required, a longer opcode length could be chosen. The preferred embodiment of the general purpose security computer implements both the clearing of the registers by the SWITCH instruction, and the long (64 bit) opcode length for the SWITCH instruction.

Another feature for improving security would impose restrictions on indirect branches when in encrypted execution mode. The problem with indirect branches is that their dynamic nature virtually makes them cleartext instructions, and consequently they may provide enough control for a pirate to create an instruction test attack. The remedy used in the preferred embodiment is to prohibit indirect branches in encrypted execution mode. Another remedy is to require special handshake instructions at the target of each indirect branch.

In review, there are several ways to design a security CPU so that modifications to a protected (encrypted) program will create conditions that activate the destroy key feature. The most important of these features are illegal instructions and branch out of program (package) bounds. The preferred embodiment also activates the destroy key feature on branch out of relative branch range (bounds), incorrect bit(s) in a SWITCH instruction, and indirect branches in encrypted mode. An important aspect of the present invention is that the basic security features of the invention force a pirate to modify an encrypted program. This will involve modification of instructions and/or branch addresses and will usually create conditions that will activate the destroy key mechanism.

Additional hardware in the PUBRAN unit greatly enhances security provided by the destroy key mechanism. By itself, the destroy key feature just guarantees that the pirate will have to reload the software fairly often which will not be a severe limitation if it takes a short time to load the software via the PUBRAN hardware. Consequently, it is desirable that the PUBRAN load time be long enough that a pirate could not expect to crack the program until after a couple of years have passed. There are three ways to manage the load time of the PUBRAN hardware. The first is to do nothing which would be appropriate if the PUBRAN hardware is inherently slow. Secondly, the PUBRAN could be manufactured so that it insures all loads will be at least a minimum time. For example, a program might be physically loaded in one second but the PUBRAN would not indicate that the load had completed until after ten seconds. The disadvantage with this approach is that it leaves the security of a protected program in the hands of the PUBRAN manufacturer and not the software developer. The third method is to have variable PUBRAN times. The delay time would be contained in the public key preamble of the distribution form of the program. This is the preferred design since each software developer can control the trade off between load times and security.

SECURE PACKAGE COMBINING IN THE FIRST EMBODIMENT

An object of the present invention is to permit appropriate software packages to be combined, yet still provide protection against the instruction test attack implemented as a separate program. To provide this protection, it is necessary that transfer of control from one package to another occur only at defined entry and exit points.

It is possible to combine packages by SWITCHing to unencrypted execution mode and then branching to the appropriate package. (In the present invention, the branch out of bounds condition occurs only in encrypted execution mode.) This method provides optimal security when the SWITCH instruction is implemented as a multibyte instruction which also clears the registers and flags of the CPU before changing execution mode. The entry point for an encrypted package would then start with a SWITCH. If a pirate wanted to create a new entry point, he would have to use trial and error to create a SWITCH by modifying the proper locations. This modification would most likely fail and cause activation of the destroy key mechanism. Clearing the registers and flags on the SWITCH will hinder a pirate's efforts. This method of transferring control from one package to another has the nice feature of unencrypted branches which permits linking as in prior art computers.

Although transfer of control between packages can be done solely with the SWITCH and branch instructions, the present invention is easier to conceptualize (and thus program) by including special instructions, namely: HSK, CVC, and RETCVC. The handshake instruction, HSK, defines an entry point and is essentially a multibyte NOP. It consists of enough bytes, about eight, to make it difficult to create by modification. The Cross Vendor Call instruction, CVC, is a special form of the call instruction that permits one package to call another package without causing a branch out of bounds condition. A CVC to a location internal to the current package should activate the destroy key mechanism. The address field of the CVC is unencrypted and thus permits linking of packages as in prior art computers. If an HSK is not executed immediately after a CVC, the destroy key feature is activated. For good security, the CVC instruction should also clear the register and flags. In addition, the return addresses for the CVC should be kept in a secure control stack. This prevents a pirate from branching to any location of a package by modifying a return address and then executing a RETCVC. The RETCVC, Return from Cross Vendor Call, causes execution flow to return to the calling package without causing a branch out of bounds condition. As was mentioned above, this requires using a control stack that cannot be modified by a pirate. This secure CVC control stack could be implemented as a special stack separate from the standard control stack used for calls. However, it is preferable to have just one secure control stack that would be used for standard calls and also for CVC calls.

An important task that must be done when transferring control from one program to another, is to update the registers in the CPU that contain the upper and lower bounds for the currently executing program. Actually, this is only of concern when transferring control to an encrypted program or when SWITCHing to encrypted execution mode. There are a number of ways to implement this. The simplest is to do a linear search of the program bounds table (which is made available by the PUBRAN hardware), however this will be slow. A faster method is to use a successive approximation search (binary search). This is the method used in the preferred embodiment and described further in the detailed description of the first embodiment.

There are a number of variations to the above methods of cross package branching and communication. A minor one is to require that an HSK follow all CVCs and that the RETCVC check for an HSK. This would eliminate the need for a secure CVC control stack. Another is to provide a special register that points to a buffer containing information to be passed to another package when a CVC is executed. This register would not be cleared when the CVC was executed. Such a register would facilitate interfacing two encrypted programs (packages). A more fundamental variation is to do away with CVCs and simply redefine the branch out of bounds condition to be any branch outside of the current package bounds, that does not branch to an HSK instruction. This can be implemented with a minimum of hardware but does have the disadvantage that linking cannot be done if encrypted branches are used. Linking would require the aforementioned technique of SWITCHing to normal mode and then branching.

OTHER ATTACKS ON THE FIRST EMBODIMENT

The preceeding mechanisms and methods inhibit creation of instruction test attacks but do not guard against other attacks. The most glaring concerns communication between the PUBRAN hardware and the CPU. This is not a problem if the PUBRAN unit and the CPU are manufactured as a single integrated circuit. However, due to ease of fabrication, it may be preferrable to manufacture the PUBRAN unit and the CPU as separate devices which communicate via a secure channel.

If the communications channel were not cryptographically secure, then a pirate would be able to connect one PUBRAN unit to many CPUs. This should be prevented, since it allows the pirate to do parallel cracking, which can drastically reduce the time needed to crack an encrypted program. Also, an insecure channel allows the pirate effectively to create load modules. On a prior art computer, a load module is a dump of memory that can be quickly reloaded and executed. However, to create a load module for the present invention requires some way to restore the execution key back into the CPU without doing a PUBRAN operation. Load modules are to be avoided since they allow modification to be a linear process. For example, consider creating a desired modification of n instructions on a computer with a byte architecture and ten illegal instructions. If the modifications must be made in memory, it will take on the order of $10^n$ reloads before success is achieved (on the average). Modifying a load module is considerably easier since an incorrect modification does not destroy all the previous modifications. A pirate would simply reload the load module and try again on the modification that was incorrect. After achieving success on that modification, he would concentrate on the next location to modify. In a worst case, such a process would require only 256n reloads before the desired modification is completed.

Secure communications are achieved in the present invention by special hardware in the CPU and the PUBRAN unit which implements a One Time Pad communications channel. The CPU generates a random string of numbers, for use as the one time pad, whenever the PUBRAN unit is initialized (e.g., execution of a WARMSTART instruction). A copy of this random number string is then sent to the PUBRAN chip via a fairly secure cipher such as DES. The PUBRAN chip then uses this random number string as the One Time Pad to encrypt the random execution key and bounds information which is then sent to the CPU. The CPU will then use its copy of the random number string to decrypt the information from the PUBRAN. Proper transmission will occur only if the PUBRAN chip is connected to the CPU. A pirate will not be able to connect one PUBRAN chip to many CPUs since each CPU will have chosen a different random number string for the one time pad. Since the PUBRAN chip can only use one one time pad, the PUBRAN chip can communicate with at most one CPU. The one time pad communications channel also prohibits a pirate from using load modules. A pirate might attempt to create a load module by saving an image of memory and also recording the communications between the CPU and the PUBRAN unit. He might then try to load the load module by writing the memory image back into memory and replaying the signals originally sent from the PUBRAN chip back to the CPU. Such an approach will not work because the CPU will have selected a different one time pad on start up and consequently it will be unable to decrypt the recorded PUBRAN signals. In short, these secure communication features, which are needed only if the PUBRAN unit and the CPU are separate devices, eliminate the threat of parallel attacks.

A problem related to load modules, arises if the distribution form of the program is not secure. The most secure method would be to use public key cryptography for the complete program. However, since this would yield excessively slow load times, it is better to use the public key cryptography for just the preamble. The preamble contains the vendor selected load time, package length, and vendor distribution key. This key is the key that the vendor used when encrypting the body of the program (including relocation information) with a block cipher. The cipher must not be a byte substitution cipher since that is equivalent to a load module. Instead, the cipher must be a large block cipher (product cipher) such as DES. These ciphers insure that a pirate cannot modify an instruction without modifying the adjoining instructions coded for by that block. It is quite probable that this will result in illegal instructions. Additional protection can be achieved if an address dependent large block cipher is used since this prohibits a pirate from interchanging blocks in the distribution form of the program.

Software simulation is the final attack to be analyzed. It would be possible for a pirate to write a program that simulates a security CPU and PUBRAN chip. The pirate could then crack any software customized for his simulated security computer. This attack is eliminated by requiring the manufacturer's digital signature on every PUBRAN unit. This signature would be verified by the software vendor before sending software to the user. The digital signature requires that the manufacturer associate two numbers with every PUBRAN unit. The first is an identifying number. The second is the result of applying the manufacturer's private decryption function to the identifying number. To verify the manufacturer's digital signature, a software vendor would apply the manufacturer's public encryption function to the second number. If it does not yield the identifying number, then the vendor knows that the PUBRAN unit was not made by the manufacturer and thus does not send any software to the user. Note that the CPU need not have any identifying numbers if it is not in the same package as the PUBRAN unit (i.e., separate chips). Also note that the identifying number could be the PUBRAN unit's public encryption function. (The PUBRAN unit's private decryption function is burned into it during manufacture.) If the identifying number is not the PUBRAN unit's public encryption function, then the encryption function will appear as a third number associated with the PUBRAN unit. These two or three numbers could be burned into a ROM inside the PUBRAN, or printed on paper as either numerals or barcode.

OPERATION OF THE FIRST EMBODIMENT

The following describes how the first embodiment of the present invention is used and operated. As has been noted elsewhere, the first embodiment consists of a general purpose security CPU that executes encrypted and unencrypted programs, and the PUBRAN hardware, which translates from a secure distribution format to the execution encryption used by the general purpose security CPU. The PUBRAN hardware has a public encryption key and a private decryption key. The latter is burned into the PUBRAN unit at the time of manufacture. The manufacturer also provides a digital signature number with the PUBRAN unit.

When the user orders software, he sends the PUBRAN's public encryption key, the serial number, and manufacturer's digital signature number to the software vendor. The software vendor then checks the digital signature to determine if the user is using a software simulator or a bonafide PUBRAN unit made by the manufacturer. In the latter case, the software vendor will customize the software for the user's PUBRAN unit and then send it to the user. The format for secure program distribution consists of the body of the program which is encrypted in an address dependent large block cipher (e.g., a product cipher such as DES). This is preceded by a public key preamble containing the encryption/decryption key for the large block cipher. Standard media, such as floppy diskettes, are used for distribution.

To run the software, the user first turns on his computer which will cause the PUBRAN unit to select a new random execution encryption key. This is then communicated to the CPU. Then the operating system would be booted (loaded and executed). Next, the user issues commands to the operating system to load the software package and execute it. This would involve execution of a LEE instruction which loads the public key preamble into the PUBRAN unit. Subsequent execution of a PUBRAN instruction, causes the PUBRAN hardware to translate software from distribution form to execution form. If an attempt is made to overlay a previously loaded program, execution of the PUBRAN instruction creates an error which is detected by the operating system, which in turn notifies the user. If the user insists on overlaying the previously loaded programs, then the operating system will execute a WARMSTART instruction which causea a new random execution key to be generated. (Note that if the operating system itself is encrypted, then it must also be rebooted.) This process is shown in greater detail in Table III.

Any attempt to pirate software will create conditions that will render the computer system temporarily inoperable. This will require the pirate to reload the software and try again. The system is designed such that on the average, many years would be required to pirate a package. The mechanisms that accomplish this have been described in the preceeding discussion in general terms so as to prepare the reader for the more thorough presentation in the section entitled, "First Embodiment - General Purpose Computer System."

TABLE III

System Startup
Startup and loading of a general purpose security computer, which utilizes a separate PUBRAN chip, is given in the following table. Note that OS is an abbreviation for Operating System.

| Step # | Action | CPU Activity | PUBRAN Chip Activity |
|---|---|---|---|
| 1 | powerup (or WARMSTART) | generates one time pad | generates random key for execution encryption/ decryption |
| 2 | | one time pad sent to PUBRAN chip | |
| 3 | | | PUBRAN chip uses one time pad to send execution key to CPU |
| 4 | | CPU wakes up in normal mode. Executes from bootstrap ROM | |
| 5 | | bootstrap buffers encrypted operating system into unused portion of memory | |
| 6 | | bootstrap executes LEE instruction | |
| 7 | | | PUBRAN chip decrypts the public key preamble to retrieve DES key used for distribution encryption of OS |
| 8 | | bootstrap executes PUBRAN instruction | |
| 9 | | | PUBRAN chip then translates from distribution encryption to execution encryption. |

TABLE III-continued

System Startup
Startup and loading of a general purpose security computer, which utilizes a separate PUBRAN chip, is given in the following table. Note that OS is an abbreviation for Operating System.

| Step # | Action | CPU Activity | PUBRAN Chip Activity |
|---|---|---|---|
| 9.1 | | generates and sends another one time pad | The OS is loaded into appropriate memory region |
| 10 | | | PUBRAN chip uses one time pad to send package bounds information to CPU |
| 11 | User has OS load application programs | application program is buffered into memory | |
| 12 | | OS executes LEE instruction | |
| 13 | | | PUBRAN chip decrypts the public key preamble to retrieve DES key used for distribution encryption of application program |
| 14 | | OS executes PUBRAN instruction | |
| 15 | | | PUBRAN chip then translates from distribution encryption to execution encryption. The application program is loaded into appropriate memory region. |
| 16 | | generates and sends another one time pad | |
| 17 | | | PUBRAN chip uses one time pad to send package bounds information to CPU |
| 18 | User accidentally tries to load over existing package | steps 11–14 repeated | steps 11–14 repeated |
| 19 | | | PUBRAN chip indicates that the memory region already contains a loaded package (this is PUBRAN Only Once feature) |
| 20 | | OS gives error message to user | |
| 21 | User wants to erase all packages | OS executes WARMSTART instruction. CPU clears bounds registers | PUBRAN clears bounds registers |
| 22 | | start at step 1 | start at step 1 |

DISCUSSION OF THE SECOND EMBODIMENT

The present invention can also be embodied as a dedicated security computer. Such computers are widely used for controlling devices such as computer terminals (CRTs) and video games. Since these computers are dedicated to executing just one program, which is typically contained in a ROM or PROM, there is no need for the PUBRAN hardware. Elimination of the PUBRAN hardware makes fabrication easier but does require changes in the design of the CPU. The first change to be discussed is the destroy key mechanism. This is followed by an explanation of how encryption or encapsulation can be used to protect proprietary programs. The last item covered is the Interrupt Context Memory.

The destroy key mechanism on the dedicated security computer must render the computer forever inoperable from the moment it detects a condition indicative of automated cracking. This provides the maximum security against a pirate's attack. This total destroy is typically not used on the general purpose security computer since a user would not want his computer destroyed by a bug in a vendor's program. However, in the case of a dedicated application, conditions causing a destroy key will be the result of a pirate's attempt to steal the software. Permanently disabling the CPU is the best way to stop the pirate.

The dedicated security CPU, when it is configured to protect by encryption, is very similar to the general purpose security computer. However, since there is no PUBRAN hardware, a large block cipher (e.g. DES) is not used for software distribution. Instead the software developer encrypts his software with an address dependent byte cipher and burns this into a programmable read only memory (PROM). The encryption key for this cipher is then burned into the CPU for use as the execution key. The lowest address and highest address for the program would also be burned into the CPU for use as the package bounds. The destroy key mechanism would be activated for all conditions described for the general purpose security CPU. The dedicated CPU would be manufactured as one integrated circuit.

Protection by encapsulation is the other possible configuration for the dedicated security computer. In this configuration, all, or at least a significant portion, of the program is burned into a ROM internal to the CPU. The rest of the program is burned into external ROM. Note that all of the software is cleartext (i.e., unencrypted). When the CPU is executing instructions from the internal ROM, it disables all external busses so as not to divulge where it is executing in the internal ROM. Every entry point to the software in the internal ROM must start with a special handshake instruction (HSK). If the HSK instruction is not executed immediately after branching to the interal ROM, then the destroy key mechanism is activated. This prohibits the pirate from deducing the contents of the internal ROM by branching to every instruction. Since a pirate cannot modify the contents of the internal ROM, the HSK instruction can be a single byte instruction. (A multibyte HSK instruction is used in the general purpose security computer since it is difficult to create by modification.) The CPU prohibits execution of instructions from external memory that attempt to fetch values from the internal ROM. Otherwise, the pirate could simply dump the internal ROM.

As with the general purpose security computer, an Interrupt Context Memory (ICM) is required for the dedicated application security computer. The ICM is implemented as it is for the general purpose security computer, although it need not be as extensive. Capability to store one or two interrupt contexts would be sufficient for many applications. The ICM could be eliminated if the CPU architecture did not handle interrupts (i.e., polled I/O design).

MODIFICATION PROBABILITIES

A basic feature of the present invention is that any attempt to pirate an encrypted program will require modification (e.g., an instruction test). The design of the present invention is such that there is a high probability that modification will create conditions that in turn will activate the destroy key mechanism. Thus, the security provided by the present invention is best discussed in terms of probability theory. The first set of equations that are developed apply to modification of instructions. Then formulas for branch address modification are derived, followed by an analysis of order independent and multiple modifications. The closing section analyzes how branch modifications that did not directly change the key can indirectly change the key due to instruction misalignment.

The formulas presented below, which set a lower limit on the security provided by the present invention, were developed using worst case analysis. The worst case is to assume that a pirate has a hypothetical ideal instruction test at his disposal. This ideal instruction test can execute any encrypted instruction and unambiguously determine what the cleartext form of the instruction is without activating the destroy key mechanism. This is truly the worst case, for if a pirate actually had an ideal instruction test available, he would have no need to try to create an instruction test by modification. In practice, a pirate would have to go through a bootstrapping process where a partially working instruction test is used to develop a more complete instruction test. This will involve substantially more errors than will the hypothetical ideal instruction test, and thus in reality a pirate faces even worse odds than dictated by the following formulas.

Consider an attempt to modify one instruction in an encrypted program. Success, as viewed by the pirate, is defined as replacing the instruction with the desired one (also known as the target instruction). Failure is obviously defined as replacement with an instruction that will cause the execution key to be altered. This occurs when a WARMSTART or illegal/unused instruction is executed. Execution of a WARMSTART causes the PUBRAN hardware to generate a new random key whereas an illegal/unused instruction destroys the key. (Note that although the preferred embodiment utilizes many illegal/unused instructions and only one WARMSTART instruction, it is possible to implement the present invention with multiple WARMSTART instructions and no illegal/unused instructions.) In mathematical terms, the number of instructions, I, that will cause the execution key to be altered is:

$$I = N_I + N_W \qquad (1)$$

where $N_I$ represents the number of illegal/unused instructions in the instruction set and $N_W$ is the number of WARMSTART instructions in the instruction set.

The trial and error approach employed by the pirate will stop whenever the target instruction or an instruction that alters the execution key is encountered. Consequently, the probability of success, q, is simply:

$$q = \frac{1}{I+1} \qquad (2)$$

The obvious extension of this is to permit success to be defined as replacement by any element in a set of desired instructions. For this case, the probability of success, q, is:

$$q = \frac{T}{I+T} \qquad (3)$$

where T is the number of instructions in the target set.

Similar equations hold for modification of branch addresses. For an absolute branch, an illegal address is defined as an address outside of the program's bounds. Therefore, the number of illegal addresses, $I_{BA}$, is given by:

$$I_{BA} = M - L \qquad (4)$$

where M is the total address space for the computer, and L is the size of the encrypted program. The probability, $q_{BA}$ for successfully modifying a branch address to a desired value is:

$$q_{BA} = \frac{1}{I_{BA} + 1} . \qquad (5)$$

The following formula applies when modifying a branch address to any of a number of desired values:

$$q_{BA} = \frac{T_{BA}}{I_{BA} + T_{BA}} . \qquad (6)$$

The above formulas pertain only to modification of one instruction or address to a desired value. A realistic attack would involve modifying many instructions and branch addresses. The probability that the pirate will succeed can be represented by q, which in turn is described by the appropriate combination of the above formulas. Note that if the pirate fails, the execution key will be destroyed. This will force the pirate to restart the computer by executing a WARMSTART instruction (which will select a new random key). In this case, information from the preceding attack will not be of value in the current attack. Successive test sequences are independent. Therefore, cracking the system can be modeled as flipping a biased coin which has a probability, q, of landing heads up. Probability theory shows that the average waiting time for a head, is simply 1/q. In other words, on the average, (1/q)−1 tails will be flipped and on the (1/q)th flip, one will get a head. When this is applied to cracking a program on the present invention, this states that on the average, the number of WARMSTARTS, W, before successful modification is:

$$W = 1/q. \qquad (7)$$

Consequently, if the number of illegal instructions or illegal branches is large, the time spent reloading the encrypted program (i.e., executing WARMSTARTS) will limit the number of possibilities that can be tested. Specifically, the time required, t, will be:

$$t = W t_W \qquad (8)$$

where $t_W$ is the time to perform one WARMSTART.

The above formulas pertain only to modification of one instruction or address. If the pirate must modify multiple locations, then the probability of success decreases. Furthermore, assume that the modifications are order independent. This means that each location to be modified must be modified to a specific value, regardless of other modifications. The following two formulas apply to multiple modification of either instructions or branch addresses. They can readily be extended to handle concurrent multiple modification of instructions and branch addresses. The probability of successfully making multiple order independent modifications, $q_{OI}$, is given by:

$$q_{OI}=q^N \qquad (9)$$

where N is the number of modifications to be made. The average number of WARMSTARTS, $W_{OI}$, is:

$$W_{OI}=1/q_{OI}=(1/q)^N. \qquad (10)$$

Multiple modifications can also be made order dependent. For example, a pirate might just desire to create a set of load instructions that can be in any sequence. The equations that apply for order dependent instruction modification are:

$$q_{OD} = \frac{T!}{(I+T)T} = \frac{T! I!}{(I+T)!} \qquad (11)$$

and $$W_{OD}=1/q_{OD}. \qquad (12)$$

Similar equations can be developed for order dependent address modification.

Although the preceeding formulas describe the probabilities for success, one could also consider the probabilities for failure. For example, the probability, p, that a pirate fails on a branch address modification is:

$$p=1-q_{BA}. \qquad (13)$$

PROBABILITY THAT MISALIGNMENT CAUSES DESTROY KEY

When a software pirate modifies a branch address in an encrypted program, the probability that his modification will cause a branch out of bounds, which destroys the execution key, is given by p from (13). If the instruction set contains instructions of varying length, there is an additional way in which a pirate's modification of a branch address can cause the execution key to be destroyed. This situation occurs when an in-bounds branch causes instruction misalignment which terminates with the execution of a destroy key instruction.

This discussion will be limited to a machine that has instructions that are at most three words long,(e.g., 8080, 6800, 6502). A modified branch address will cause one of three circumstances, given it is in-bounds: success when the branch address is to the first byte of an instruction, success when the branch address is not to the first byte of an instruction but the misalignment causes re-alignment, and failure when the branch address is not the first byte of an instruction but misalignment causes execution of a destroy key instruction.

The probability of this failure depends on two sets of probabilities: those that are established by the instruction set alone, and those that derive from the nature of the the encrypted program. The probabilities that depend on the instruction set alone are:

$s_0$—probability of destroy key instruction
$s_1$—probability of one byte instruction
$s_2$—probability of two byte instruction
$s_3$—probability of three byte instruction These are the probabilities of choosing an instruction at random that belongs to a particular class. For example, on the 8080, there are 12 unused opcodes, which will be considered as destroy key instructions, although some of these opcodes might be used for other instructions if the 8080 instruction set were augmented with the features of the present invention. The 8080 has 200 one byte instructions, 18 two byte instructions, and 26 three byte instructions, and so on the 8080:

$$s_0=12/256=0.046875 \qquad (14)$$

$$s_1=200/256=0.781250 \qquad (15)$$

$$s_2=18/256=0.070313 \qquad (16)$$

$$s_3=26/256=0.101562. \qquad (17)$$

The second set of probabilities derive from the distribution of instructions in an encrypted program:

$p_1$—probability of one byte instructions in the program $p_2$—probability of two byte instructions in the program $p_3$—probability of three byte instructions in the program These are the probabilities of choosing an instruction at random from the program. If there are no destroy key instructions in the encrypted program, then the following relationship applies:

$$p_3=1-p_1+p_2). \qquad (18)$$

This will be assumed in the following discussion.

There are three assumptions which simplify the derivation. The first is that the program is infinite (although the probability of branching into it is $1-p$). The second is that the programmer's choice of an instruction in the encrypted program does not depend on the previous instruction (i.e., the probabilities $p_1$, $p_2$, and $p_3$ are independent of the arrangement of instructions in the program). The final assumption is that none of the instructions in the instruction set can cause branches. Clearly, all of these assumptions are untrue, but the results will be reasonable approximations. The first assumption is analogous to a fixed point number representing an infinitely repeating fraction—there will be a small error in the least significant place. The second assumption yields valid results, since it will be shown that $p_1$, $p_2$, and $p_3$ have less of an impact on the result than $s_0$, $s_1$, $s_2$, and $s_3$. The final assumption is an oversimplification. It will be shown that a derivation that eliminates this assumption does not change the result significantly.

Given the three assumptions above, the total probability of an in-bounds branch causing instruction misalignment which terminates with the execution of a destroy key instruction can be computed by finding the two sub-probabilities, A and B:

A—probability that misalignment leads to a destroy key instruction, given that the branch was either to the second byte of a two byte instruction, or to the third byte of a three byte instruction.

B—probability that misalignment leads to a destroy key instruction, given that the branch was to the second byte of a three byte instruction.

A is the probability of branching into the end of an instruction. B is the probability of branching into the middle of an instruction. The following relationships can be stated about A and B:

$$A = s_0 + p_2(s_2 + s_3 p_1)A + p_3(s_2 + s_3 + s_3 p_1)B \quad (19)$$

$$B = s_0 + (s_1 + s_3 p_2)A + s_3 p_3 B. \quad (20)$$

These are simultaneous equations which can be solved:

$$A = \frac{s_0((s_3 p_3 - 1) - p_3(s_2 + s_3 p_1 + s_3))}{D} \quad (21)$$

$$B = \frac{s_0 + (p_2(s_2 + s_3 p_1) - 1 - (s_1 + s_3 p_2))}{D} \quad (22)$$

where:

$$D = (p_2(s_2 + s_3 p_1) - 1)(s_3 p_3 - 1) - (p_3(s_2 + s_3 + s_3 p_1)(s_1 + s_3 p_2)). \quad (23)$$

From (21), (22) and (23), the probability, $p_m$, that an in-bounds branch destroys the execution key can be computed by:

$$p_m = \frac{p_2 A}{2} + \frac{p_3 A}{3} + \frac{p_3 B}{3}. \quad (24)$$

The total chance that the execution key is destroyed (either by misalignment or out of bounds), $p_{tot}$, is given by:

$$P_{tot} = p + p_m(1 - p) \quad (25)$$

where p comes from (13) and $p_m$ comes from (24).

Table IV lists values of $p_m$, using $s_0$, $s_1$, $s_2$, and $s_3$ statistics for the 8080, given in (14) through (17), for all possible values of $p_1$ and $p_2$ in steps of 0.1. The value of $p_3$ is not listed in Table IV, since it can be computed using (18). Table IV illustrates that unless $p_1$ approaches one, the value of $p_m$ stays within the same order of magnitude. As $p_1$ approaches one, $p_m$ approaches zero, since if $p_1$ were one, there would be no opportunity in the program for misalignment.

A typical program will require less than 60 percent of the address space of a computer for storing the actual instructions. If such a typical program were protected with the preferred embodiment of the present invention, the probability, p, from (13) would be at least 0.4. This probability represents the contribution that the bounds hardware makes towards inhibiting a software pirate from modifying a branch address. The probability, $p_m$, from Table IV, represents the contribution that illegal (destroy key) instructions make towards inhibiting branch modification. The value of $p_m$ will typically be less than 0.04. The value of $p_{tot}$ from (25) will be approximately 0.42, however as $p_{tot}$ increases, the significance of $p_m$ decreases.

TABLE IV

| p1 | p2 | | | | | | | |
|---|---|---|---|---|---|---|---|---|
| | .1000 | .2000 | .3000 | .4000 | .5000 | .6000 | .7000 | .8000 |
| .1000 | .0478 | .0444 | .0410 | .0377 | .0346 | .0315 | .0285 | .0255 |
| .2000 | .0413 | .0380 | .0348 | .0317 | .0287 | .0258 | .0229 | |
| .3000 | .0349 | .0318 | .0288 | .0259 | .0231 | .0203 | | |
| .4000 | .0288 | .0259 | .0231 | .0203 | .0176 | | | |
| .5000 | .0229 | .0202 | .0175 | .0149 | | | | |
| .6000 | .0173 | .0148 | .0123 | | | | | |
| .7000 | .0120 | .0096 | | | | | | |

TABLE IV-continued

| p1 | p2 | | | | | | | |
|---|---|---|---|---|---|---|---|---|
| | .1000 | .2000 | .3000 | .4000 | .5000 | .6000 | .7000 | .8000 |
| .8000 | .0070 | | | | | | | |

Illegal (destroy key) instructions alone do not provide adequate protection against branch modification on a machine with instructions that are at most three words long, since $p_m$ is so small. Illegal (destroy key) instructions provide no protection against branch modification on a machine with fixed length instructions. Most protected programs will contain sections of code that a software pirate can use as the precondition setup and the postcondition dump. If a software pirate can use branch modification to get in and out of these sections of code, he may be able to set up an internal instruction test in a reasonable time. To prevent a software pirate from doing this, the preferred embodiment of the present invention includes bounds hardware.

There are three assumptions used in the derivation of (19) through (26). The first assumption is a good approximation for a reasonablely large program. Since Table IV shows $p_m$ is not dramatically affected by $p_1$, $p_2$, and $p_3$ (unless $p_1$ is near one), the second assumption will not cause great changes in the result. The final assumption, that there are no branch instructions in the instruction set, seems unreasonable. There must be branch instructions to allow branch modification in the first place.

The probability that branch modification causes instruction misalignment which terminates when the execution key is destroyed, assuming that there are branch instructions in the instruction set, will now be derived.

This discussion is limited to a machine that has instructions that are at most three words long, and that has absolute branch instructions. With the assumption of branch instructions in the instruction set, there are four circumstances that can occur when a modified branch address is in-bounds: success when the branch address is to the first byte of an instruction, success when the branch address is not to the first byte of an instruction but the misalignment causes re-alignment, failure when the branch address is not the first byte of an instruction but misalignment causes execution of a destroy key instruction, and failure when the branch address is not the first byte of an instruction but misalignment causes execution of a branch instruction whose branch address is out of bounds. Misalignment that causes execution of a branch instruction whose branch address is in-bounds does not terminate this process, and is therefore not included in the above list of terminating conditions.

There are two sets of probabilities that determine the probability of failure: those that are established by the instruction set alone, and those that derive from the nature of the program. The latter probabilities ($p_1$, $p_2$, and $p_3$) are defined above. The probabilities established by the instruction set are different from those defined above.

If the same typical program were protected without bounds hardware, using only illegal (destroy key) instructions, then the value of p would be zero. In such a case, $p_{tot}$ would be equal to $p_m$, which would have a value less than 0.04 in most cases.

The probability that a software pirate succeeds to make a single branch modification is:

$$q = 1 - p_{tot}. \tag{26}$$

For example, with the typical program discussed above, $q=0.6$ for the preferred embodiment, but $q=0.96$ when the program is protected only with illegal (destroy key) instructions. If a software pirate needs to make n branch modifications in order to implement an instruction test, then (7) gives the average number of reloads, W, required. For the preferred embodiment with the typical program this will be:

$$W \approx 1.66^n \tag{27}$$

however with only illegal (destroy key) instructions this will be:

$$W \approx 1.04^n. \tag{28}$$

As n increases, (27) will increase much more rapidly than (28). If a smaller program is being protected, the value for q in the preferred embodiment will be smaller, but the value for q using only illegal (destroy key) instructions will be about the same. Therefore, W will increase even more rapidly as n increases with a small program. Consideration of branch instructions requires including an extra probability, $s_b$, which is the probability that a randomly chosen instruction causes a branch. Assuming that all branch instructions are three words long, $s_3$ must be replaced with $s_3'$, which is the probability of choosing three byte non-branching instructions, including conditional branch instructions that do not branch. The following relationship must be satisfied:

$$s_0 + s_1 + s_2 + s_3' + s_b = 1, \tag{29}$$

and therefore:

$$s_3' = s_3 - s_b. \tag{30}$$

The value of $s_b$ derives from both the static information about the number of branch instructions in the instruction set, and the dynamic information about how often those branch instructions take the branch when they are executed with random condition codes.

The number of branch instructions in the instruction set, $n_b$ is given by:

$$n_b = n_u + n_c \tag{31}$$

where $n_u$ is the number of unconditional branches, and $n_c$ is the number of conditional branches. The value of $s_b$ is given by the following:

$$s_b = s_3 \left( \frac{n_u}{n_b} + p_b \cdot \frac{n_c}{n_b} \right) \tag{32}$$

where $p_b$ is the probability that a conditional branch is taken when the program status word contains random condition codes. On a machine like the 8080, where the decision whether to take the branch depends on only a single bit of the program status word, $p_b = 0.5$. A machine with a more complicated set of branch instructions may have a different value for $p_b$. On the 8080 there are 18 three byte branch instructions, two of which are unconditional, and so on the 8080:

$$s_b = 0.101562(2/18 + 0.5(16/18)) = 0.056423 \tag{33}$$

$$s_3' = 0.101562 - 0.056423 = 0.045138. \tag{34}$$

A is still the probability of branching into the end of an instruction, and B is still the probability of branching into the middle of an instruction. The value $p_m$ cannot be used here. Instead, $p_{tot}'$ is used because it represents the probability of destroying the execution key immediately after a branch. The following system of three equations can be used to solve for A, B, and $p_{tot}'$:

$$A = s_0 + p_2(s_2 + s_3'p_1)A + p_3(s_2 + s_3' + s_3'p_1)B + s_b p_{tot}' \tag{35}$$

$$B = s_0 + (s_1 + s_3'p_2)A + s_3'p_3 B + s_b p_{tot}' \tag{36}$$

$$p_{tot}' = p + (1-p)\left(\frac{p_2}{2} + \frac{p_3}{3}\right) A + (1-p)\frac{p_3}{3} B. \tag{37}$$

Table V shows values of $p_{tot}'-p$, calculated using $s_0$, $s_1$, $s_2$, $s_3'$, and $s_b$ statistics for the 8080, for values of p from 0 to 0.75 in steps of 0.25. When p is equal to zero, the value $p_{tot}'-p$ is analogous to $p_m$, shown in Table IV. Since Tables IV and V show $p_m$ and $p_{tot}'-p$ are nearly the same, the number of reloads, W, will be about the same as (27).

TABLE V

| P = .0000 | | | | | | | | |
|---|---|---|---|---|---|---|---|---|
| | | | | p2 | | | | |
| p1 | .1000 | .2000 | .3000 | .4000 | .5000 | .6000 | .7000 | .8000 |
| .1000 | .0454 | .0425 | .0396 | .0367 | .0339 | .0312 | .0285 | .0258 |
| .2000 | .0393 | .0364 | .0337 | .0309 | .0283 | .0256 | .0230 | |
| .3000 | .0333 | .0306 | .0280 | .0254 | .0228 | .0203 | | |
| .4000 | .0276 | .0250 | .0226 | .0200 | .0175 | | | |
| .5000 | .0221 | .0196 | .0172 | .0148 | | | | |
| .6000 | .0168 | .0145 | .0121 | | | | | |
| .7000 | .0118 | .0095 | | | | | | |
| .8000 | .0070 | | | | | | | |

| P = .2500 | | | | | | | | |
|---|---|---|---|---|---|---|---|---|
| | | | | p2 | | | | |
| p1 | .1000 | .2000 | .3000 | .4000 | .5000 | .6000 | .7000 | .8000 |
| .1000 | .0437 | .0409 | .0381 | .0354 | .0328 | .0301 | .0276 | .0250 |
| .2000 | .0379 | .0352 | .0325 | .0299 | .0273 | .0248 | .0223 | |
| .3000 | .0322 | .0296 | .0271 | .0245 | .0221 | .0197 | | |
| .4000 | .0267 | .0242 | .0218 | .0194 | .0170 | | | |
| .5000 | .0214 | .0190 | .0167 | .0144 | | | | |
| .6000 | .0163 | .0141 | .0118 | | | | | |
| .7000 | .0115 | .0093 | | | | | | |

TABLE V-continued

| .8000 | .0068 | | | | | | | |
|---|---|---|---|---|---|---|---|---|
| | | | | P = .5000 | | | | |
| | | | | | p2 | | | |
| p1 | .1000 | .2000 | .3000 | .4000 | .5000 | .6000 | .7000 | .8000 |
| .1000 | .0354 | .0332 | .0310 | .0288 | .0266 | .0245 | .0224 | .0204 |
| .2000 | .0307 | .0286 | .0264 | .0243 | .0223 | .0202 | .0182 | |
| .3000 | .0262 | .0241 | .0220 | .0200 | .0180 | .01600 | | |
| .4000 | .0218 | .0197 | .0178 | .0158 | .0139 | | | |
| .5000 | .0175 | .0155 | .0136 | .0118 | | | | |
| .6000 | .0133 | .0115 | .0097 | | | | | |
| .7000 | .0094 | .0076 | | | | | | |
| .8000 | .0056 | | | | | | | |
| | | | | P = .7500 | | | | |
| | | | | | p2 | | | |
| p1 | .1000 | .2000 | .3000 | .4000 | .5000 | .6000 | .7000 | .8000 |
| .1000 | .0208 | .0195 | .0182 | .0169 | .0157 | .0144 | .0132 | .0120 |
| .2000 | .0180 | .0168 | .0155 | .0143 | .0131 | .0119 | .0107 | |
| .3000 | .0154 | .0142 | .0130 | .0118 | .0106 | .0095 | | |
| .4000 | .0128 | .0116 | .0105 | .0093 | .0082 | | | |
| .5000 | .0103 | .0092 | .0081 | .0070 | | | | |
| .6000 | .0079 | .0068 | .0057 | | | | | |
| .7000 | .0055 | .0045 | | | | | | |
| .8000 | .0033 | | | | | | | |

Therefore, the conclusion that illegal (destroy key) instructions do not provide adequate protection against branch modifications still is valid with the more accurate model provided by (29) through (37).

The values of $p_{tor}$-p grow smaller as p increases because they have been multiplied by $1-p$. The values of $p_m$ are independent of p. Since the values of $(1-p)p_m$ are of the same order of magnitude as $p_{tor}$-p, the assumption that there are no branch instructions in the instruction set produces reasonable results, even though it is an unreasonable assumption. It should be noted that as p increases, $p_{tor}$-p will be larger than $(1-p)p_m$. For example, if p=0.75, $p_1=0.1000$, and $p_2=0.2000$, the value of $(1-p)p_m$ is 0.0111, but $p_{tor}$-p, from Table V, is 0.0195. The additional circumstance of modification causing execution of a branch instruction whose branch address is out of bounds accounts for $p_{tor}$-p being larger than $(1-p)p_m$.

INSTRUCTION TEST PROGRAM

An instruction test program is the most powerful automated cracking technique which a software pirate can use to circumvent the prior art protection methods. FIGS. 12A and 12B give a general description of the operation of an instruction test program. A suprising result of the instruction sets used in prior art microcomputers is that a software pirate can easily implement an instruction test program that cracks more than ten instructions per second. Two programs will be presented that illustrate in detail the design of such an instruction test program. The first program is a Pascal implementation of an instruction test which could be customized to crack instructions on any of the various popular microprocessors (such as the 6800, 6809, 8080 68000, Z80, Z8000, 8086, etc.) even if augmented with prior art protection methods. However, no such augmented version of a microprocessor is currently available, and so to demonstrate the instruction test in complete detail will require a small amount of simulation.

The second program is an 8080 assembly language implementation of an instruction test which roughly follows the structure of the Pascal program. The 8080 assembly language program can, of course, only crack 8080 instructions. Since there are no 8080 processors augmented with prior art protection hardware, the 8080 assembly language version must simulate the important properties of this hardware. The property simulated in the 8080 assembly language version is that the prior art allows execution of an instruction but conceals, using either encryption or encapsulation, the identity of the instruction from direct inspection. The 8080 assembly version treats unprotected instructions as though they were protected. It executes them, but derives no other information from them.

The Pascal version would typically be run on a separate probe computer, however it could be run on a general purpose system that has a translation (PU-BRAN) unit without using a separate probe computer. The 8080 assembly language version does not need a probe computer since it simulates the protection method.

SEARCH SET

The instruction test sequence for cracking a single instruction requires: establishing a precondition, branching to the instruction in question, executing that instruction, dumping the postcondition, and analyzing the results. When analyzing the results, the instruction test program needs to know what instructions are possible candidates for the cracked instruction. The set of all such possible instructions is called the search set. In a realistic program, the pirate can only assume that the search set is the complete set of legal instructions. An instruction test program running on a probe computer can easily determine when a branch has occured in the protected program since the address at which the next instruction is fetched will not be the successor of the last instruction. It would be difficult for the 8080 assembly version to simulate branch instructions although it is easy for any instruction test to crack branch instructions using a probe computer. Therefore, to simplify the discussion, the programs will not atempt to crack branches.

Similarly, it would be hard for the 8080 assembly language version to simulate multi-byte instructions. Including multi-byte instructions would not change the instruction test program, it would just add trivial but tedious details to the 8080 assembly version. Including memory accessing instructions in the search set would also clutter the 8080 assembly version with useless details that would not be required if a probe computer were present. Therefore, the search set for both the Pascal and 8080 assembly version of the instruction test consists of all the instructions in the 8080 instruction set that are:
1. single byte
2. non-branching
3. non-memory-accessing.

These are 139 such instructions of the 244 legal instructions in the 8080 instruction set. These instructions are the hardest to crack because their results are concealed in the encapsulated CPU.

CHOOSING THE PRECONDITIONS

In order to use an instruction test to crack instructions on a particular computer (in this example, the 8080) the pirate must design a set of preconditions which distinguish all instructions in the search set. It is possible that some of the instructions in the search set will give results identical to those given by other instructions in the search set. For example, there is a partition of eight redundant instructions in the 8080 instruction set. These instructions are: NOP; MOV A,A; MOV B,B; MOV C,C; MOV D,D; MOV E,E; MOV H,H; and MOV L,L. Any of these instructions can be substituted in program for any of the others without changing the results of the program. The instruction test can not distinguish between these instructions, but that does not matter.

Additionally, there are three partitions of instructions which produce nearly identical results. The instructions ADD A and RRL differ only in the way the 8080 handles the flags. The instructions ADC A and RAL also only differ in the way the 8080 handles the flags. The instructions ANA A and ORA A only differ in the way the 8080 handles the half carry flag. It is important that the instruction test be designed properly so that it can distinguish these nearly indistinguishable instructions.

The set of preconditions that an instruction test uses must be carefully designed in order to insure that the instruction test can distinguish all unique instructions in the search set, including nearly identical instructions such as ANA A and ORA A. Before an instruction test can properly crack instructions on a given microprocessor, the pirate must prove that the preconditions in that instruction test are adequate to disambiguate all instructions in the search set. The easiest way to check the adequacy of a set of preconditions is to have a main program call the instruction test procedure using the preconditions in question. The main program will have the instruction test attempt to crack each instruction in the search set. If the result of the instruction test is not the same as the original instruction passed to the instruction test procedure by the main program, then the main program records this discrepancy. Then the pirate can check if the discrepancy was caused by redundant instructions or by nearly identical instructions. If the discrepancy is for a set of nearly identical set of instructions, then the preconditions need to be redesigned because they are not adequate to distinguish all instructions in the search set. The main program given for both the Pascal and 8080 assembly language versions implements this precondition verification. A different main program would be required to actually crack a protected program.

OPERATION OF THE MAIN PROGRAM

The Pascal and 8080 assembly language versions of the instruction test are identical with the exception of a few machine dependent aspects of the 8080. The variable names used in both versions are the same, and so the description of the operation of the Pascal version given below would for the most part apply to the 8080 assembly language version. The details of the 8080 assembly language version are given only where they differ from the Pascal version.

The main program's purpose is simply to verify that the preconditions choosen are adequate. The main program begins by initializing TESTSET to the chosen set of preconditions by calling INITEST. Inside of a loop, the main program repeats a call to the instruction test procedure, INSTEST, for each possible instruction in the search set. The first operation the main program performs in the loop is to regenerate the entire search set, in INSET, by calling INITSET. The rext operation performed in the loop is to find the next untested instruction from the search set. This instruction will be placed into memory in what could be considered a simulation of a PUBRAN operation in a general purpose system. Of course, on the 8080 assembly language version this is simulated by a store, since the instruction is not actually protected. The instruction test procedure, INSTEST, is then called. INSTEST returns the cracked instruction in CRACKED. If CRACKED is not equal to the original instruction, both instructions are recorded in the array ERRLST, and the counter ERRCNT is incremented.

INITIALIZING THE PRECONDITIONS

The procedure INITSET initializes TESTSET, which is an array of records, each one of which represents a precondition which is required to distinguish between certain groups of instructions. In the 8080 version, the values of TESTSET are initialized with DW assembly directives, and so there is no INITSET procedure.

The first precondition in TESTSET (subscript 0) zeros all registers and flags. This allows for checking of increments and decrements since any increment will cause one of the registers to become 01H, and any decrement will cause at least one of the registers to become 0FFH.

The second precondition in TESTSET (subscript 1) is needed to distinguish between two byte increments and one byte increments. This precondition will cause all registers to contain 0FFH. A one byte increment can be distinguished from a two byte increment, since only the two byte increment will cause both registers of a register pair to contain 00H.

The third through eight elements of TESTSET (subscripts 2 through 7) can determine which registers are the distinguished registers, i.e., the register involved in a logical, arithmetic, or move instruction. For example, in the MOV B,C instruction the distinguished registers are B and C. In the ADD C instruction, C is the distinguished register. Additionally, the third through eighth preconditions distinguish between the various logical and arithmetic instructions (other than those with carry and borrow.) The values 3 and 176 (0AAH), in the accumulator and distinguished register, respectively, were choosen for this purpose. The low order four bits of the value 3 are 0011 and the low order four bits of the value 0AAH are 1010. These four bits possess all of the four possible combinations needed to specify a truth table for a boolean function of two variables. Therefore, the low order four bits in the accumulator and the distinguished register differentiate between ANA, ORA, and XRA. This precondition also distinguishes between the ADD and SUB instructions since the high order four bits will yield unique results for these preconditions. These preconditions cannot distinguish between ADD and ADC, since the carry flag is always cleared for these preconditions.

The ninth precondition in TESTSET (subscript 8) distinguishes arithmetic operations with carry from those without carry. It sets the carry, and puts 0AAH in all the registers other than the accumulator, since any of them could have been the distinguished register. If the arithmetic instruction is not affected by the carry, the result will be the same as in one of the above preconditions. However, if the instruction is affected by the carry, the result will uniquely identify the instruction.

The tenth and final precondition in TESTSET (subscript 9) distinguishes between those instructions affected by the half carry flag and those not affected by it. For example, the ANA A and ORA A instructions differ only in the way they affect the half carry.

INSTEST Procedure

INSTEST, the procedure that implements the actual instruction test, differs slightly from the simplified flowchart of the instruction test shown in FIGS. 12A and 12B. INSTEST is slightly more complex because the analyze step has been rearranged to reduce the average time required for INSTEST to crack a protected instruction. Instead of the analyze step being the inner loop and the precondition selection being the outer loop as shown in the flowchart, INSTEST has the precondition selection as the inner loop. Also INSTEST has an exit to the outer, candidate selection, loop whenever the precondition in the inner loop causes the current candidate instruction to fail. Instead of wasting time on this wrong instruction, the early exit allows INSTEST to try the next instruction in the candidate set.

For each of the instructions which is still a candidate, INSTEST tries every precondition from TESTSET. The subscript J is used to index TESTSET. The precondition is stored in PRECOND. INSTEST executes the known candidate instruction by calling the procedure NOREXECUTE. This procedure will set up the preconditions from PRECOND; execute the instruction NORINS; and place the postcondition in NORPOSTC.

Then INSTEST executes the unknown protected instruction by calling ENCEXECUTE. This procedure will set up the precondition from PRECOND; execute the protected instruction ENCINS; and place the postcondition in ENCPOSTC. If NORPOSTC is not equal to ENCPOSTC, the current candidate instruction is removed from INSET, and an early exit from the inner loop occurs.

In the case of redundant instructions, more than one element of INSET will remain after both loops have completed. The last part of INSTEST finds the element of INSET which has the highest opcode, and this instruction will be returned to the main program in CRACKED.

The Pascal version does not include the body of NOREXECUTE and ENCEXECUTE, since these are machine dependent. The 8080 assembly language version implements these procedures by inline substitution of the required POPs (to set up precondtions) and PUSHs (to get the postconditions). The instruction is placed in the program by self modification.

The 8080 version requires 12.5 seconds to execute on a 2MHz processor, cracking 139 instructions in that time. Therefore, it can crack about 11 instructions/sec.

---

```
Program IT(INPUT);
Label 1,2;
Const
  NINST = 255;      (*On 8080 and other byte machines largest
                      value for instruction is OFF hex*)
  MAXTEST = 12;    (*Max number of precond tests required*)
Type
  INSTRUCTION = 0..NINST; (*An instruction opcode field*)
  FLAGS = Record   (*Flags in the 8080 PSW*)
    CARRY: boolean;
    SIGN: boolean;
    ZERO: boolean;
    HCARR: boolean;
    PARIT: boolean
  end;
  REGFLG = Record  (*Registers in an 8080*)
    PSW: FLAGS;
    A: 0..255;
    B: 0..255;
    C: 0..255;
    D: 0..255;
    E: 0..255;
    H: 0..255;
    L: 0..255
  end; TESTSETTYPE = array[0..MAXTEST] of REGFLG;
  INSETTYPE = array[0..NINST] of boolean;
Var
  Testest: Testsettype  (*Set of preconds*)
  NTEST: 0..MAXTEST;          (*How many preconds in
                                TESTSET*)
  COUNT: interger;            (*Loop counter*)
  INSET: INSETTYPE; (*Set of instructions*)
  CRACKED: INSTRUCTION;       (*Cracked instruction from
                                INSTEST*)
  I: INSTRUCTION;             (*Instruction to be cracked*)
  ADDR: 0..65535;             (*Address of protected
                                instruction*)
  ERRCNT: interger;           (*Number of insts where
                                CRACKED <>I*)
  ERRLST: array[1..255,1..2] of INSTRUCTION;
                              (*Instructions that cannot be*)
                              (*cracked uniquely*)
Procedure INITEST(TESTSET: Testsettype
  (NTEST: 0..MAXTEST);
(*This procedure initializes the TESTSET preconditions
that are required to distinguish between the instructions
in the set of instructions being searched (as initialized
by the INITSET routine for the 8080). This routine is
specific to the 8080, but is typical of what is required
for similar machines*)
Var
  NOFLAGS: FLAGS;  (*The PSW when all flags are zero*)
begin
  NTEST:=9;
  NOFLAGS.CARRY:=false;
  NOFLAGS.SIGN:=false;
  NOFLAGS.ZERO:=false;
  NOFLAGS.HCARR:=false;
  NOFLAGS.PARIT:=false;
  (*Distinguish increments and decrements (one byte)*)
  TESTSET[0].A:=0;
  TESTSET[0].PSW:=NOFLAGS;
  TESTSET[0].B:=0;
  TESTSET[0].C:=0;
  TESTSET[0].D:=0;
  TESTSET[0].E:=0;
  TESTSET[0].L:=0;
  TESTSET[0].H:=0;
  (*Distinguish two byte increments and decrements*)
  TESTSET[1].A:=0;
  TESTSET[1].PSW:=NOFLAGS;
  TESTSET[1].B:=-1;
  TESTSET[1].C:=-1;
```

-continued
```
    TESTSET[1].D: = -1;
    TESTSET[1].E: = -1;
    TESTSET[1].L: = -1;
    TESTSET[1].H: = = 1;
(*Distinguish register B*)
    TESTSET[2].A: = 3;
    TESTSET[2].PSW: = NOFLAGS;
    TESTSET[2].B: = 176;
    TESTSET[2].C: = 0;
    TESTSET[2].D: = 0;
    TESTSET[2].E: = 0;
    TESTSET[2].L: = 0;
    TESTSET[2].H: = 0;
(*Distinguish register C*)
    TESTSET[3].A: = 3;
    TESTSET[3].PSW: = NOFLAGS;
    TESTSET[3].B: = 0;
    TESTSET[3].C: = 176;
    TESTSET[3].D: = 0;
    TESTSET[3].E: = 0;
    TESTSET[3].L: = 0;
    TESTSET[3].H: = 0;
(*Distinguish register D*)
    TESTSET[4].A: = ;
    TESTSET[4].PSW: = NOFLAGS;
    TESTSET[4].B: = 0;
    TESTSET[4].C: = 0;
    TESTSET[4].D: = 176;
    TESTSET[4].E: = 0;
    TESTSET[4].L: = 0;
    TESTSET[4].H: = 0;
(*Distinguish register E*)
    TESTSET[5].A: = 3;
    TESTSET[5].PSW: = NOFLAGS;
    TESTSET[5].B: = 0;
    TESTSET[5].C: = 0;
    TESTSET[5].D: = 0;
    TESTSET[5].E: = 176;
    TESTSET[5].L: = 0;
    TESTSET[5].H: = 0;
(*Distinguish register L*)
    TESTSET[6].A: = 3;
    TESTSET[6].PSW: = NOFLAGS;
    TESTSET[6].B: = 0;
    TESTSET[6].C: = 0;
    TESTSET[6].D: = 0;
    TESTSET[6].E: = 0;
    TESTSET[6].L: = 176;
    TESTSET[6].H: = 0;
(*Distinguish register H*)
    TESTSET[7].A: = 3;
    TESTSET[7].PSW: = NOFLAGS;
    TESTSET[7].B: = 0;
    TESTSET[7].C: = 0;
    TESTSET[7].D: = 0;
    TESTSET[7].E: = 0;
    TESTSET[7].L: = 0;
    TESTSET[7].H: = 176;
(*Distinguish arithmetic/carry operations*)
    TESTSET[8].A: = 3;
    TESTSET[8].PSW: = NOFLAGS;
    TESTSET[8].PSW.CARRY: = true;
    TESTSET[8].B: = 176;
    TESTSET[8].C: = 176;
    TESTSET[8].D: = 176;
    TESTSET[8].E: = 176;
    TESTSET[8].L: = 176;
    TESTSET[8].H: = 176;
(*Distinguish Decimal Adjust A as well as ANA A from ORA A*)
    TESTSET[9].A: = 153; (*Hex 99*)
    TESTSET[9].PSW: = NOFLAGS;
    TESTSET[9].PSW.HCARR: = true;
    TESTSET[9].B: = 0;
    TESTSET[9].C: = 0;
    TESTSET[9].D: = 0;
    TESTSET[9].E: = 0;
    TESTSET[9].L: = 0;
    TESTSET[9].H: = 0;
end;
Procedure INITSET(INSET: Insettype;
(*This procedure initializes INSET, the set of instructions
being searched, to those instructions in the 8080
instruction set which are:
    single byte,
    non-branching,
    and non-memory-accessing.
If a probe computer were used this procedure would
simply initialize INSET to all legal instructions*)
Var
    I: INSTRUCTION;
begin
    for I: = 0 to NINST do INSET[I]: = false;
    for I: = 0 to 63 do
        begin           (*rotates, increments, etc.*)
            if mod(I,8) = 4 then INSET[I]: = true;
            if(mod(I,16) < > 1) and (mod(I,2) = 1) then INSET[I]: = true
        end;
    for I: = 64 to 191 do
        begin           (*MOVs, arithmetic and boolean*)
            if mod(I,8) < > 6 then INSET[I ]: =
            true;
        end;
    for I: = 112 to 119 do INSET[I]: = false (*MOV M,x not
        allowed*)
    INSET[0]: = true;      (*NOP*)
    INSET[51]: = false;    (*INX SP not allowed*)
    INSET[52]: = false;    (*INR M not allowed*)
    INSET[53]: = false;    (*DCR M not allowed*)
    INSET[57]: = false;    (*DAD SP not allowed*)
    INSET[59]: = false;    (*DCX SP not allowed*)
    INSET[235]: = true;    (*XCHG*)
end;
(*This procedure cracks the instruction that
resides at address. When that instruction is
equivalent to several others, the one with highest
opcode is chosen. This routine is not dependent on
the 8080 instruction set, and can be used on any
machine, with or without a probe computer.*)
Procedure INSTEST(
    ADDRESS:INSTRUCTION;
    TESTSET:Testsettype;
    NTEST: 0..MAXTEST;
    INSET:Insettype;
    CRACKED:INSTRUCTION);
Label 8;
var
    NORINS, I: INSTRUCTION;   (*Unprotected candidate inst*)
    ENCINS: INSTRUCTION;      (*Unknown protected inst*)
    NORPOSTC: REGFLG;         (*Postcondition of candidate*)
    ENCPOSTC: REGFLG;         (*Postcondition of proctected*)
    PRECOND: REGFLG;          (*Current preconditon*)
    J: interger;              (*Index of PRECOND in
                                TESTSET*)
    GRPCNT: interger;         (*Number of equivalent insts*)
begin
    (*Try each candidate instruction*)
    for NORINS: = 0 to NINST do
        begin
            if INSET[NORINS] then
                begin
                    (*Test every precond to see if postcons are =*)
                    for J: = 0 to NTEST do
                        begin
                            PRECOND: = TESTSET[J]
                            NOREXECUTE(NORINS, PRECOND,
                                NORPOSTC);
                            ENCINS: = memory[ADDRESS];
                            ENCEXECUTE(ENCINS, PRECOND,
                                ENCPOSTC, ADDRESS);
                            if NORPOSTC < > ENCPOSTC then
                                begin
                                    INSET[NORINS]: = false;
                                    goto 8; (*Exit if not equal*)
                                end;
                        end;
                    8:end;
                end;
            (*Count the number of opcodes in INSET and find the highest*)
            GRPCNT: = 0;
    for I: = to NINST do
        begin
            if INSET[I] then
                begin
                    CRACKED: = I;
```

```
            GRPCNT:=GRPCNT+1;
         end;
       end;
    end; (* of INSTEST*)
(*Sample main program.
This main program illustrates how the procedure INSTEST
can be used. This program corresponds to the main
program in the 8080 version. This program
simply shows that the set of preconditions chosen
is adequate to distinguish between all instructions
in the set of instructions being searched.
The program loops through all possible instructions
that INSTEST can distinguish. It protects
and has INSTEST crack each possible instruction.
(In the 8080 version the protection is simulated
by having INSTEST only execute and not otherwise
obtain information from the "protected" instruction
which is not truely protected.) The variable ERRCNT
indicates the number of elements in INSET after
INSTEST executes.*)
begin
   INITEST(TESTSET,NTEST);
   ERRCNT:=0;
   for COUNT:=-1 to NINST do begin
      INITSET(INSET);
      for I:=COUNT+ to NINST do (*Find next inst in INSET*)
         if INSET[I] THEN GOTO 1;
      goto 2;
   1:
      PUBRAN(ADDR, I);                   (*Have PUBRAN place unprotected*)
      INSTEST(ADDR, TESTSET,              (*at ADDR and have INSTEST find*)
         NTEST, INSET,CRACKED);           (*corresponding CRACKED inst*)
      if I<>CRACKED then                  (*If not cracked uniquely,*)
      begin
         ERRCNT:=ERRCNT+1;                (*Increment ERRCNT and*)
         ERRLST[ERRCNT,1]:=I;             (*Save inst which didn't crack*)
         ERRLST[ERRCNT,2]:=CRACKED;
      end;                                (*Next inst comes after current*)
      COUNT:=I;
   end;
2:
                                          (*Output opcodes not uniquely*)
   for COUNT:=1 to ERRCNT do              (*cracked from ERRLST*)
      writeln(ERRLST[COUNT,1],' ',ERRLST[COUNT,2]);
end.
```

```
6800                    ORG    ORIGN+6800H
6800            ;
6800            ;     M A I N
6800            ;
6800            ;    THIS WILL TEST ALL INSTRUCTIONS
6800            ;    IN SEARCH SET TO SEE IF INSTEST CAN
6800            ;    UNIQUELY IDENTIFY EACH ONE
6800            ;    USING THE PRECONDITIONS GIVEN
6800            ;    IN TESTSET
6800            ;    ALL NON-UNIQUE INSTS WILL BE
6800            ;    STORED IN ERRLST (6C00H AS ASSEMBLED)
6800            ;
6800            MAIN       EQU    $
6800  21 3F 69             LXI    H,COUNT
6803  36 FF                MVI    M,-1
6805  21 00 6C             LXI    H,ORIGN+0C00H
6808  22 03 69             SHLD   ERRLST
680B  3E 00                MVI    A,0
680D  32 01 69             STA    ERRCNT
6810  21 00 6F   MLOOP:    LXI    H,INSET
6813  CD 10 69             CALL   INITSET
6816  21 00 6F             LXI    H,INSET
6819  3A 3F 69             LDA    COUNT
681C  6F                   MOV    L,A
681D  2C                   INR    L
681E            ;
681E            ;    FIND NEXT UNTESTED INSTRUCTION
681E            ;
681E  7E        FNEXT:     MOV    A,M
681F  A7                   ANA    A
6820  7D                   MOV    A,L
6821  C2 28 68             JNZ    FOUND
6824  2C                   INR    L
6825  C2 1E 68             JNZ    FNEXT
6828  C3 53 68             JMP    EXITMAIN
682B            ;
```

```
6828                    ;   HAVE INTEST CRACK "PROTECTED" INST
6828                    ;
6828  21 C2 69  FOUND:   LXI H,TSTINS
682E  77                 MOV M,A
682F  32 BF 69           STA COUNT
6832  CD 73 68           CALL INSTEST
6835  3A BC 69           LDA CRACKED
6838  21 BF 69           LXI H,COUNT
683B  BE                 CMP M
683C  CA 10 68           JZ MLOOP
683F                  ;
683F                  ;   INSTEST COULD NOT CRACK UNIQUELY
683F                  ;   SO INCREMENT ERRCNT AND SAVE CURRENT INST
683F                  ;
683F  21 C1 69           LXI H,ERRCNT
6842  34                 INR M
6843  2A C3 69           LHLD ERRLST
6846  77                 MOV M,A
6847  2C                 INR L
6848  3A C2 69           LDA TSTINS
684B  77                 MOV M,A
684C  2C                 INR L
684D  22 C3 69           SHLD ERRLST
6850  C3 10 68           JMP MLOOP
6853                  ;
6853                  ;   OUTPUT OPCODES NOT UNIQUELY CRACKED
6853                  ;   WRHEX OUTPUTS (DE) IN HEX
6853                  ;   OUTCH OUTPUTS B ON DEV #1
6853                  ;
6853  3A C1 69  EXITMAIN:LDA ERRCNT
6856  4F                 MOV C,A
6857  11 00 6C           LXI D,ORIGN+0000H
685A  CD 8D 69  DLOOP:   CALL WRHEX
685D  13                 INX D
685E  CD 8D 69           CALL WRHEX
6861  13                 INX D
6862  06 0D              MVI B,13
6866  CD A3 69           CALL OUTCH
6867  06 0A              MVI B,10
6869  CD A3 69           CALL OUTCH
686C  0D                 DCR C
686D  C2 5A 68           JNZ DLOOP
6870  C3 28 20           JMP MONITOR
6873                  ;
6873                  ;  I N S T E S T
6873                  ;
6873                  ;   PROCEDURE TO CRACK INSTRUCTION
6873                  ;   POINTED TO BY HL AT ENTRY
6873                  ;   THIS ROUTINE MUST RESIDE IN RAM
6873                  ;   SINCE THIS ROUTINE IS SELF-MODIFYING.
6873                  ;   THE PRECONDITIONS ARE IN TESTSET.
6873                  ;   HIGHEST OPCODE EQUIVALENT TO "PROTECTED"
6873                  ;   INST WILL BE RETURNED IN CRACKED
6873                  ;   OLDSTACK IS TEMP STORAGE FOR
6873                  ;     8080 HARDWARE SP. NEEDED ONLY
```

```
6873                    ;       BECAUSE OF CONTEXT SWITCHING--
6873                    ;       NOT PART OF INSTEST ALGORITHM
6873                    ;
6873  7E        INSTEST: MOV  A,M
6874  32 A9 69           STA  ENGINS
6877  21 00 00           LXI  H,0
687A  39                 DAD  SP
687B  22 B0 69           SHLD OLDSTACK
687E  3E 00              MVI  A,0
6880  32 A8 69           STA  NUXINS
6883                    ;
6883                    ;       FOR EACH CANDIDATE
6883                    ;
6883  21 00 6F  IT1:     LXI  H,INSET
6886  3A A8 69           LDA  NUXINS
6889  6F                 MOV  L,A
688A  7E                 MOV  A,M
688B  A7                 ANA  A
688C  CA F3 68           JZ   IT6
688F  21 00 6E           LXI  H,TESTSET
6892  22 BA 69           SHLD J
6895                    ;
6895                    ;       FOR EACH PRECOND IN TESTSET
6895                    ;
6895  3A A8 69  IT2:     LDA  NUXINS
6898  32 A3 68           STA  IT3
689B  2A BA 69           LHLD J
689E                    ;
689E                    ;       SET UP PRECOND FOR NUXINS
689E                    ;
689E  F9                 SPHL
689F  F1                 POP  PSW
68A0  C1                 POP  B
68A1  D1                 POP  D
68A2  E1                 POP  H
68A3                    ;
68A3                    ;       NOP WILL BE REPLACED WITH CANDIDATE
68A3                    ;       INST FROM NUXINS--SAME AS NUXEXECUTE PROG
68A3                    ;
68A3  00        IT3:     NOP
68A4                    ;
68A4                    ;       DUMP POSTCOND INTO NUXPOSTC
68A4                    ;
68A4  31 B2 69           LXI  SP,NUXPOSTC+8
68A7  E5                 PUSH H
68A8  D5                 PUSH D
68A9  C5                 PUSH B
68AA  F5                 PUSH PSW
68AB                    ;
68AB                    ;       SET UP PRECOND FOR ENGINS
68AB                    ;
68AB  3A A9 69           LDA  ENGINS
68AE  32 B9 68           STA  IT4
```

```
6831  2A 3A 69            LHLD J
6834  F9                  SPHL
6835  F1                  POP PSW
6836  C1                  POP B
6837  D1                  POP D
6838  E1                  POP H
6839                ;
6839                ; NOP WILL BE RELPACED WITH "PROTECTED"
6839                ; INST--SAME AS ENDEXECUTE PROC
6839                ;
6839  00          IT4:    NOP
683A                ;
683A                ; DUMP POSTCOND INTO ENDPOSTC
683A                ;
683A  31 3A 69            LXI SP,ENDPOSTC+6
683D  E5                  PUSH H
683E  D5                  PUSH D
683F  C5                  PUSH B
68C0  F5                  PUSH PSW
68C1                ;
68C1                ; COMPARE NORPOSTC WITH ENDPOSTC
68C1                ;
68C1  21 32 69            LXI H,ENDPOSTC
68C4  11 AA 69            LXI D,NORPOSTC
68C7  0E 08               MVI C,8
68C9  1A          IT5:    LDAX D
68CA  BE                  CMP M
68CB  C2 D7 68            JNZ IT6
68CE  23                  INX H
68CF  13                  INX D
68D0  0D                  DCR C
68D1  C2 C9 68            JNZ IT5
68D4  C3 E3 68            JMP IT7
68D7                ;
68D7                ; REMOVE FAILURE FROM INSET
68D7                ;
68D7  21 00 6F    IT6:    LXI H,INSET
68DA  3A A8 69            LDA NORINS
68DD  6F                  MOV L,A
68DE  36 00               MVI M,FALSE
68E0  C3 F3 68            JMP IT8
68E3  2A 3A 69    IT7:    LHLD J
68E6  11 08 00            LXI D,8
68E9  19                  DAD D
68EA  22 3A 69            SHLD J
68ED  7D                  MOV A,L
68EE  FE 50               CPI 80  ;8*NINST+8
68F0  C2 95 68            JNZ IT2
68F3                ;
68F3                ; COUNT NUMBER OF INSTRUCTIONS
68F3                ; IN INSET AND FIND ONE WITH
68F3                ; HIGHEST OPCODE
68F3                ;
68F3  3A A8 69    IT8:    LDA NORINS
68F6  3C                  INR A
```

```
68F7 32 A8 69           STA NORINS
68FA C2 83 68           JNZ IT1
68FD 21 00 6F           LXI H,INSET
6900 36 00              MVI B,0
6902 7E        IT9:     MOV A,M
6903 80                 ADD B
6904 47                 MOV B,A
6905 7E                 MOV A,M
6906 A7                 ANA A
6907 CA 0E 69           JZ IT10
690A 7D                 MOV A,L
690B 32 3C 69           STA CRACKED
690E 2C        IT10:    INR L
690F C2 02 69           JNZ IT9
6912 78                 MOV A,B
6913 2F                 CMA
6914 3C                 INR A
6915 32 C0 69           STA GRPCNT
6918 2A BD 69           LHLD OLDSTACK
691B F9                 SPHL
691C C9                 RET
691D                  ;
691D                  ; I N I T S E T
691D                  ;
691D                  ;   INITIALIZE INSET TO SEARCH SET
691D                  ;   WHICH CONSISTS OF 8080 INSTRUCTIONS
691D                  ;     1. SINGLE BYTE
691D                  ;     2. NON-BRANCHING
691D                  ;     3. NON-MEMORY-ACCESSING
691D                  ;
691D 36 00     INITSET: MVI M,FALSE
691F 2C                 INR L
6920 C2 1D 69           JNZ INITSET
6923 C3 2B 69           JMP INIT1
6926 2E 40              MVI L,64
6928 C3 49 69           JMP INIT4
692B 7D        INIT1:   MOV A,L
692C E6 07              ANI 7
692E FE 04              CPI 4
6930 CA 40 69           JZ INIT2
6933 7D                 MOV A,L
6934 E6 0F              ANI 15
6936 FE 01              CPI 1
6938 CA 42 69           JZ INIT3
693B E6 01              ANI 1
693D CA 42 69           JZ INIT3
6940 36 FF     INIT2:   MVI M,TRUE
6942 2C        INIT3:   INR L
6943 7D                 MOV A,L
6944 FE 40              CPI 64
6946 C2 2B 69           JNZ INIT1
6949 7D        INIT4:   MOV A,L
694A E6 07              ANI 7
694C FE 06              CPI 6
694E CA 53 69           JZ INIT5
```

```
6951  36 FF              MVI  M,TRUE
6953  2C         INIT5:  INR  L
6954  7D                 MOV  A,L
6955  FE C0              CPI  192
6957  C2 49 69           JNZ  INIT4
695A  2E 70              MVI  L,112
695C  36 00      INIT6:  MVI  M,FALSE
695E  2C                 INR  L
695F  7D                 MOV  A,L
6960  FE 78              CPI  120
6962  C2 5C 69           JNZ  INIT6
6965  2E 30              MVI  L,0
6967  36 FF              MVI  M,TRUE
6969  2E 33              MVI  L,51
696B  36 00              MVI  M,FALSE
696D  2C                 INR  L
696E  36 00              MVI  M,FALSE
6970  2C                 INR  L
6971  36 00              MVI  M,FALSE
6973  2E 39              MVI  L,57
6975  36 00              MVI  M,FALSE
6977  2E 3B              MVI  L,59
6979  36 00              MVI  M,FALSE
697B  2E EB              MVI  L,235
697D  36 FF              MVI  M,TRUE
697F  C9                 RET
6980                ;
6980                ;  W R H E X
6980                ;
6980                ;   WRITE (DE) IN HEX
6980                ;
6980  1A         WRHEX:  LDAX D
6981  CD 93 69           CALL HDIG
6984  CD A3 69           CALL OUTCH
6987  1A                 LDAX D
6988  CD 97 69           CALL LDIG
698B  CD A3 69           CALL OUTCH
698E  06 20              MVI  B,' '
6990  C3 A3 69           JMP  OUTCH
6993  0F         HDIG:   RRC
6994  0F                 RRC
6995  0F                 RRC
6996  0F                 RRC
6997  E6 0F      LDIG:   ANI  0FH
6999  C6 30              ADI  '0'
699B  47                 MOV  B,A
699C  FE 3A              CPI  '9'+1
699E  D8                 RC
699F  C6 07              ADI  'A'-'0'-10
69A1  47                 MOV  B,A
69A2  C9                 RET
69A3                ;
69A3                ;  O U T C H
69A3                ;
69A3                ;   PRINT CHAR IN B ON DEV #1
```

```
69A3                    ;
69A3 3E 01      OUTCH:  MVI A,1
69A5 C3 00 23           JMP COUT
69A8                    ;
69A8                            ORG ORIGN+0000H
6000                    ;
6000                    ;   VARIABLES USED IN ALL
6000                    ;   ROUTINES (NO LOCALS)
6000                    ;
6000                    ORIGN   EQU 6000H
6000 00         NORINS: DB 0
6001 00         ENCINS: DB 0
6002            NORPOSIC:DS 8
600A            ENCPOSIC:DS 8
6012 00 00      J:      DW 0
6014 00         CRACKED: DB 0
6015 00 00      OLDSTACK DW 0
6017 00         COUNT:  DB 0
6018            INSET   EQU ORIGN+0F00H
6018 00         GRPCNT: DB 0
6019 00         ERRCNT: DB 0
601A 00         TSTINS: DB 0
601B 00 60      ERRLST: DW ORIGN+0000H
601D                    ORG ORIGN+0E00H
6E00                    ;
6E00                    ;   PRECONDS IN TESTSET
6E00                    ;   (NO INITEST PROS)
6E00                    ;
6E00 02         TESTSET: DB FLAGS
6E01 00                  DB 0
6E02 00 00               DW 0
6E04 00 00               DW 0
6E06 00 00               DW 0
6E08                    ;
6E08 02                  DB FLAGS
6E09 00                  DB 0
6E0A FF FF               DW -1
6E0C FF FF               DW -1
6E0E FF FF               DW -1
6E10                    ;
6E10 02                  DB FLAGS
6E11 03                  DB 3
6E12 00 AA               DW 0AA00H
6E14 00 00               DW 0
6E16 00 00               DW 0
6E18                    ;
6E18 02                  DB FLAGS
6E19 03                  DB 3
6E1A AA 00               DW 0AAH
6E1C 00 00               DW 0
6E1E 00 00               DW 0
6E20                    ;
6E20 02                  DB FLAGS
6E21 03                  DB 3
6E22 00 00               DW 0
6E40                    ;
6E40 03                  DB FLAGS+CARRY
6E41 03                  DB 3
```

```
6E42  AA AA                  DW  0AAAAH
6E44  AA AA                  DW  0AAAAH
6E46  AA AA                  DW  0AAAAH
6E48                    ;
6E48  12                     DB  FLAGS+HCAR
6E49  99                     DB  099H
6E4A  00 00                  DW  0
6E4C  00 00                  DW  0
6E4E  00 00                  DW  0
6E50                    ;
6E50                    ;    VALUES FOR CONSTANTS
6E50                    ;    AND 8080 FLAGS IN PSW
6E50                    ;
6E50            TRUE         EQU  0FFH
6E50            FALSE        EQU  0
6E50            FLAGS        EQU  2
6E50            CARRY        EQU  1
6E50            HCAR         EQU  16
6E50                    ;
6E50                    ;    MONITOR ROUTINES
6E50                    ;      COUT OUTPUTS B TO PRINTER
6E50                    ;      MONITOR IS EXIT WHEN MAIN STOPS
6E50                    ;
6E50            COUT         EQU  2000H
6E50            MONITOR      EQU  2023H
6E50                    ;
6E50                    ;    FOLLOWING REQUIRED TO
6E50                    ;    CIRCUMVENT BUG IN ASSEMBLER
6E50                    ;
6E50            SP           EQU  M
6E50            PSW          EQU  M
6E24  00 AA                  DW  0AA00H
6E26  00 00                  DW  0
6E28                    ;
6E28  02                     DB  FLAGS
6E29  03                     DB  3
6E2A  00 00                  DW  0
6E2C  AA 00                  DW  0AAH
6E2E  00 00                  DW  0
6E30                    ;
6E30  02                     DB  FLAGS
6E31  03                     DB  3
6E32  00 00                  DW  0
6E34  00 00                  DW  0
6E36  00 AA                  DW  0AA00H
6E38                    ;
6E38  02                     DB  FLAGS
6E39  03                     DB  3
6E3A  00 00                  DW  0
6E3C  00 00                  DW  0
6E3E  AA 00                  DW  0AAH
```

FIRST EMBODIMENT

General Purpose Computer System

Referring to FIG. 1, a general purpose computer system includes a general purpose Central Processing Unit (CPU) 1, which is connected to a bi-directional data bus 3 and an address bus 43. In addition, the CPU 1 is connected to a translation unit (PUBRAN) 2, which translates from the public key distribution form of a protected program to the random key execution form. The CPU 1 provides the PUBRAN unit 2 with DMA control information on bus 45 and other information on bus 9. It would be possible for the information sent on bus 9 to be sent instead on bus 3, since the PUBRAN unit 2 is also connected to the address bus 43 and the bi-directional data bus 3.

The general purpose computer system must have memory 150 connected to the address bus 43 and the data bus 3. A significant portion of the memory 150 must be read/write memory (RAM), since all programs must execute from RAM.

In addition, input and output devices may be connected to the address bus 43 and data bus 3. For example, an input/output device 151 is connected to address bus 43 and data bus 3. Several such input/output devices could be included in a general purpose computer system.

General Purpose CPU

Figure 5:
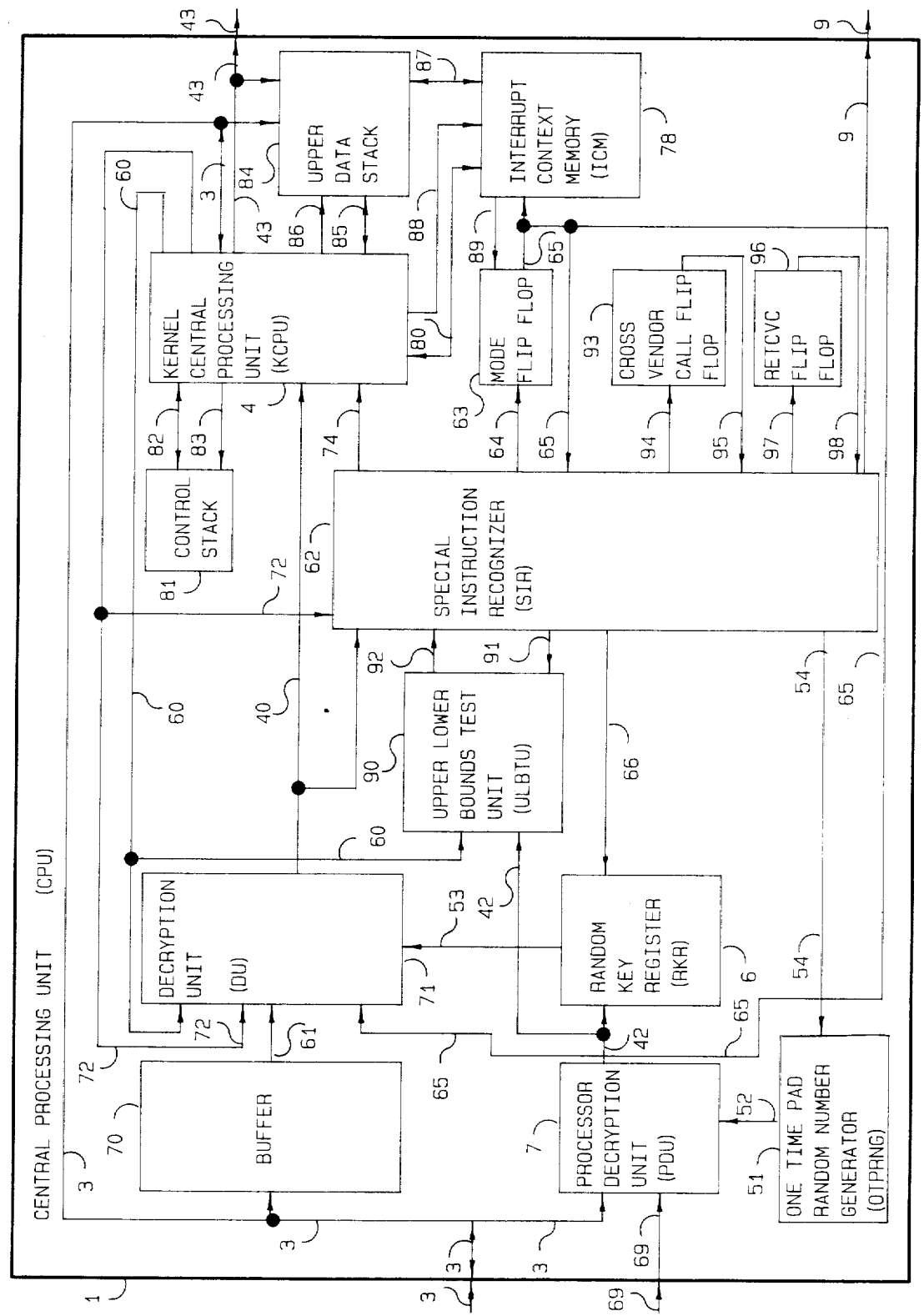
FIG. 5 is a block diagram of the program execution (CPU) hardware used in FIG. 1.

Referring to FIGS. 1 and 5, the CPU 1 consists of Kernel CPU (KCPU) 4 which executes unencrypted instructions, and additional hardware connected to the KCPU which decrypts instructions if the CPU is in the encrypted mode. The KCPU 4 is connected to the external address bus 43 and the external data bus 3. The data bus 3 is used only for the execution cycle of instructions, since the KCPU receives its instructions from the decryption unit (DU) 71 via internal bus 40. The DU 71 will decrypt encrypted instructions, when needed, based on a polyalphabetic non-periodic cipher.

The key for the DU 71 is stored in the RKR 6 which is connected to the DU 71 via bus 53. In some designs, polyalphabetic non-periodic ciphers are implemented by combining the DU 71 and the RKR into a single unit, however one can consider their functions as being logically separate. The DU 71 will only decrypt instructions when the CPU is in the encrypted mode, which is indicated by the mode flip flop 63. The mode flip flop 63 is connected to the DU 71 via internal control bus 65.

The DU 71 uses the address from which the byte was fetched to obtain the non-periodicity required for security. In order to obtain this information, the KCPU 4 sends the value of its program counter via internal bus 60 to the DU 71.

The KCPU 4 sends a signal to the DU 71 via bus 72 which indicates whether the byte being fetched on bus 40 is an instruction field, an operand field (including non-branch address fields), or a branch address field. The DU 71 uses this signal to decide which of three polyalphabetic ciphers to use for decrypting the byte. If the signal on bus 72 indicates the byte on bus 40 is an instruction field, the DU 71 decrypts the byte using the instruction field polyalphabetic non-periodic cipher. If the signal on bus 72 indicates the byte on bus 40 is an operand field (including non-branch address fields), the DU 71 decrypts the byte using the operand field polyalphabetic non-periodic cipher. However, if the signal on bus 72 indicates the byte on bus 40 is part of an address field of a branch instruction, the DU 71 decrypts the address as a unit instead of one byte at a time.

To accomplish this, additional information is provided on bus 72 when the byte on bus 40 is part of a branch address field. This information indicates if the byte is the first or second byte of the branch address (assuming a 16 bit address). The DU 71 will decrypt only after getting both bytes.

This discussion assumes that a byte is eight bits long and that branch addresses are 16 bits long. There are many variations of byte and address lengths that would not depart from the spirit of this invention. For example, if the byte length is six, and the address length is 18 bits, the DU 71 would fetch three bytes (6 bits each) before it would decrypt a branch address.

The preferred embodiment of the DU 71 as described above implements the polyalphabetic cipher for branch addresses so that they are enciphered as a unit. On a system that has memory addresses longer than two bytes, an alternative embodiment of the DU 71 would encrypt the low order two bytes of the branch address as a unit and encrypt the upper bytes of the branch address separately. This would not provide as much security as the preferred embodiment as it would allow the user to potentially branch to two or more places in a vendor's package without danger of destroying the random key and the registers and flags in the KCPU 4. However, this is not as dangerous as allowing the user to modify each byte separately, and so the manufacturer might choose to implement this alternative embodiment of the DU 71 to reduce the amount of hardware required.

When the KCPU 4 requests an instruction fetch, it provides the address from which that instruction is to be fetched (KCPU's PC) on both the internal bus 60 and the external address bus 43. This address is sent to the external memory in the computer system, which will then provide the value of the instruction byte on the external data bus 3. The instruction buffer 70 inside the CPU 1 can then load this value. The instruction buffer 70 is connected to the DU 71 via bus 61. If the mode flip flop 63 indicates the CPU is executing instructions in the non-encrypted mode, the DU 71 simply passes the instruction given to it by the instruction buffer 70 without modification. The DU 71 passes this instruction to the KCPU 4 via bus 40, and the KCPU can then execute the instruction.

If the mode flip flop indicates the CPU is executing instructions in the encrypted mode, the DU 71 must perform the polyalphabetic non-periodic cipher decrypt operation. The cipher used depends on whether the byte to be fetched is an instruction field, an operand field, or a branch address field.

The DU 71 obtains the information required to choose the proper polyalphabetic cipher from the internal bus 72. In any case, the non-periodicity of the polyalphabetic cipher will in part be based on the value of the KCPU's PC sent via bus 60. The DU 71 sends the decrypted form of the instruction to the KCPU 4 via bus 40.

The extra instructions added to the KCPU's instruction set that implement the operations specific to the preferred embodiment of the present invention require special processing. The KCPU 4 could be augmented to handle these special instructions, however to illustrate the invention these special instructions will be implemented outside the KCPU.

The same bus which connects the DU 71 to the KCPU 4 will provide the instructions to the extra hardware for processing special instructions. This internal data bus 40 is connected to the Special Instruction Recognizer (SIR) 62. As shown in Table VI, the SIR 62 will recognize the following special instructions: CVC, Destroy Key, HSK, LEE, PUBRAN, RESINT, RETCVC, SWITCH and WARMSTART. Also, the SIR 62 will recognize certain instructions in the KCPU's instruction set, such as indirect branches and relative branches. The special instructions are treated as NOPs by the KCPU, but the instructions which both the KCPU 4 and the SIR 62 recognize require processing by both units.

In addition to the deciphered instruction from bus 40, the SIR 62 receives the mode flip flop bit via bus 65 from the mode flip flop 63. The SIR 62 is also connected to the internal bus 72, which indicates if the instruction byte on bus 40 is part of an instruction field, an operand field (including non-branch address fields), or a branch address field.

When the internal bus 72 indicates the byte on bus 40 is an instruction field, the SIR 62 attempts to recognize it. If the instruction is a PUBRAN or a LEE, the SIR 62 sends an instruction via external bus 9 to the PUBRAN Chip 2 that tells the PUBRAN Chip to perform the operation. The SIR 62 also recognizes the WARMSTART instruction which tells the PUBRAN Chip 2 to reinitialize itself as it does at power up.

TABLE VI

| Instructions Recongnized by SIR that are not in Instruction Set of KCPU | |
|---|---|
| CVC | Cross Vendor Call |
| Destroy Key | Destroy Key (illegal instructions) |
| HSK | HandShaKe |
| LEE | Load Encrypted Encryption |
| PUBRAN | PUBlic to RANdom translate |
| RESINT n | REStore N'th INTerupt context |
| RETCVC | RETurn from Cross Vendor Call |
| SWITCH | SWITCH from encrypted mode to unencrypted mode and vice versa |
| WARMSTART | same as power up sequence |

The SIR 62 causes the KCPU to wait while the information required for the LEE or PUBRAN instruction is transferred to the PUBRAN Chip 2.

If the SIR 62 recognizes the instruction on bus 40 as one of the several "Unimplemented (Illegal) Destroy Key" Instructions, the SIR 62 issues commands via bus 66 which will cause the RKR 6 to destroy the randomly chosen key, and via bus 74 to destroy the registers and flags in the KCPU 4.

If the mode flip flop 63 which is connected to the SIR 62 via bus 65 indicates the CPU is executing in the encrypted mode, and the SIR 62 recognizes an instruction on bus 40 which is any type of indirect branch, the SIR 62 will issue a command on busses 66 and 74 which will destroy the randomly chosen key in the RKR 6 and the registers and flags in the KCPU 4, respectively. If the SIR 62 recognized the same indirect branch instruction when the mode flip flop 63 indicated the CPU was in unencrypted mode, the SIR 62 would not interfere with the KCPU's execution cycle in any way. In other words, the SIR 62 will permit indirect branches only when they are executed in the unencrypted mode.

When the SIR 62 recognizes a CVC instruction, the SIR 62 will set a special flip flop 93, via bus 94, that indicates cross vendor branching is about to occur. The reason this happens is to tell the SIR 62 during the next instruction fetch that out of bounds branching will be permitted, and that the Upper Lower Bounds Test Unit (ULBTU) 90 must search its table to establish the correct upper/lower bound. Also, when the SIR 62 recognizes a CVC instruction, the SIR 62 issues a command on bus 74 that destroys the registers and flags in the KCPU 4. The KCPU 4 treats the CVC instruction like a call instruction. When the KCPU 4 executes a CVC instruction the return address (the address of the first byte after the complete CVC instruction) is pushed on the control stack 81 by incrementing the stack pointer output on bus 83. The return address is then sent to the control stack on bus 82. The KCPU then requests the plaintext target address of the CVC, which follows in the two bytes immediately after the CVC instruction field. To do this, the KCPU 4 issues a command on bus 72 which indicates to the DU 71 that the next two bytes should not be decrypted. This causes the DU 71 to pass the information from bus 61 to bus 40 without modifying it, just as it would if the CPU were in the unencrypted mode. The KCPU 4 uses the target address composed of the two bytes received from bus 40 to load its program counter, thereby causing a branch.

When the SIR 62 recognizes a RETCVC instruction, the SIR 62 will set the flip flop 96 to indicate cross vendor branching is about to occur. Also, the SIR 62 issues a command on bus 74 that destroys the registers and flags in the KCPU 4. The KCPU 4 treats the RETCVC instruction like a return instruction. When the KCPU 4 executes a RETCVC instruction the return address (from the corresponding CVC) is popped off the control stack 81 by fetching it from bus 82. This address is used to load the program counter in the KCPU 4, thereby causing a branch. The stack pointer output on bus 83 is then decremented by the KCPU 4.

When the SIR 62 recognizes a SWITCH instruction that occurs in encrypted mode, as indicated by the mode flip flop 63, the SIR 62 will toggle the flip flop 63 by issuing a command on bus 64, and the SIR 62 will destroy the registers and flags in the KCPU 4 by issuing a command on bus 74. The SIR 62 will clear flip flop 93 by issuing a command on bus 94, since bounds do not have to be established once execution begins in the unencrypted program that follows the SWITCH instruction.

When the SIR 62 recognizes a SWITCH instruction that occurs in the unencrypted mode, as indicated by the mode flip flop 63, the SIR 62 will set the flip flop 93 as though a cross vendor branch was about to occur. The SIR 62 does this in addition to what it would do regardless of the direction of the switch: toggle the mode flip flop 63 and destroy the registers and flags in KCPU 4. Flip flop 93 is set in order to establish the correct upper and lower bounds, and require the eight byte HSK instruction to immediately follow the SWITCH instruction, just as an HSK is required at the target of a CVC instruction.

When the SIR 62 recognizes any instruction, other than CVC, RETCVC, or SWITCH, the SIR 62 will clear the flip flops 96 and 93 by issuing commands on busses 97 and 94.

When the internal bus 72 indicates to the SIR 62 that an instruction is being fetched, the SIR 62 checks if the address of the instruction lies within the current upper/lower bounds for the vendor's package. To do this, the SIR 62 sends a command on command bus 91 to the Upper Lower Bounds Test Unit (ULBTU) 90. The ULBTU 90 will test if the KCPU's PC on internal bus 60 is less than the current upper bound and greater than or equal to the current lower bound. The ULBTU 90 will send the result of this bounds test back to the SIR 62 via bus 92.

When the CPU is in the unencrypted mode, as indicated on bus 65, the SIR 62 will ignore the result of the bounds test on bus 92. When the CPU is in the encrypted mode, as indicated on bus 65, and the result of the bounds test on bus 92 indicates the instruction being fetched is within the bounds of the current package, the SIR 62 allows the KCPU 4 to execute the instruction normally. If this instruction is one of the special instructions that the SIR 62 recognizes, the SIR 62 will process it as described elsewhere.

When the CPU is in the encrypted mode, as indicated on bus 65, and the result of the bounds test on bus 92 indicates the instruction is outside of the bounds of the package, the action the SIR 62 takes depends on the status of the flip flops 96 and 93. If both flip flop 96, which is connected to the SIR 62 via bus 98, and flip flop 93, which is connected to the SIR 62 via bus 95, are cleared, the SIR 62 will issue a command on bus 66 to destroy the random key in the PKR 6 and also issue a command on bus 74 to destroy the registers and flags in the KCPU 4. The condition with flip flops 96 and 93 cleared indicates the last instruction was not a CVC, RETCVC, or SWITCH. Both the random key and the registers and flags in the KCPU must be cleared when a branch out of bounds without proper handshaking is attempted.

If the flip flop 96 is set but flip flop 93 is cleared, indicating the last instruction was a RETCVC, the SIR 62 will issue a command on bus 74 to destroy the registers and flags in the KCPU 4. The random key in the RKR 6 is not changed. Also, the SIR 62 issues a command on control bus 91 that instructs the ULBTU 90 to search its memory for the correct new upper/lower bounds that correspond to the new PC address on bus 60.

If the flip flop 96 is cleared but flip flop 93 is set, indicating the last instruction was a CVC or SWITCH, the SIR 62 checks if the current decrypted instruction on bus 40 is an HSK (eight bytes long). If the SIR 62 recognizes the instruction on bus 40 as an HSK, the SIR 62 will issue a command on bus 74 to destroy the registers and flags in the KCPU 4. The random key in the RKR 6 is not changed. Also, the SIR 62 issues a command on control bus 91 that instructs the ULBTU 90 to search its memory for the correct new upper/lower bounds that correspond to the new PC address on bus 60. While the ULBTU 90 is searching its memory for the correct new upper/lower bounds, the SIR 62 is simultaneously fetching eight bytes of HSK. If at any point during this time the SIR 62 recognizes an instruction byte on bus 40 that is not part of the eight bytes of HSK, the SIR 62 issues commands on bus 74 to destroy the registers and flags in the KCPU 4 and on bus 66 to destroy the random key in the RKR 6. It should be noted that the decrypted form of the seven bytes that occur after the first byte of the HSK need not be the same as the first byte.

The fourth possible combination for setting flip flops 96 and 93, when both are set, cannot occur. This is due to the fact that they are set according to the last instruction recognized by the SIR 62, which must be one of the three cases described above.

When the SIR 62 recognizes a relative branch instruction on bus 40, the SIR 62 tests if the branch is within the permitted range for relative branches. If it is within the permitted range, the SIR 62 allows the KCPU 4 to perform the instruction. If the branch is not within the permitted range, the SIR 62 sends a command on bus 66 that clears the random key in the RKR 6 and the SIR 62 also sends a command on bus 74 that clears the registers and flags in the KCPU 4. By doing this, the SIR 62 implements a bounds test for relative branch instructions analogous to the bounds test that the ULBTU 90 implements for absolute branch instructions.

The KCPU 4 uses two special memories for storing values that are pushed and popped from stacks: the Control Stack and the Upper Data Stack. Both of these memories are internal to the CPU so the contents of these stacks cannot be directly read by the user. The Control Stack 81 is used for storing return addresses for subroutines while the Upper Data Stack 84 is used for user PUSH and POP operations. The Control Stack 81 holds all return addresses for the CPU at any time during execution so that the user is never allowed to jam a return address into the CPU, which would reintroduce the branch security problems that the upper lower bounds eliminated. The Upper Data Stack 84 contains only a portion of the user's data stack since that is all that is required to provide reasonable security.

When the KCPU recognizes a CALL instruction it will push the return address on the Control Stack 81 by incrementing the stack pointer which the KCPU 4 provides to the Control Stack 81 via bus 83. Bus 82 sends the return address from the KCPU 4 to the Control Stack 81.

When the KCPU 4 recognizes a return instruction, it will pop the return address off the Control Stack 81 by decrementing the stack pointer on bus 83. Bus 82 sends the return address back to the KCPU 4 from the Control Stack 81.

The Upper Data Stack 84 is more complicated than the Control Stack since it only holds a certain number (16 for example) of the elements at the top of the user's data stack and sends the rest of the elements out to memory as the stack fills up. When the KCPU 4 recognizes a PUSH operation, it increments (or decrements) the stack pointer provided to the Upper Data Stack 84 via bus 86 from the KCPU 4. The Upper Data Stack 84 will push the value at the bottom of its internal memory out into memory by providing the address where this value is to be stored on address bus 43. The value at the bottom of the Upper Data Stack is sent to memory via external data bus 3. Having made room for the new value, the Upper Data Stack 84 can accept the newly pushed value from the KCPU 4 which is sent via bus 85.

When the KCPU 4 recognizes a POP operation, it decrements (or increments) the stack pointer provided to the Upper Data Stack 84 via bus 86 from the KCPU 4. The Upper Data Stack 84 will send the value from the top of the stack back to the KCPU 4 via bus 85. Having made room for the last value pushed into external memory, the Upper Data Stack 84 will pop the last value pushed into external memory by providing the address where the value was stored on address bus 43. The value is retrieved from memory via external data bus 3, and the Upper Data Stack 84 places this value at the bottom of its memory.

When an interrupt occurs, the CPU has a special memory for storing the registers and flags, called the Interrupt Context Memory 78. All of the KCPU's registers and flags will be saved in the ICM as well as the contents of the Upper Data Stack and the current mode flip flop bit. When the KCPU 4 recognizes an interrupt, it sends a signal to the ICM 78 via bus 88. The KCPU 4 also sends all of its internal registers and flags that must be restored upon return from the interrupt via bus 80 to the ICM 78.

In addition, the ICM 78 will receive the top of the user data stack from the Upper Data Stack 84 via bus 87. Also the ICM 78 saves the current mode flip flop bit which it obtains from bus 65. The values in the KCPU 4 and UDS 84 are destroyed.

When the interrupt return occurs, the ICM will restore the mode flip flop via bus 89. In addition, the ICM 78 will restore the entire contents of the Upper Data Stack 84 via bus 87. The ICM 78 will restore the internal registers and flags in the KCPU 4 via bus 80. The ICM 78 will always restore interrupt contexts as a unit, but will allow the operating system to choose which context the ICM will restore (of the limited number the ICM can store in its memory). This allows for the implementation of multiprogramming.

There are many protocols for restoring interrupt contexts that could be implemented. For example, when an interrupt occurs the context is saved in the ICM in the i'th of n context memories. The value of the registers and flags are cleared for security reasons, and the number i is placed in an accumulator (or the top of the user data stack). The interrupt procedure can then know which context to restore in order to return back to the process interrupted at that point. A special instruction, RESINT, takes as its operand some value j less than or equal to n, and uses the j'th interrupt context memory in the ICM to restore the previous context. The system programmer can choose values of j in his interrupt routines to implement multiprogramming. A simple interrupt routine would always have j equal to i so that the RESINT returns back to the most recently interrupted routine.

Before execution of the interrupted instruction resumes, the SIR 62 issues a command on bus 91 to the ULBTU 90 that causes the ULBTU 90 to search its memory to re-establish the bounds for the interrupted package. When the signal on bus 92 indicates that the ULBTU has found the bounds for the interrupted package, the SIR 62 allows the KCPU 4 to continue executing at the point at which it was interrupted.

If the SIR 62 recognizes a RESINT instruction with a value of j that has been restored before (indicated by a bit in the ICM 78 for each j), the SIR 62 issues commands on busses 74 and 66 to clear the registers and flags in the KCPU 4 and the RKR 6.

Figure 6:
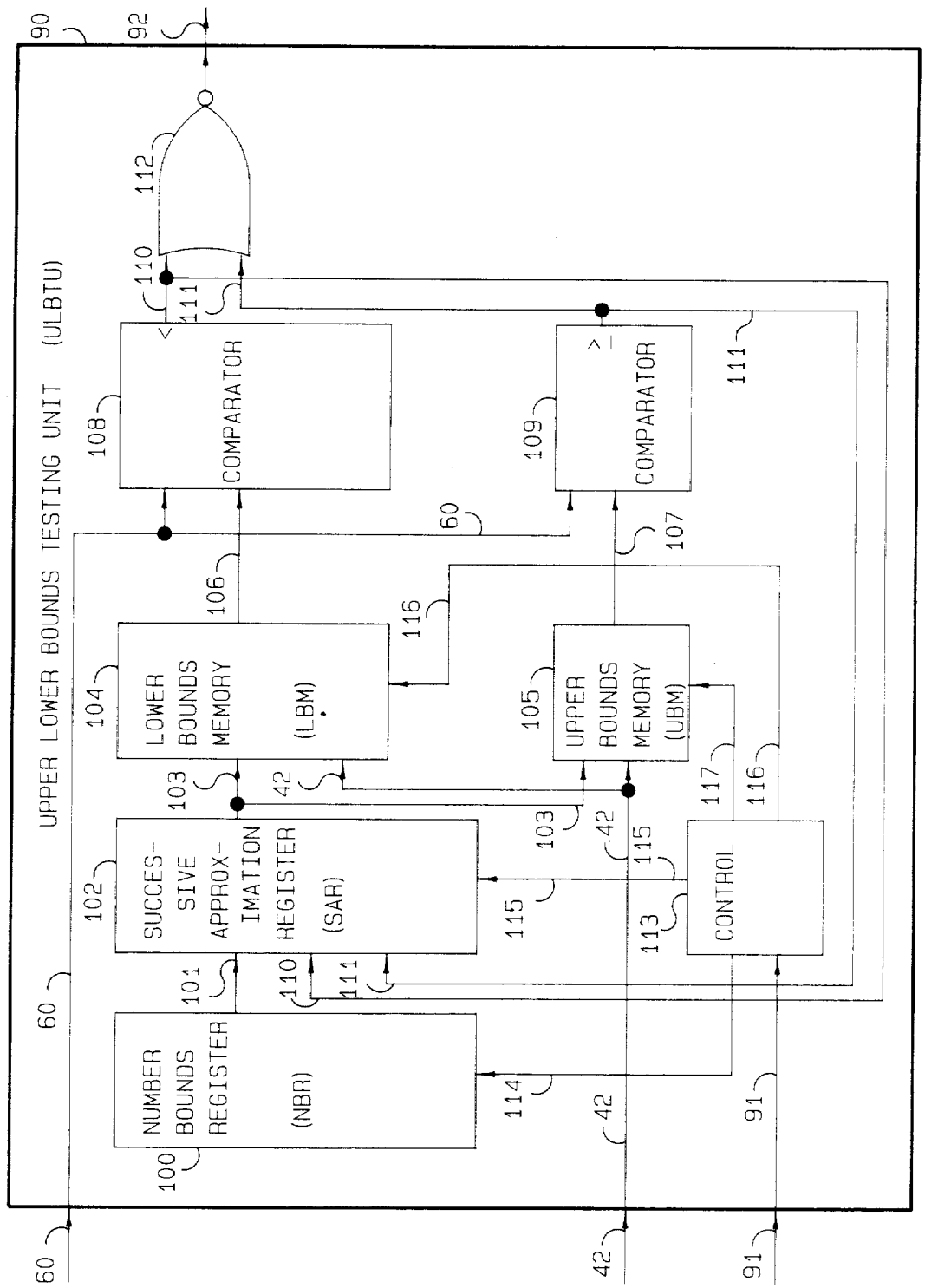
FIG. 6 is a block diagram of the upper lower bounds test unit (ULBTU) used in the program execution (CPU) hardware of FIG. 5.

Referring the FIGS. 5 and 6, the ULBTU 90 tests if the address of the current instruction on bus 60 is within the bounds of the current package. The SIR 62 issues a command on bus 91, when the SIR 62 encounters a CVC, RETCVC or SWITCH instruction, which causes the ULBTU 90 to search for the proper bounds that correspond to the address of the current instruction on bus 60. The SIR 62 also issues a command on bus 91, when the SIR 62 encounters a PUBRAN instruction, which causes the ULBTU 90 to load its internal memory with the bounds corresponding to the vendor package being loaded by the PUBRAN instruction.

The control bus 91, from the SIR 62, is connected to the ULBTU controller 113. The ULBTU controller 113 can issue commands to: the Number Bounds Register (NBR) 100 via control bus 114, the Successive Approximation Register (SAR) 102 via control bus 115, the Lower Bounds Memory (LBM) 104 via control bus 116, the Upper Bounds Memory (UBM) 105 via control bus 117.

During a WARMSTART operation, the ULBTU controller 113 issues a series of commands on busses 114, 115, 116 and 117 the effect of which is to load all elements of the LBM 104 and the UBM 105 with zeros, indicating there are no encrypted packages currently loaded into memory. Also, at the end of the WARMSTART operation, the NBR will be cleared by a command from the controller on bus 114. The NBR 100 indicates the number of encrypted packages currently loaded into memory, and is the address into the LBM 104 and the UBM 105 where the next upper lower bound pair will be stored. The coldstart operation is identical to the WARMSTART operation.

When the SIR 62 encounters a PUBRAN instruction, it causes the PUBRAN Chip 2 to load a vendor's package into memory under the common random key used for all encrypted packages. When the PUBRAN Chip 2 has completed this operation, it knows the length of the package it just loaded. The PUBRAN Chip 2 sends this in encrypted form to the PDU 7 which produces the decrypted form of the upper and lower bounds of the current package on bus 42. This information is then available to the ULBTU 90. The SIR 62 will instruct the ULBTU 90 when it can load the upper and lower bounds by issuing a command on bus 91. The ULBTU controller 113 will respond to the command on bus 91 by issuing commands on busses 116 and 117 that cause the LBM 104 and the UBM 105, respectively, to write the upper and lower bounds from bus 42 into their memories. During the operation the controller 113 also issues a command on bus 115 which will cause the SAR 102 to pass the contents of the NBR 100 from bus 101 to bus 103. The LBM 104 and the UBM 105 can then use the value of the NBR as the address where the new upper and lower bounds will be stored. After the write operation to the LBM 104 and the UBM 105 completes, the controller 113 issues a command on bus 114 that increments the NBR 100, if there is still room in the LBM and UBM for more packages.

The SIR 62 will issue a command to the ULBTU 90 via bus 91 to search for a new set of upper and lower bounds when the following conditions are met:

(a) The CPU is in the encrypted mode.

(b) The last instruction was CVC, RETCVC, or SWITCH.

(c) The address of the instruction, on bus 60, is out of the bounds of the current package.

When the controller 113 receives the command via bus 91 to perform the search for the new bounds, the controller 113 issues a command on bus 115 that causes the SAR 102 to begin the search operation.

The SAR 102 could be implemented as a simple counter, if the manufacturer decides that a linear search of the UBM and LBM would be fast enough. However, higher speed could be realized with a binary search, which requires that the SAR 102 be implemented as a true Successive Approximation Register, similar to those used in Analog to Digital Converters. The SAR 102 has an additional feature not found on Successive Approximation registers used on Analog to Digital Converters: it can stop before the SAR cycle is completely over, in some cases. This is due to the fact that it is possible to find when the bounds have been located, exactly, as opposed to the approximate nature of Analog to Digital conversion.

The SAR 102 has two inputs which determine how the search will proceed: bus 110, which indicates that the desired bounds is at a lower address than the current address output by the SAR 102 on bus 103, and bus 111, which indicates that the desired bounds is at a higher address than the current address output by the SAR 102 on bus 103.

If the signal on bus 110 indicates the bounds reside at a lower address than the address on bus 103, the SAR 102 will use the next lower address in the binary search sequence. For example, if the address on bus 103 were 1100, the next binary search sequence would be 1010. If the signal on bus 111 indicates the bounds reside at a higher address than the address on bus 103, the SAR 102 will choose the next higher address in the binary search sequence. For example, if the address on bus 103 were 1100, the next binary search sequence would be 1110. If neither bus 110 nor bus 111 are active, then the SAR 102 has found the correct bounds. The SAR 102 will continue to output the address of these new bounds until instructed by bus 115 to begin a new binary search.

The address output by the SAR 102 on the bus 103 is conected to the LBM 104 and the UBM 105. The contents of the LBM 104 at that address is output on bus 106, and the contents of the UBM 105 at that address is output on bus 107. The lower bounds on bus 106 is compared with the current address on bus 60 by a comparator 108. The result of a less than comparison is output on bus 110, which is fed back into the SAR 102. The upper bounds on bus 107 is compared with the current address on bus 60 by another comparator 109. The result of a greater than or equal comparison is output on bus 111, which is fed back to the SAR 102. Bus 110 and bus 111 are also inputs to a NOR gate 112, whose output on bus 92 indicates if the address on bus 60 is within the bounds of the package indicated by the address on bus 103. The SIR 62 is connected to the NOR gate 112 in the ULBTU 90 via bus 92. During the binary search operation in the ULBTU 90, the SIR 62 waits for the signal on bus 92 to come true, indicating the search has completed. At all other times when an instruction is being fetched the SIR 62 expects that the signal on bus 92 will be true. If it is not true and the CPU is in the encrypted mode, the SIR 62 will either initiate the binary search operation, if the last instruction was CVC, RETCVC, or SWITCH, or destroy the random key in the RKR 6 and the registers and flags in the KCPU 4 otherwise.

The amount of memory required for the UBM 105 and the LBM 104 can be reduced by storing only the high order bits of the upper and lower bounds. For example, on a machine with sixteen address bits, the high order eight bits of the upper and lower bounds of a package would be stored in the UBM 105 and LBM 104, respectively. This would imply that the vendor's package would pad out the remaining portion of the 256 byte block at the end of the package, since the next package must start at an address that is a multiple of 256. Notice that in this embodiment a package must be at least 256 bytes long in order for the bounds comparison to work properly. The tradeoff is between external memory, which is plentiful, and internal physically secure memory, which is not.

Figure 2:
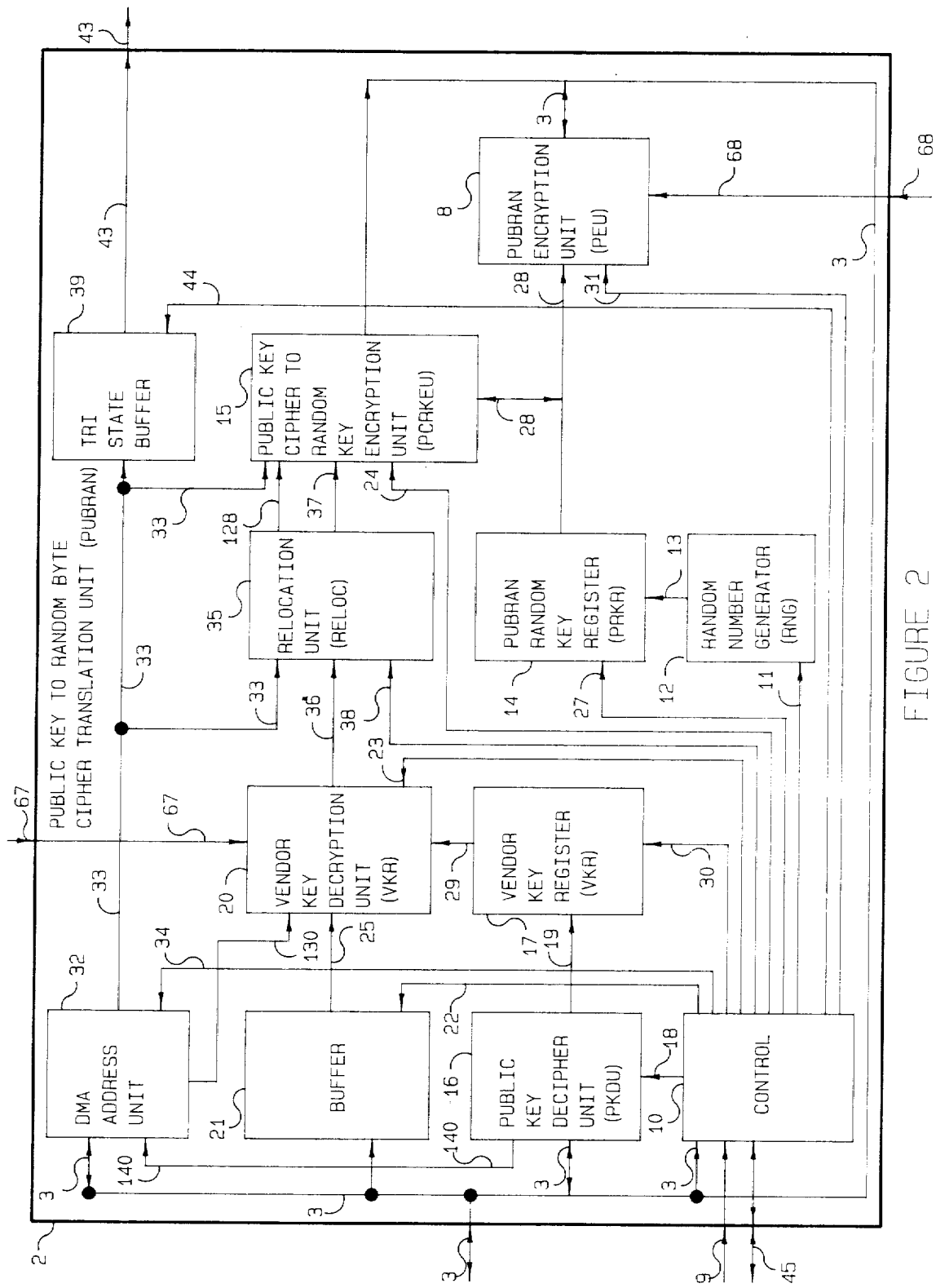
FIG. 2 is a block diagram of the translation (PUBRAN) hardware used in the general purpose computer system of FIG. 1.

Referring to FIGS. 2 and 5, when the SIR 62 recognizes a WARMSTART instruction, (or the CPU is powered up) the SIR 62 issues a command on bus 54 which causes the One Time Pad Random Number Generator (OTPRNG) 61 to generate a sequence of Random numbers for the purpose of authenticating the PUBRAN chip (to prove it is currently connected to the CPU, and that the user is not jamming an old random key into the CPU). While the OTPRNG 51 is choosing a random number for the CPU 1, the RNG 12 is choosing a random number for the PUBRAN Chip 2 (which will be used to encrypt the vendors' software).

The random number from the OTPRNG 51 will be routed to the PDU 7 via bus 52. The PDU 7 will encrypt this random number using the common DES (or similar) key that the CPU 1 and the PUBRAN 2 share in common. In the PUBRAN Chip 2, the PEU 8 will receive the encrypted form of the random number from bus 3. The PEU 8 will decrypt this number using the common DES (or similar) key that the CPU 1 and the PUBRAN Chip 2 share. The PEU 8 will use this random number to encrypt secure communications to the CPU 1, such as the transmission of the random key that the PUBRAN Chip chooses, and the upper and lower bounds that are established for a particular package.

When the CPU 1 receives these transmissions, the PDU 7 attempts to decrypt them using the random key chosen by the OTPRNG 51, as described above. The only way that the message will be correct is if the PUBRAN Chip has been authenticated.

Translation Unit

Referring to FIGS. 1 and 2, the separate translation unit is called the PUBRAN chip 2 since it translates from the public key preamble block cipher form in which a vendor's program is distributed to a randomly chosen key in which it will be executed. The PUBRAN chip 2 used the data bus 3 to communicate with the CPU 1. The PUBRAN chip is controlled by the PUBRAN chip controller 10 which receives commands from the CPU 1 via control bus 9 as well as the data bus 3. Control bus 9 acts like a device select would on any other input/output device in a computer system.

When power is applied to the PUBRAN chip 2 or when the CPU 1 encounters a WARMSTART instruction, the controller 10 issues a command on control bus 11 to the Random Number Generator (RNG) 12 that causes the RNG to create a new random number. The RNG will reject any number that appears to be nonrandom, such as any number that might be the result of an external electromagnetic field applied to the PUBRAN chip 2. The RNG 12 sends its random number to the PUBRAN Random Key Register 14 via bus 13. The controller issues a load command on control bus 27 that causes the PRKR 14 to load the key from the RNG 12.

Also, during this power up (or WARMSTART) operation, the freshly chosen random key in the PRKR 14 is sent via bus 28 to the PEU 8 where it will be sent in encrypted form to the PDU 7 in the CPU 1. The PEU 8 is controlled by the control bus 31. The key for the secret communication between the CPU 1 and the PUBRAN chip 2 must be established by an authentication procedure, which occurs before the random key in the PRKR 14 can be sent to the CPU 1. To do this authentication, the CPU 1 generates a random number of its own and sends it in encrypted form to the PUBRAN chip 2 via external data bus 3. The PEU 8 in the PUBRAN chip 2 will decrypt this and use the decrypted form of the random number from the CPU to encrypt communication between the CPU 1 and the PUBRAN chip 2. The first such secret communication occurs when the PUBRAN chip 2 sends the random key in the PRKR 14 to the CPU 1. The CPU 1 will store the random key in its RKR 6. The key in the PRKR 14 and the RKR 6 must be the same during any one load/execute sequence in order for the system to function properly. The key in the PRKR 14 is the one that the PUBRAN chip will use to re-encipher the vendor's software into executable form, and the key in the RKR 6 is the one the CPU will use to execute the reenciphered form of the vendor's software.

The PUBRAN chip 2 will not complete the WARMSTART operation until after a specified period of time has elapsed. This period of time may be as long or longer than the authentication procedure.

When the CPU 1 encounters a LEE instruction, it issues a command to the PUBRAN chip 2 via busses 9 and 3. The PUBRAN chip controller 10 recognizes this command, and issues a command via control bus 18 to the Public Key Decipher Unit (PKDU) 16 which causes the PKDU 16 to decipher the information about the vendor's program (encrypted using a public key cipher). This information includes the vendor's chosen key under which the program was enciphered for distribution, and the length of the vendor's program in bytes. This information may also include a count indicating extra delay that must occur before the LEE operation can complete, thereby allowing the vendor to choose the tradeoff he desires between security (long delay) and speed (short delay). All of this information is enciphered in a single public key block several hundred bits long. To provide these bits to the PUBRAN chip 2, the CPU 1 sends this information to the PUBRAN chip 2 via data bus 3, one byte at a time. The PUBRAN chip 2 cannot decrypt the information until all of the bytes have been received.

The PUBRAN chip controller 10 and the PKDU 16 may interact in a more intimate fashion using bidirectional control bus 18. The reason such a feedback design may be advantageous is the highly iterative nature of public key algorithms.

Once the PKDU 16 has decrypted the public key encrypted information, the PKDU 16 passes the vendor's chosen key to the Vendor Key Register (VKR) 17 via bus 19. The controller 10 issues the control signal 30 which will cause the VKR 17 to load the unenciphered form of the vendor's chosen key. The key in the VKR 17 will be passed to the Vendor Key Decrypt Unit (VKDU) 20 via bus 29. The VKDU 20 will use the key in the VKR 17 to decipher the vendor's software during a PUBRAN operation. In some designs the VKR 17 and the VKDU 20 can be combined into one unit.

Also, after the PKDU 16 has decrypted the public key encrypted information, the decrypted length of the vendor's program is passed from the PKDU 16 to the DMA address unit 32 via bus 140. This length will be used by the DMA address unit 32 to control the PUBRAN operation, and determine the upperbound of the current vendor package. Once the actual processing of the LEE instruction has completed, the variable (vendor chosen) delay occurs. This delay could range from zero to several seconds, depending on how much security the vendor desires. This variable delay feature could be omitted from the PUBRAN chip if the manufacturer feels the delay of the public key decryption is enough to provide adequate security.

When the CPU 1 encounters a PUBRAN instruction, it will issue a command to the PUBRAN chip 2 via busses 9 and 3, which the PUBRAN chip controller 10 recognizes. The external data bus 3 is connected to the DMA address unit 32. This allows the CPU 1 to send the starting address of the vendor enciphered instructions in external memory, and the starting address at which the re-enciphered instructions will reside in external memory. The controller 10 will issue commands periodically via command bus 34 which causes the DMA address unit to increment the current addresses. The controller 10 is connected to the external DMA synchronization bus 45 (the exact nature of which is dependent on the design of the CPU) which tells the PUBRAN chip 2 when it may have control of the address bus 43. When access to the external address bus 43 is permitted, the controller 10 enables the tristate buffer 39 via control signal 44. The tristate buffer 39 takes the address from internal bus 33 which is connected to the DMA address unit 32 and places the address from bus 33 onto the external address bus 43. This address will sometimes be the address from which a portion of a block of vendor enciphered instructions will be fetched. These vendor enciphered instructions will be loaded into a buffer 21 from external data bus 3 when the controller 10 issues a command on control bus 22.

The enciphered instruction, or block of enciphered instructions, is passed on bus 25 to the VKDU 20. The VKDU 20 deciphers the block of vendor encrypted instructions as a function of the vendor chosen key in the VKR 17 and also as a function of the address, relative to the start of the vendor's package, at which the block of enciphered instructions are located. This vendor address is provided by the DMA address Unit 32 to the VKDU 20 via bus 130.

The deciphered instructions are passed on a bus 36 to the Relocation Unit (RELOC) 35. The Relocation Unit 35 is connected to the DMA address unit 32 via internal bus 33. The RELOC 35 uses this address to offset those fields which require relocation. The address used by the RELOC 35 will be the address where the re-enciphered relocated instruction will later be stored back into memory. The RELOC 35 will not modify those instructions which do not require relocation.

The un-enciphered relocated code that is output from the RELOC 35 is passed to the PCPKEU 15 via bus 37. The unenciphered relocated code will be re-enciphered by the PCUKEU using the common random key in the PRKR 14 which is passed to the KCRKEU 15 via bus 28. In addition, the PCRKEU 15 requires extra information which indicates the type of field to be encrypted. The RELOC 35 provides some of this extra information on bus 128, which is connected to the PCRKEU 15. The DMA addr Unit 32 also provides some of this extra information on bus 33, which is connected to the PCRKEU 15. The controller 10 will issue a command on control bus 24 that causes the PCRKEU 15 to store the re-enciphered instruction back into memory. The re-enciphered relocated instruction will be sent to memory via data bus 3. The address where this re-enciphered instruction will be stored is provided by the DMA address unit 32 on bus 33, which is routed to the tristate buffer 39. When the address bus 43 is available, the controller 10 enables the tristate buffer 39 via bus 44. The controller 10 recognizes when the address bus is available by checking the DMA synchronization bus 45.

Before the PUBRAN operation is finished, the DMA address unit must pass the upper and lower bounds for the vendor's package that has just been translated by the PUBRAN chip 2 to the CPU 1. It sends these bounds in unencrypted form on bus 33 to the PCRKEU 15, which routes them onto bus 28. The PEU 8 takes the information from bus 28 and encrypts it under the key established during the digital signature authentication process between the CPU 1 and the PUBRAN chip 2 (which occurs at WARMSTART time).

In order to perform relocation, information in addition to the actual instruction must be provided to the RELOC 35 via bus 36 from the VKDU 20. This information might be as simple as one bit which indicates if a byte is to be relocated. However, in addition to relocation information, the RELOC must be provided with information about the type of field that is to be re-encrypted after relocation. This is due to the fact that instruction fields, operand fields (including non-branch address fields) and branch address fields are each re-encrypted with a different cipher.

Figure 3:
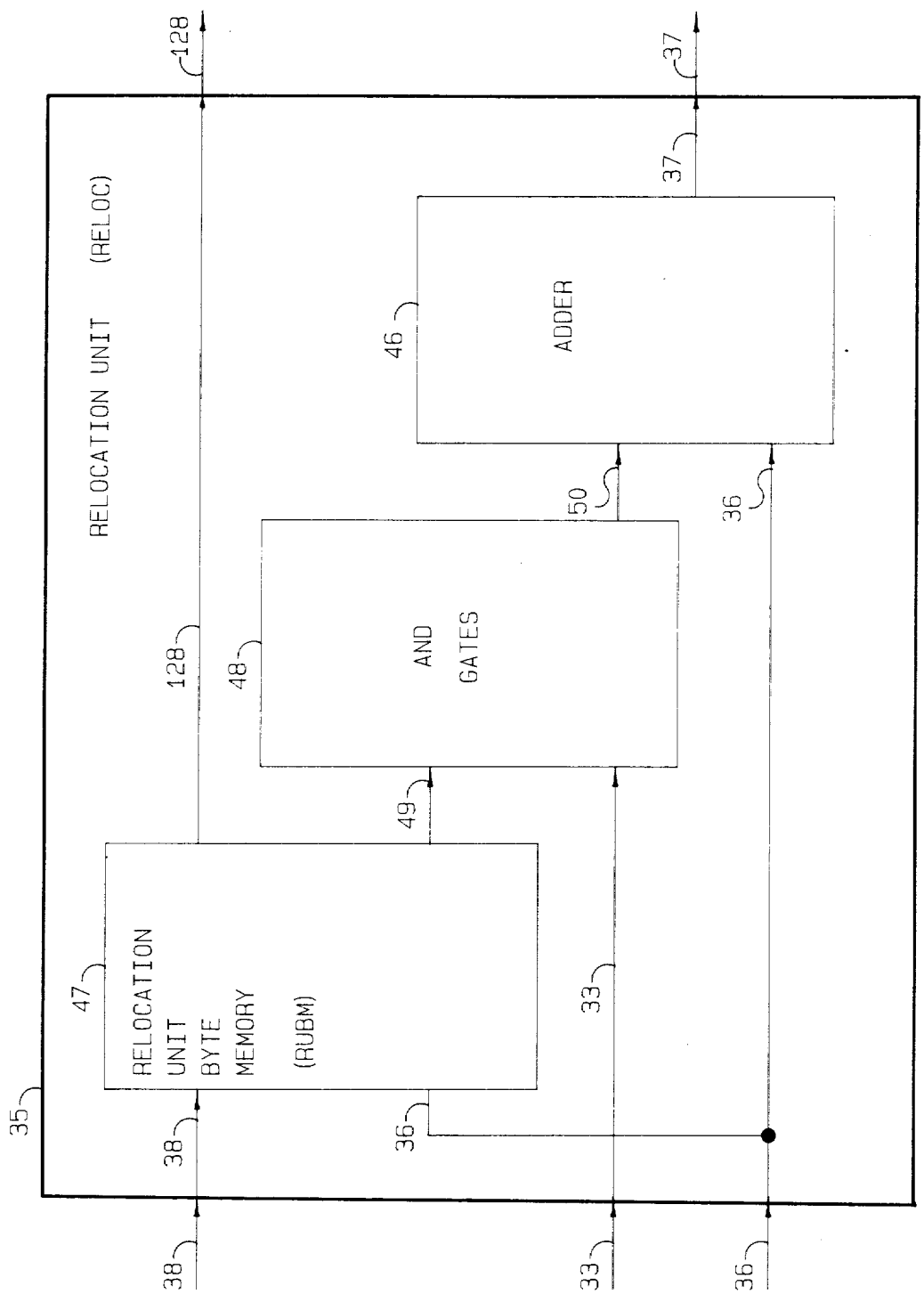
FIG. 3 is a block diagram of the RELOC unit used in the translation (PUBRAN) hardware of FIG. 2.

Referring to FIGS. 2 and 3, the preferred embodiment of the RELOC unit 35 consists of a Relocation Unit Byte Memory (RUBM) 47, which receives relocation and field type information from bus 36. This information will consist of one byte of extra information for each byte of instruction or operand in the vendor's program. One bit of this extra information will be a relocation bit, which the RUBM 47 will output via bus 49. The remaining bits in the byte are a field type indicator which describes the next byte to be passed to the RELOC 35 via bus 36. For example, the following coding scheme could be used:

| Indicator | Field Type |
|---|---|
| 1 | Instruction |
| 2 | Non-Branch Operand |
| 3 | First byte of two byte branch address |
| 4 | Second byte of two byte branch address |
| 5 | Relative branch offset |
| 6 | Plaintext byte |

Those skilled in the art could design a more compact coding scheme, and could reduce the amount of extra information from a byte to four bits (one for the relocation bit and three for the indicator). However, such a design would require a more complex design for the RUBM 47. The RUBM 47 will pass this indicator on bus 128 to the PCRKEU 15, so that the PCRKEU 15 will have the information required to choose the proper cipher that corresponds to the type of field to be re-encrypted.

The relocation bit from bus 49 is sent to a plurality of AND gates 48 which have the effect of making their outputs zero when non-relocation is specified by the RUBM 47 for a given instruction byte. Each bit of the address where the re-enciphered instruction will reside in memory is connected to one of the plurality of AND gates 48. When the relocation bit on bus 49 is one, the output of the plurality of AND gates 48 will be the address where the re-enciphered relocated instruction will reside. When the relocation bit from bus 49 is zero, the output of the AND gates 48 is zero. The output of the AND gates 48 is sent to an adder 46 via bus 50. The other input to the adder 46 is the instruction that may have to be relocated, which comes from the VKDU via bus 36.

If the instruction is not to be relocated, the plurality of AND gates 48 outputs a zero, and so the instruction is not changed when output from the adder 46. If it is to be relocated, the plurality of AND gates 48 passes the relocation address to the adder 46 and the instruction is modified. In either case, the instruction is sent to the PCRKEU 15 via bus 37.

When the CPU 1 is manufactured the PDU 7 must be programmed with a fixed key. The PDU programming bus 69 provides the address and data lines used to program the fixed key into an internal ROM in the PDU 7. Also PDU programming bus 69 provides a line for the programming voltage (or current) needed to program the internal ROM in the PDU 7. Many possible implementations of the internal ROM in the PDU 7 are possible, for example, fuseable link ROMS.

When a PUBRAN chip 2 is manufactured, the PEU 68 must be programmed with a fixed key that matches the fixed key that was programmed into the CPU that will be sold with the PUBRAN chip. Each CPU/PUBRAN chip set will preferably have a different key for security reasons, but the key in the PUBRAN chip will always match the key in its corresponding CPU. In order to program the PEU 8, the PUBRAN chip 2 has a PEU programming bus 68 which provides the address and data lines used to program the internal ROM in the PEU 8. Also, bus 68 provides a line for the voltage (or current) that is needed to program the internal ROM in the PEU 8.

At the same time, when the PUBRAN chip 2 is manufactured, the VKDU 20 must be programmed with the fixed decrypt key for the public key cipher that is used by the LEE instruction to obtain the vendor's chosen key. The VKDU programming bus 67 provides the address, data and voltage (or current) lines that are used to program the ROM in the VKDU 20.

Once the fixed keys in the PDU 7, PEU 8 and VKDU 20 have been programmed, the manufacturer should test each CPU/ PUBRAN chip set. If they function properly together in the encrypted mode during this test, they must be made so that they cannot be re-programmed, otherwise a user could break a vendor's program by re-programming the ROM. In order to do this, special lines, in addition to those mentioned, are provided on busses 69, 68 and 67 which cause some irreversible action (such as blowing a fuse) which thereafter prevents re-programming of the PDU 7, PEU 8 and VKDU 20, respectively.

The PUBRAN chip 2 must then be marked with an identifying set of numbers which includes the public key encrypt key corresponding to the fixed decrypt key that was programmed in the VKDU 20. The manufacturer computes this encrypt key using a one-way trap door function, making it infeasible for the user to compute the decrypt key. Since the size of the encrypt key will be several hundred bits, the manufacturer might choose to place a serial number on each PUBRAN chip and then provide the actual encrypt key and corresponding serial number on a separate sheet of paper. In addition, information must be provided to allow the vendor to authenticate each user when the user attempts to buy software from the vendor. This information, which is also a public key cipher, prevents the user from using a simulated CPU/PUBRAN chip, with a key the user chooses himself. The CPU 1 must also be marked with the identifying set of numbers, or the serial number, that corresponds to the identifying set of numbers that is printed on the accompanying paper. This is done so that each CPU can be connected to the correct PUBRAN chip, as each CPU will only work with the corresponding PUBRAN chip that was manufactured with the fixed key in the PEU 8 that matches the fixed key in the PDU 7 of the CPU.

Figure 4:
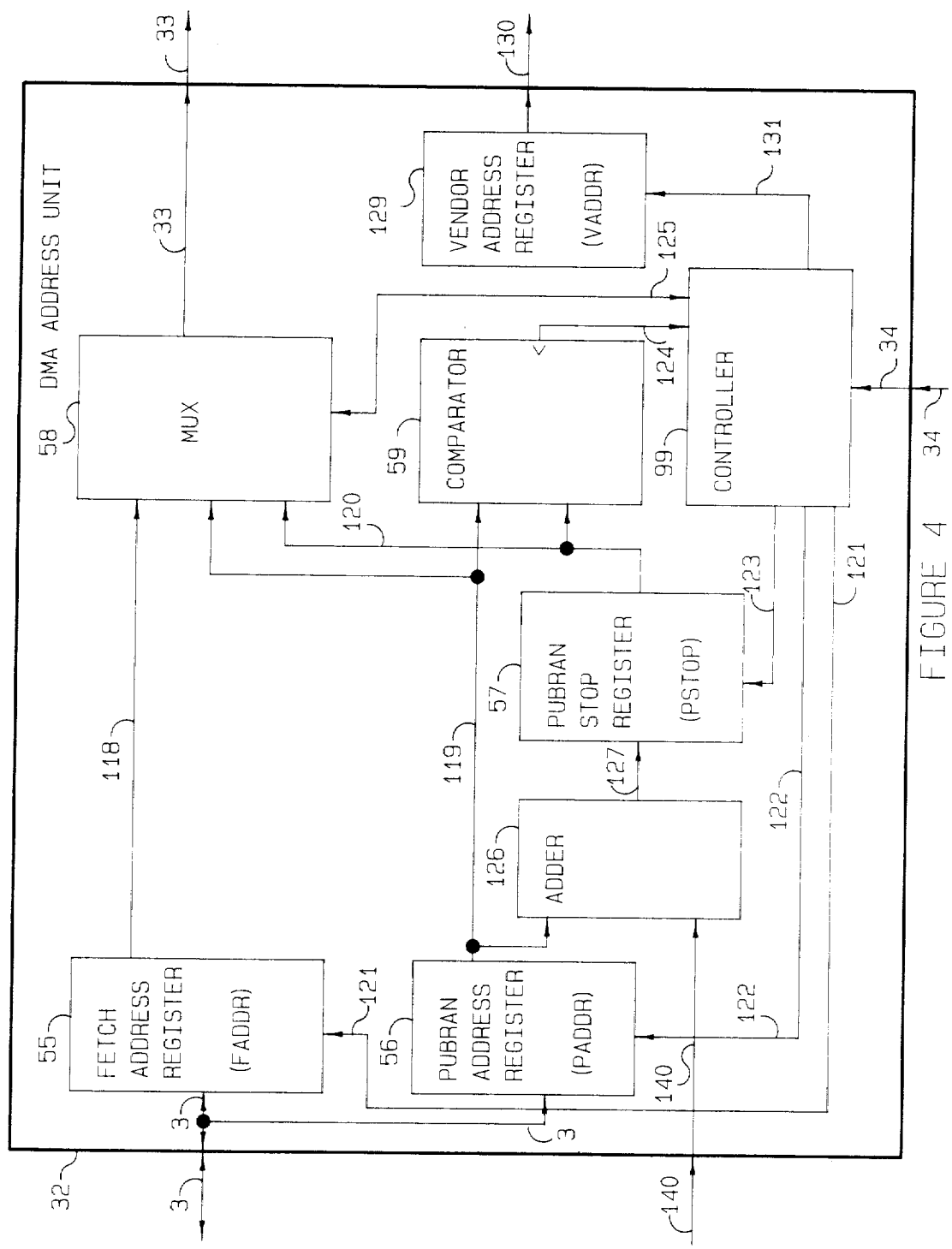
FIG. 4 is a block diagram of the DMA ADDRESS UNIT used in the translation (PUBRAN) hardware of FIG. 2.

Referring to FIGS. 2 and 4, the preferred embodiment of the DMA Address Unit 32 provides the RELOC unit 35 and the PCRKEU 15 with the address of current instruction being processed by the PUBRAN Chip 2 as well as providing this address to the external address bus 43 by way of a tri state buffer 39. In addition, the DMA Address Unit 32 keeps track of the stop address for the DMA operation that the PUBRAN Chip must perform in order to translate from the vendor encrypted form of a program to the execution encrypted form of a program. Because the DMA Address Unit 32 holds the current and stop address, the DMA Address Unit is where the "PUBRAN Only Once" feature of the PUBRAN chip 2 is embodied.

The PUBRAN Chip controller 10 is connected to the DMA Address Unit controller via bus 34. When a WARMSTART operation occurs, the PUBRAN chip controller 10 issues a command on bus 34 that causes the controller 99 to issue a command on bus 123 that will clear the PSTOP register 57.

When a PUBRAN operation occurs, the PUBRAN Chip Controller 10 issues a command on bus 34 that hands control of the PUBRAN chip over to the DMA Address Unit Controller 99. The DMA Address Unit Controller 99 will perform the PUBRAN operation in two parts: establishing the upper and lower bounds for the package being loaded in the PSTOP 57 and PADDR 56 registers, and performing the sequential accesses of memory needed to fetch vendor encrypted blocks of instructions from memory and storing re-encrypted instructions back into memory at the address at which they will reside during execution.

At the beginning of the PUBRAN operation, the controller 99 issues a command on bus 121 to load the Fetch ADDRess register (FADDR) 55 with the address of the vendor encrypted form of the program, to be loaded as the current package from external data bus 3. This information is in memory at an address which the user (or the operating system) chose, and so the address does not have to be encrypted.

After the FADDR 55 has been loaded, the PUBRAN Address register 56 and the PUBRAN stop register (PSTOP) 57 must be loaded with the lower and upper bounds of the current package, respectively. The lower bound of the package is not known until load time, since the user can choose which packages he wants to load into memory under the same key. Because of this, it must be available in unencrypted form on external data bus 3. The controller 99 issues a command on bus 122 to load the PADDR register 56 with the lower bounds of the current package. This will be the first address of the executable form of the program once the PUBRAN operation has completed. In order to implement the "PUBRAN Only Once" feature of the invention required for security, the freshly loaded address in PADDR 56 is sent to a comparator 59 via bus 119. The comparator 59 compares the new value in PADDR 56 with the last PUBRAN stop address in PSTOP 57, which is sent to the comparator 59 via bus 120. The comparator will indicate if the user is attempting to violate the "PUBRAN Only Once" restriction, since the output of the comparator 59 is a signal 124 that indicates whether PADDR is less than PSTOP. This means the new lower bound is less than the old upper bound. If the signal on bus 124 indicates that the new lower bound is less than the old upper bound, the DMA Address Unit Controller 99 issues a command on bus 34 that indicates that the PUBRAN operation cannot be completed. The PUBRAN Chip Controller 10 receives this command, and relays the failure back to the CPU 1 via data bus 3.

If, on the other hand, the signal on bus 124 indicated that the PADDR was not less than PSTOP, the PUBRAN operation can continue, and the DMA Address Unit Controller 99 can continue to have control of the PUBRAN Chip 2. Once the valid lower bounds have been loaded into PADDR 56, the next portion of the PUBRAN operation is to load a new PSTOP value. There is a possible threat to security that could arise in loading a new value into PSTOP: the user could try to lower the PSTOP value in an attempt to defeat the "PUBRAN Only Once" feature.

The PSTOP address is based on the length of the package, which is constant for a given vendor's package, and the start address of the package, in the PADDR register 56, which varies dependent on where the user loads the vendor's program. Since the upper bound of the package can be broken into these two pieces, the new value to be loaded into PSTOP 57 is computed by adding the value of PADDR from bus 119 to the length of the vendor's package from bus 140 using an adder 126. If no overflow occurs, the sum is sent to the PSTOP register 57 via bus 127. The controller 99 will issue a command on bus 123 at the proper time to load PSTOP with the result of the addition. The value on bus 140, which was input to the adder 126, came from the PKDU 16. The reason for this is that the length of the package is encrypted as part of the preamble to the actual instructions. If this length were not encrypted the user could try to tamper with the PSTOP in an attempt to overcome the "PUBRAN Only Once" restriction.

At this point PADDR contains the lower bound of the current package, and PSTOP contains the upper bound of the current package. The preferred embodiment of the CPU must have the upper and lower bounds of each package (encrypted vendor packages) that is loaded into the system. In order to provide this information, the controller 99 issues a command to the mux 58 via bus 125 that causes the mux 58 to pass the value of the PADDR from bus 119 to bus 33. This information is passed to the PCRKEU 15, which routes it onto bus 28. The PEU 8 takes the information from bus 28 and encrypts it under the key established during the digital signature authentication process between the PUBRAN Chip 2 and the CPU 1. Also, the controller 99 issues a command to the mux 58 via bus 125 that causes the mux 58 to pass the value of the PSTOP from bus 120 to bus 33 at the next cycle. The information will travel the same path as the PADDR to the PEU 8.

Before the second phase of the PUBRAN operation can proceed, the controller 99 issues a command on bus 131, which is connected to the Vendor Address register (VADDR) 129, that will clear the contents of the VADDR 129. The VADDR 129 indicates the relative position of the current block of vendor encrypted instructions within the vendor's package.

Once PADDR 56 and PSTOP 57 have been loaded, the controller 99 can proceed to the next phase of the PUBRAN operation: loading the actual instructions. This operation consists of alternately placing the fetch address from FADDR 55, and the PUBRAN Address from PADDR 56 on the address bus 43. The controller 99 first issues a command to the mux 58 via bus 125 to place the value of FADDR 55 on bus 33. The PUBRAN Chip controller 10 issues a command on bus 44 to the tri state buffer 39 to pass the address on bus 33 to the external address bus 43. The contents of this address will be decrypted by the PUBRAN Chip (as described earlier) once an entire block of vendor encrypted instructions are assembled inside the PUBRAN Chip.

After the PUBRAN chip has loaded the contents of the address pointed to by FADDR 55, the controller 99 issues a command on bus 121 to increment FADDR 55 for each byte of a block of vendor encrypted instructions. Once an entire block of vendor encrypted instructions is assembled in the buffer 21, the controller 99 issues a command on bus 131 to the VADDR 129 to be incremented. The VADDR 129 outputs the incremented value on bus 130. The address on bus 130 represents the relative position in the vendor's program of the next block of vendor enciphered instructions to be decrypted.

When the PUBRAN Chip is ready to store a re-encrypted byte back into memory, the controller 99 issues a command on bus 125 that instructs the mux 58 to pass the address from the PADDR register 56 to the bus 33. The address from the PADDR register on bus 33 is used for three purposes:

(a) storing the re-encrypted byte back into memory, (b) encrypting the unencrypted byte based on the polyalphabetic non-periodic cipher, (c) relocating instructions.

To achieve these requirements, bus 33 is connected to the tri state buffer 39 which can pass the address to the external address bus 43 when the re-encrypted instruction is to be stored back into memory. Also, bus 33 is connected to the RELOC unit 35 and the PCRKEU 15. In the latter case, the address where the instruction will reside in memory when in executable form (from bus 33) is used to encipher the instruction byte so as to be dependent on address.

Once the PUBRAN Chip has completed storing the reencrypted byte into memory at the address on bus 33 (from the PADDR register 56), the controller 99 issues a command on bus 122 that increments PADDR, unless the signal on bus 124 indicates that PADDR is no longer less than PSTOP. If PADDR is no longer less than PSTOP, the PUBRAN operation has completed, and the controller 99 sends a command on bus 34 that gives control back to the PUBRAN Chip Controller.

There are several variations of the first embodiment that do not depart from the spirit and scope of the invention. For example, the number of bits in a byte need not be eight; the number of address bits need not be sixteen; and the number of HSK bytes need not be eight. Many combinations of these and other design parameters are possible. In addition, there are many structural rearrangements of the first embodiment which fulfill the objects of the invention.

For example, a minimum configuration general purpose computer system is possible. Such a system would have no CVC or RETCVC instruction. Cross package branching in a minimum system can occur through the use of the SWITCH instruction. All cross package branches would occur in unencrypted mode, so no bounds violations need occur. Since a SWITCH must be followed by an HSK instruction, the security effect of the CVC/HSK handshaking is still achieved. A minimum configuration also need not have relative branches or a data stack. The PUBRAN and LEE instruction could be combined into one instruction.

As another example, the PUBRAN unit 2 and the CPU 1 could be fabricated on a single integrated circuit. This would eliminate the need for the PEU 8, PDU 7, OTPRNG 51, and the RKR 6.

Also, the SIR 62 and KCPU 4 could be combined into a single unit, with the KCPU's internal controller doing the functions of the SIR 62.

Additionally, when an illegal instruction is recognized at the time the CPU 1 is executing in the unencrypted mode, the illegal instruction need not cause the destroy key feature to be activated. Special instructions that execute only in the unencrypted mode could be supported. For example, this could provide a means to test CPUs when they are manufactured. Consider another example, when the invention is to be implemented with an instruction set that has no unimplemented instructions (e.g., Z80), which requires restricting certain valid instructions for execution only in the unencrypted mode. (On a Z80: LD B, B; LD C,C; etc. are good choices.)

Stacking operations could be implemented by incrementing on pushes and decrementing on pops, or by decrementing on pushes and incrementing on pops. There could be a separate control stack for CVC/RETCVC, or the control stack could have both CVC/RETCVC addresses as well as CALL/RETURN addresses.

The separate implementation of the PUBRAN unit as a PUBRAN Chip could be as a DMA device, as described in the first embodiment, or it could be a simple input/output device. In fact, the PUBRAN unit could be connected through a serial input/output port, such as one that uses the RS232C protocol.

Indirect branches could be permitted in the encrypted mode if an HSK instruction (or similar instruction) were required at the target of the indirect branch.

The SWITCH instruction could be eliminated by requiring all programs, including user programs, to be translated through the PUBRAN Unit, and executed in the encrypted mode. The SWITCH instruction could also be eliminated by requiring execution of unencrypted programs in one portion of memory and encrypted programs in the other portion.

The RNG 12 could be replaced with a psuedo-random number generator that has a non-volatile memory (such as electrically alterable read only memory) for storage of the seed. If an identical psuedo-random number generator were fabricated in the CPU 1, the PDU 7 and PEU 8 could be eliminated. The execution key used by the CPU 1 will be the same as the execution key used by the PUBRAN chip 2 provided that power is applied to both integrated circuits simultaneously. When power is removed from either integrated the next seed value will be retained in the non-volatile memory of that integrated circuit. If power is removed from one integrated circuit, but not the other, the execution keys will be different. Having different execution keys in the CPU 1 and the PUBRAN Chip 2, in such a case, prevents the software pirate from exploiting the psuedo-randomness of the execution keys. The period of the psuedo-random number sequence used must be large enough to prevent the software pirate from exhaustively cracking all possible keys. When the psuedo-random sequence is exhausted, the CPU 1 and PUBRAN Chip 2 could be designed to prevent further operation of the system, thereby providing maximal security. To transfer the bounds from the PUBRAN Chip 2 to the CPU 1 requires using the psuedo-random number as a key for a cipher. However, the method of transferring the bounds must be chosen carefully, to prevent the pirate from using the psuedo-randomness to break the system. One method for transferring the bounds that provides adequate security is the sentinel method. In the sentinel method, a long sequence of plaintext instructions is chosen (by manufacturer) and encrypted using the execution (address dependent) cipher. The first few instructions chosen in this sequence must guarantee that the sequence cannot occur in any program. For example, an illegal instruction would be a possibility, if one assumes that a programmer would not intentionally place an illegal instruction in a program. Following this unique sequence would be a random pattern. The entire sequence would be encrypted using the address dependent execution cipher and placed at the end of the translated program by the PUBRAN Chip 2. The CPU 1, during a PUBRAN operation, would monitor the data bus 3 and decrypt the information placed on the data bus 3 by the PUBRAN Chip 2. If a decrypted sequence received in the CPU 1 begins with the unique sequence, the SIR 62 would test if it is followed by the correct random sequence. If it is followed by the correct random sequence, the SIR 62 would recognize it as the sentinel to the current package. For each re-encrypted instruction placed on the data bus 3 by the PUBRAN Chip 2, the UBM 105 in the ULBTU 90 would be incremented appropriately, and so the UBM 105 would contain the correct upper bound of the package that the PUBRAN Chip 2 would have just finished loading. This value would have to be stored into the NBR 100. On the other hand, if the decrypted unique sequence is not followed by the correct random sequence, the SIR 62 would recognize it as the sentinel to the current package. For each re-encrypted instruction placed on the data bus 3 by the PUBRAN Chip 2, the UBM 105 in the ULBTU 90 would be incremented appropriately, and so the UBM 105 would contain the correct upper bound of the package that the PUBRAN Chip 2 would have just finished loading. This value would have to be stored into the NBR 100. On the other hand, if the decrypted unique sequence is not followed by the correct random sequence, the SIR 62 would issue a command that makes the psuedo-random number unavailable to the DU 71, similar to issuing a command on bus 66 which destroys the execution key in the RKR 6. In order to use the system after the SIR 62 has recognized the unique sequence followed by an incorrect random pattern, the next psuedo-random number in the sequence must be generated, either by powering both the CPU 1 and the PUBRAN Chip 2 down and back up, or by executing a WARMSTART instruction. Other methods could have been used for transfer of bounds in the variation of the present invention that uses mutual generation of psuedo-random execution keys, but the sentinel method is preferred. The sentinel method could be used in the variation of the present invention that uses true random execution keys, however the methods for bounds transfer described earlier, which use the PDU 7 and the PEU 8, are preferred in such an embodiment of the present invention.

It may be desirable that certain proprietary software have a limited lifetime. For example, software rental and prepurchase trial of software require that the software fail to execute after a certain amount of time. In the present invention, this time must be measured in terms of the number of WARMSTART or power up operations that have occurred. The mutual generation of psuedo-random execution keys described above would be a possible way to implement trial/rental software. In such a case, the period of the psuedo-random generator would be short; for example, 10 WARMSTARTs or power up operations. Also, when the psuedo-random sequence was exhausted, the CPU 1 must fail to execute any further instructions. There is another method that will work with either random or psuedo-random execution keys. In this other method, the trial/rental software is customized for a PUBRAN Chip that would be shipped with the trial/rental software. The PUBRAN Chip contains a non-volatile memory (such as electrically alterable read only memory) which contains a count of the number of times the PUBRAN Chip is powered up or performs a WARMSTART operation. When the count has reached some limit, for example 10, the PUBRAN will fail to operate from that time on.

Although the WARMSTART instruction does not involve the destroy key signal 66, it functions isomorphically to an illegal instruction. Therefore, the effective number of illegal instructions is equal to the number of illegal instructions plus the number of opcodes which perform the WARMSTART operation. In fact, an implementation of the present invention which has n redundant opcodes that perform the WARMSTART operation and no illegal instructions in its instruction set would be exactly as secure as an implementation that has one WARMSTART opcode and n−1 illegal instructions. Illegal instructions need not be used, if sufficient opcodes are provided for WARMSTART operations. The opcodes need not be redundant, since at the same time the WARMSTART is occurring, other operations can occur. For example, if there are ten WARMSTART instructions in an instruction set, each of them could perform a different initialization operation. The particular initialization operation selected by a specific WARMSTART instruction would be performed at the same time the PUBRAN Chip 2 is performing the WARMSTART. Therefore, opcodes need not be wasted on illegal instructions, in order to provide the security that illegal instructions provide.

SECOND EMBODIMENT

Dedicated Application Computer System

Figure 7:
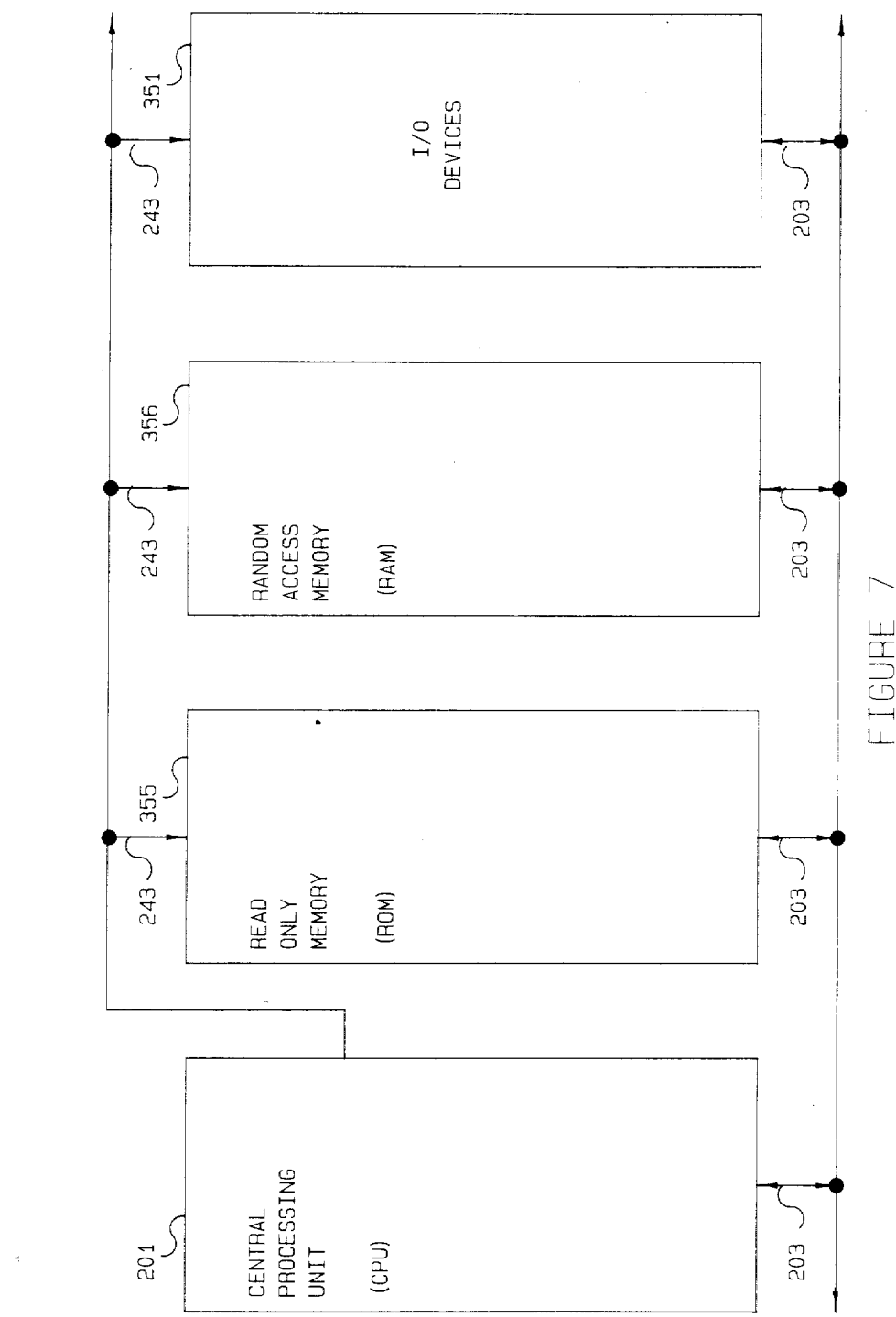
FIG. 7 is a block diagram of a dedicated application computer system that can execute programs protected with either encryption or encapsulation, and where the program may be stored in a read only memory (ROM), constructed in accordance with a second embodiment of the present invention.

Referring to FIG. 7, a dedicated application computer system includes a dedicated application CPU 201, which is connected to a bi-directional data bus 203 and an address bus 243. In most systems using the second embodiment of the invention, the dedicated CPU 201 will be connected to one or more input/output device(s) 351. The dedicated CPU 201 protects the software that controls the dedicated application computer system by either encapsulation of significant parts of the software or by encryption of all of the software. The designer selects which protection method the dedicated CPU 201 will use when the dedicated CPU 201 is programmed. For small programs, where a large fraction of the entire program can fit in an internal read only memory in the dedicated CPU 201, the designer would choose encapsulation. For security of larger programs, the designer would choose to use encryption, in which case the internal read only memory is not used to store a program, but instead stores information used to decrypt the encrypted program at run time.

When encryption is used to protect the program, external memory means must be provided to store the program. When encapsulation is used to protect the program, external memory means must be provided to hold that portion of the program which will not fit in the internal read only memory. To allow for this, an optional read only memory 355 is connected to the dedicated CPU 201 via address bus 243 and data bus 203. Also, a read/write (RAM) memory 356 is connected to the address bus 243 and data bus 203. The RAM 356 can be used to store programs and/or data.

Dedicated Application CPU

Figure 8:
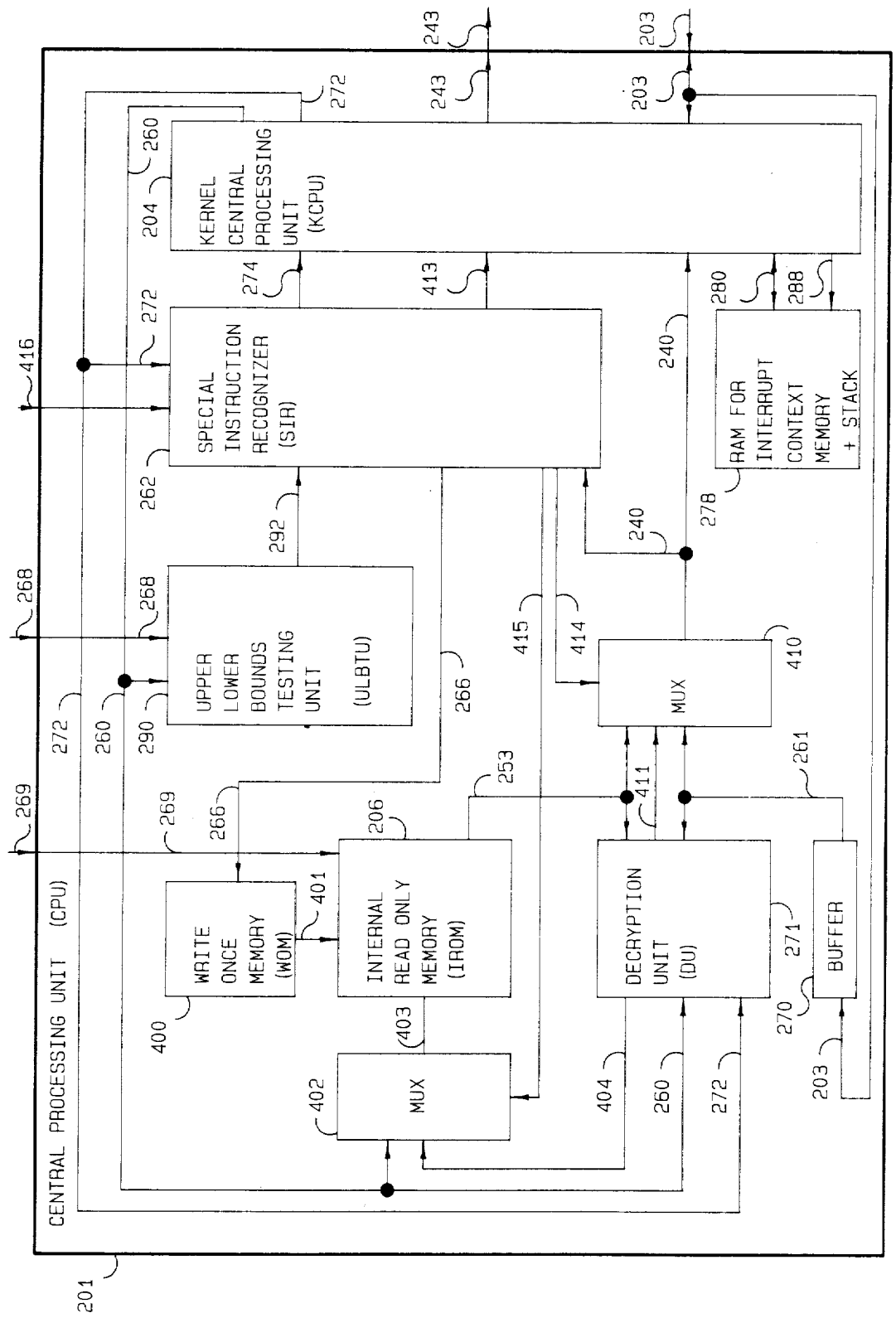
FIG. 8 is a block diagram of the program execution (CPU) hardware used in FIG. 7.

Referring to FIGS. 7 and 8, the dedicated CPU 201 contains a Kernel CPU (KCPU) 204 which executes unprotected instructions as well as additional hardware which provides the unprotected instructions to the KCPU 204 in a secure manner. The KCPU 204 will receive unprotected instructions via internal bus 240 from one of three sources: external memory containing encrypted instructions, external memory containing unencrypted instructions, and internal memory containing unencrypted instructions. The latter two sources are used only when the dedicated CPU 201 is set up to protect with encapsulation; the former source is used only when the dedicated CPU is set up to protect with encryption. To choose the correct source for the instructions provided to the KCPU on bus 240, a multiplexer 410 is connected with its output onto bus 240. The inputs to the multiplexer 410 come from: a Decryption Unit (DU) 271 via bus 411, a buffer 270 via bus 261, and an Internal ROM (IROM) 206 via bus 253. The buffer 270 is used for passing instructions from external memory, regardless of whether the instructions are encrypted or not, and so the DU 271 also receives the encrypted form of instructions from bus 261.

If the dedicated CPU 201 is selected for encrypted protection, the following occurs during an instruction fetch: The KCPU 204 outputs the address in external memory from which the encrypted instruction is to be feteched on internal bus 260 and external address bus 243. The external memory (either the ROM 355 or the RAM 356) will provide the encrypted instruction on external data bus 203, which is connected to the buffer 270. The buffer 270 provides the encrypted instruction to the DU 271. The DU 271 needs the address from which the encrypted instruction was fetched, as well as the type of field being fetched (instruction, operand, or branch address) to properly decrypt the encrypted instruction. The address of the instruction is provided on bus 260 to the DU 271, and the type of field is provided on bus 272 to the DU 271. The KCPU 204 must generate the signals on busses 260 and 272 for each byte of instruction being fetched. The DU 271 will use this information along with the contents of the IROM 206 to decrypt the instruction. Some function of the information on busses 260, 261 and 272 will be computed (using a nonperiodic polyalphabetic cipher) and this will be sent to the address inputs of the IROM 206 via bus 404 which is connected to multiplexer 402. The multiplexer 402 routes the information from bus 404 to bus 403, which is connected to the address inputs of the IROM 206. The multiplexer 402 will always route in this manner when the dedicated CPU 201 executes encrypted instructions. The IROM 206 is used as a key ROM for the DU 271 when the dedicated CPU 201 is selected to execute encrypted instructions. The output of the IROM 206 from bus 253 is sent back to the DU 271 where the nonperiodic polyalphabetic cipher computation can be completed. The deciphered instruction is then sent on bus 411 to the multiplexer 410 which routes the signal onto bus 240. The KCPU 204 can then execute the decrypted instruction provided on bus 240. In addition, the decrypted instruction is provided to the Special Instruction Recognizer (SIR) 262 which implements the security features required to inhibit automated cracking of the protected program.

If the dedicated CPU 201 is selected for encapsulation protection, the following occurs during an instruction fetch. The KCPU 204 outputs the address from which the instruction is to be fetched on bus 260 only. This address is sent to the Upper Lower Bounds Test Unit (ULBTU) 290, which determines if this address is within the bounds that distinguish the IROM 206 from the external memory (ROM 355 or RAM 356). If the ULBTU 290 determines that the address on bus 260 is outside the bounds of the IROM 206, the ULBTU sends a signal on bus 292 that causes the SIR to send a signal on bus 413 that allows the KCPU 204 to output the address from which the instruction is to be fetched on address bus 243. Otherwise, the address will never be output on the external address bus 243.

In the case that the dedicated CPU is selected for encapsulation protection, but that the address of the instruction is outside the bounds of the IROM 206, the instruction is fetched from external memory and provided on data bus 203. The instruction is passed through buffer 270 onto bus 261. Then the instruction is passed from bus 261 to bus 240 through multiplexer 410. The KCPU 204 can then execute the instruction from bus 240. It is also provided to the SIR 262.

In the case that the dedicated CPU 201 is selected for encapsulation protection, and that the address of the instruction is inside the bounds of the IROM 206, the address from bus 260 is passed through multiplexer 402 onto bus 403, which is connected to the address inputs of the IROM 206. The instruction from the IROM 206 is output on bus 253. The instruction on bus 253 is passed through multiplexer 410 onto bus 240. The KCPU 204 can then execute the instruction. The instruction from bus 240 is also provided to the SIR 262.

Regardless of the source of the instruction that is passed onto the bus 240, the SIR 262 will test if it is a special instruction that is not in the instruction set of the KCPU 204, or is an instruction in the instruction set of the KCPU 204 that requires special processing. The action of the SIR 262 depends on whether the CPU 201 is configured to operate with encapsulation protection, or encrypted protection.

If the dedicated CPU 201 is selected to protect the program using encryption, the SIR 262 will test for the following instructions: illegal (unimplemented) instructions, indirect branches, branches out of bounds (as determined by the ULBTU 290) and handshake instructions at the target of indirect branches. If the instruction set of the KCPU 204 has relative branches, the SIR 262 will also test for relative branches. In order for the SIR 262 to distinguish between instruction opcode fields (referred to as instruction fields) and other portions of instructions, such as operand fields and branch address fields, the SIR 262 receives information on bus 272 indicating how the KCPU 204 interprets the information on bus 240. If the KCPU 204 expects an instruction on bus 240, the SIR 262 will also use the information on bus 240 to test if the instruction the KCPU 204 is about to execute is one of the instructions that the SIR 262 also recognizes.

If the dedicated CPU 201 is configured to protect the program with encryption, and the SIR 262 recognizes the instruction field on bus 240 as an illegal instruction, the SIR 262 will issue a signal on bus 266 that will cause the information in the IROM 206 to become inaccessible. Bus 266 is a single bit that is connected to a Write Once Memory (WOM) 400. Normally the signal on bus 266 is low. When the CPU 201 is manufactured, the WOM 400 is initialized so as to produce a low output on bus 401, unless the signal on bus 266 ever becomes high. If the signal coming into the WOM 400 from bus 266 ever becomes high, the WOM 400 will undergo an irreversible change which causes the output of the WOM 400 on bus 401 to thereafter be high. The output of the WOM 401 is connected to an active low enable input of the IROM 206. The IROM will be enabled only if the output of the WOM 400 from bus 401 is low. Otherwise, the contents of the IROM 206 will be inaccessible, thereby achieving the effect of destruction of the execution key when an illegal instruction executes.

When the dedicated CPU 201 is configured to protect the program with encryption, the ULBTU 290 will have been programmed with the upper and lower bounds addresses within which the program being protected must reside. When the dedicated CPU 201 is executing the program protected with encryption, the ULBTU 290 will compare the program counter address on bus 260 with the upper and lower bound in the ULBTU 290. If the program counter address on bus 260 is outside the bounds of the program, the ULBTU 290 will issue a signal on bus 292 indicating this condition to the SIR 262. If the signal on bus 292 is true when the signals from bus 272 indicate that the KCPU 204 is expecting an instruction field, the SIR 262 will issue the signal on bus 266 that causes the state of the WOM 400 to be irreversibly changed, thereby making the contents of the IROM 206 inaccessible from then on. If the signal on bus 292 is false, the SIR 262 takes no action that it would not otherwise take.

When the dedicated CPU 201 is selected to protect the program with encryption and the SIR 262 recognizes any indirect branch in the instruction set of the KCPU 204, the SIR 262 allows execution of the indirect branch to begin; however, the SIR 262 will check what instruction is executed at the target of the indirect branch. If the instruction at the target is a handshake instruction (a certain number of bytes of instruction fields that will be treated as no-operations by the KCPU 204), the SIR 262 will allow execution to proceed as normal. If the instruction fields at the target of the indirect branch do not constitute a handshake instruction, the SIR 262 will issue the signal on bus 266 that causes the WOM 400 to be irreversibly changed, thereby making the contents of the IROM 206 inaccessible from then on.

If, on the other hand, the dedicated CPU 201 is set up to protect the program using encapsulation, the SIR 262 will test for the following: branches into the address space of the IROM 206, handshake instructions, and branches outside the address space of the IROM 206.

When the dedicated CPU 201 is configured to protect the program with encapsulation, the Upper Lower Bounds Test Unit (ULBTU) 290 will have been programmed with the upper and lower bounds of the address space of the IROM 206. When the dedicated CPU 201 is executing the unprotected program that resides in the external memory (ROM 355 or RAM 356) the ULBTU 290 will indicate this condition with an out of bounds signal on bus 292. When the dedicated CPU 201 is executing the protected program that resides in the IROM 206 the ULBTU 290 will indicate this condition with an in bounds signal on bus 292.

If the CPU 201 had been properly executing a program from outside of the IROM 206, as indicated by bus 292, the SIR 262 will not affect execution of the program in any way.

If the CPU 201 had been executing a program from outside the IROM 206, but the program causes the KCPU 204 to attempt to fetch a value from the IROM 206, the fetch will be prohibited, since the bus 260 is used only for addresses of instructions, and not addresses of data. If a common data bus were used in place of bus 260 in the dedicated CPU 201 the ULBTU 290 would have test if an attempt were made to fetch data from the IROM 206. The signal 292, under such conditions, would then cause the SIR 262 to issue a command on bus 266 that causes the WOM 400 to make the IROM 206 thereafter inaccessible.

If the CPU 201 had been properly executing a program from outside the IROM 206, as indicated by an out of bounds signal on bus 292, but the program attempts to transfer execution to a program that resides inside the IROM 206 (usually by way of a branch) the SIR 262 will do additional operations. The SIR 262 detects this condition when the signal 292 from the ULBTU 290 changes from an out of bounds signal to an in bounds signal. When the SIR 262 detects this condition, the SIR 262 tests if the first instruction executed from the IROM 206, as provided to the KCPU 204 and the SIR 262 on bus 240, is a handshake instruction. If it is a handshake instruction, the SIR 262 allows execution to continue. If it is not a handshake instruction, the SIR 262 issues a command on bus 266 that causes the WOM 400 to make the IROM 206 inaccessible. The SIR 262 also issues a command on bus 274 that clears the registers and flags in the KCPU 204.

If the CPU 201 is executing a program inside the IROM 206, as indicated by the in bounds signal on bus 292, the SIR 262 will allow the KCPU 204 to execute the instructions on bus 240 coming from the IROM 206. Also, the SIR 262 will issue a signal on bus 413 that prevents the KCPU 204 from placing the program counter address on address bus 243, as the KCPU 204 would when executing from outside the IROM 206.

Regardless of the type of protection used in the dedicated CPU 201, stacks and interrupt contexts must be kept secure. To provide for this, a secure memory 278 is connected to the KCPU 204 via secure memory address bus 288 and secure memory bidirectional data bus 280. The KCPU 204 must push and pop all values at addresses that reside in the secure memory 278. The KCPU 204 will prohibit access to the secure memory 278 when the KCPU 204 is doing any operation other than saving or restoring an interrupt context or pushing or popping a return address.

When the dedicated CPU 201 is programmed for use in a dedicated application computer system, the dedicated CPU 201 must be programmed so as to select operation with either encapsulation or encryption as the protection method. In addition, secure information (program, if encapsulation is used; execution key, if encryption is used) must be programmed into the IROM 206.

To provide for programming of the IROM 206, a programming bus 269 is connected from outside of the CPU 201 to the IROM. The IROM 206 must be designed so that its contents cannot be determined by probing the programming bus 269. Once programmed, the IROM 206 should not be able to be re-programmed, unless re-programming destroys all information in the IROM 206. The programming bus 269 provides the proper voltages and/or currents to the IROM 206. The designer might choose to connect the programming bus 269 to another bus, such as the data bus 203 and/or the address bus 243 in order to reduce the number of pins required on the CPU 201, as long as the restrictions mentioned above (preventing probing of IROM 206) are maintained.

At the same time the IROM 206 is programmed using the programming bus 269, the CPU 201 must be selected for either encapsulation protection or encryption protection, so that the information in the IROM 206 will be properly interpreted by the KCPU 204. To provide for this, there is a protection method selection signal 416 which comes from outside the CPU 201 and is connected to the SIR 262. The selection signal 416 is used to program the SIR 262 to act either as an encapsulation SIR or as an encryption SIR. The details of the operations that the SIR must perform when either of these methods is selected were described above. Once the SIR has been programmed to operate with one of the two methods of protection, that method of protection cannot be changed, unless the entire contents of the IROM 206 have been erased.

When the SIR 262 is selected to operate with encapsulation protection, the SIR 262 will instruct the multiplexer 402 via bus 415 to pass the program counter address from bus 260 to bus 403. Also, when the SIR 262 is selected to operate with encapsulation protection, the SIR 262 will instruct the multiplexer 410 via bus 414 to pass the output of the IROM 206 from bus 253 to bus 240, unless the program resides outside of the IROM 206. When the program resides outside of the IROM 206 and the SIR 262 is selected to operate with encapsulation protection, the SIR 262 will instruct the multiplexer 410 via bus 414 to pass the instruction from bus 261 to bus 240.

When the SIR 262 is selected to operate with encryption protection, the SIR 262 will instruct the multiplexer 402 via bus 415 to pass the output of the DU 271 from bus 404 to bus 403. Also, when the SIR 262 is selected to operate with encryption protection, the SIR 262 will instruct the multiplexer 410 via bus 414 to pass the output of the DU 271 from bus 411 to bus 240.

At the time the CPU 201 is programmed with the contents of the IROM 206 and the selection of protection method, the ULBTU 290 must be programmed with the proper upper and lower bounds that are required for the protection method being used. Programming bus 268 is connected from outside the CPU 201 to the ULBTU 290 to allow the upper and lower bounds to be programmed into the ULBTU 290. Once programmed, the ULBTU 290 should not be able to be reprogrammed unless reprogramming destroys all information in the IROM 206.

Figure 9:
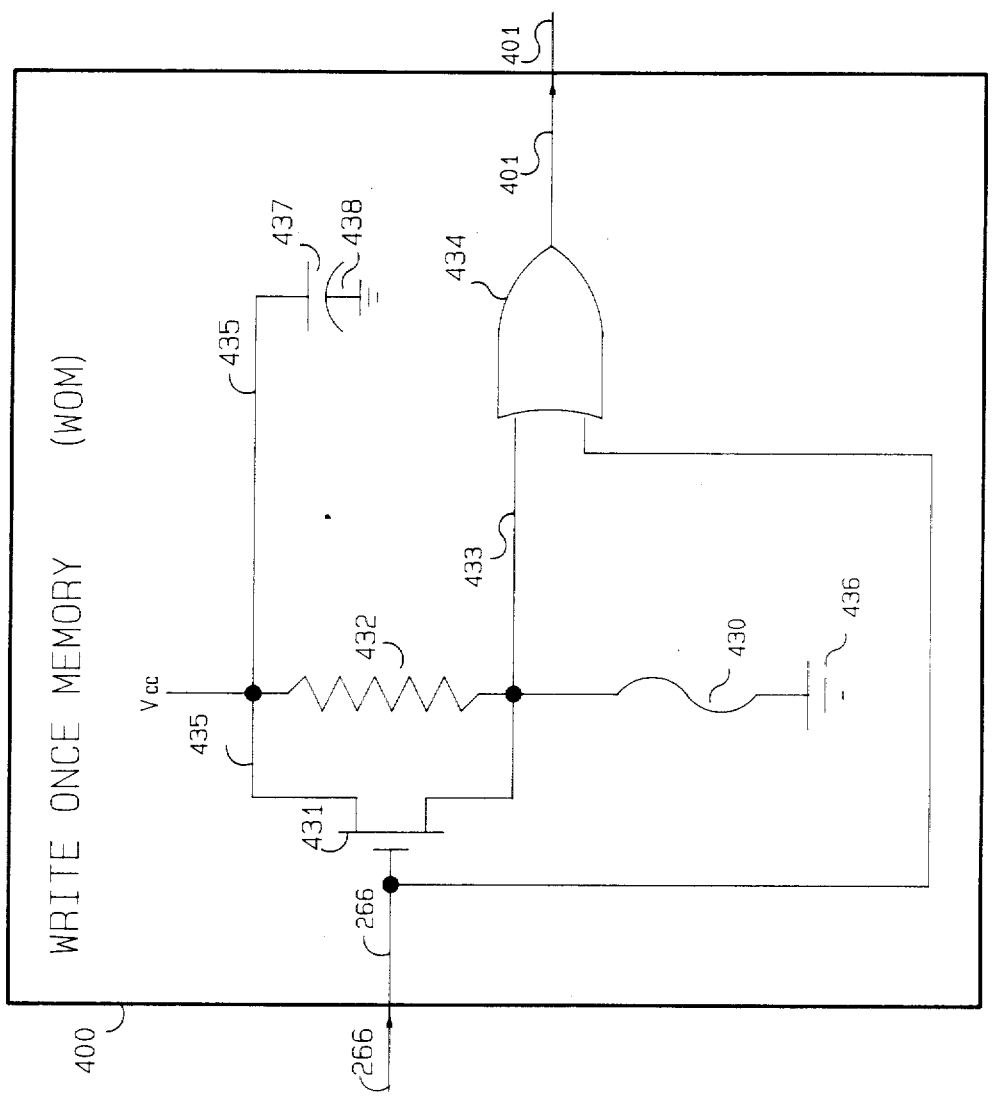
FIG. 9 is a circuit diagram of a possible embodiment of the write once memory used in FIG. 8.

Referring to FIG. 9, the Write Only Memory (WOM) 400 has an input write signal 266 and an output 401. Before the WOM 400 is written into, the output 401 will be low. After the WOM 400 has been written into, the output 401 will be high.

One method of implementing the WOM 400 is to use a circuit similar to that used in nonerasable PROMs. The input write signal 266 is connected to the gate of a transistor 431 and to an input of an OR gate 434. When signal 266 is low, the transistor 431 will be turned off and the output of the OR gate will be unaffected. A resistor 432 is connected across the source and drain of the transistor 431. The drain of the transistor 431 is also connected to a fuse 430 and another input of the OR gate 434. The resistance of the resistor is much larger than the resistance of the fuse, so when the transistor is turned off, the voltage at the input to the OR gate 434 on signal 433 is pulled near ground, since the fuse is connected from signal 433 to ground bus 436. If the WOM 400 has not been written into, the fuse will be intact, and the signal 266 will be low, so the output of the OR gate 401 will be low.

When the signal 266 goes high, the output of the OR gate 434 on signal 401 will become high. At the same time the transistor 431 is switched on, allowing a path for current from the Vcc bus 435 to the fuse 430 via line 433. The current is no longer limited by the large resistance of the resistor 432, and so the current causes the fuse 430 to be blown.

Once the fuse is blown, the resistor 432 will pull up the input 433 to the OR gate 434 to a value near Vcc. This will cause the output of the OR gate 434 on signal 401 to be high from then on. The output 401 will be high even if the power is turned off and back on again.

In case the power is turned off just as the fuse 430 is being blown, there is a capacitor 437 connected across the Vcc bus 435 and the ground 438. The capacitor 437 holds enough charge to complete the blowing of the fuse before signal 266 drops to a level that turns transistor 431 off. The value of the capacitor 437 may have to be rather large to provide enough charge to insure the fuse 430 will be blown. Because of this, another implementation of the WOM 400 may be chosen, such as bubble memory, electrically alterable read only memory, battery powered CMOS RAM (where the same battery also powers another CMOS RAM that replaces the IROM 206), or any other device that achieves the effect of the circuit shown in FIG. 9, as it is used in FIG. 8.

Figure 10:
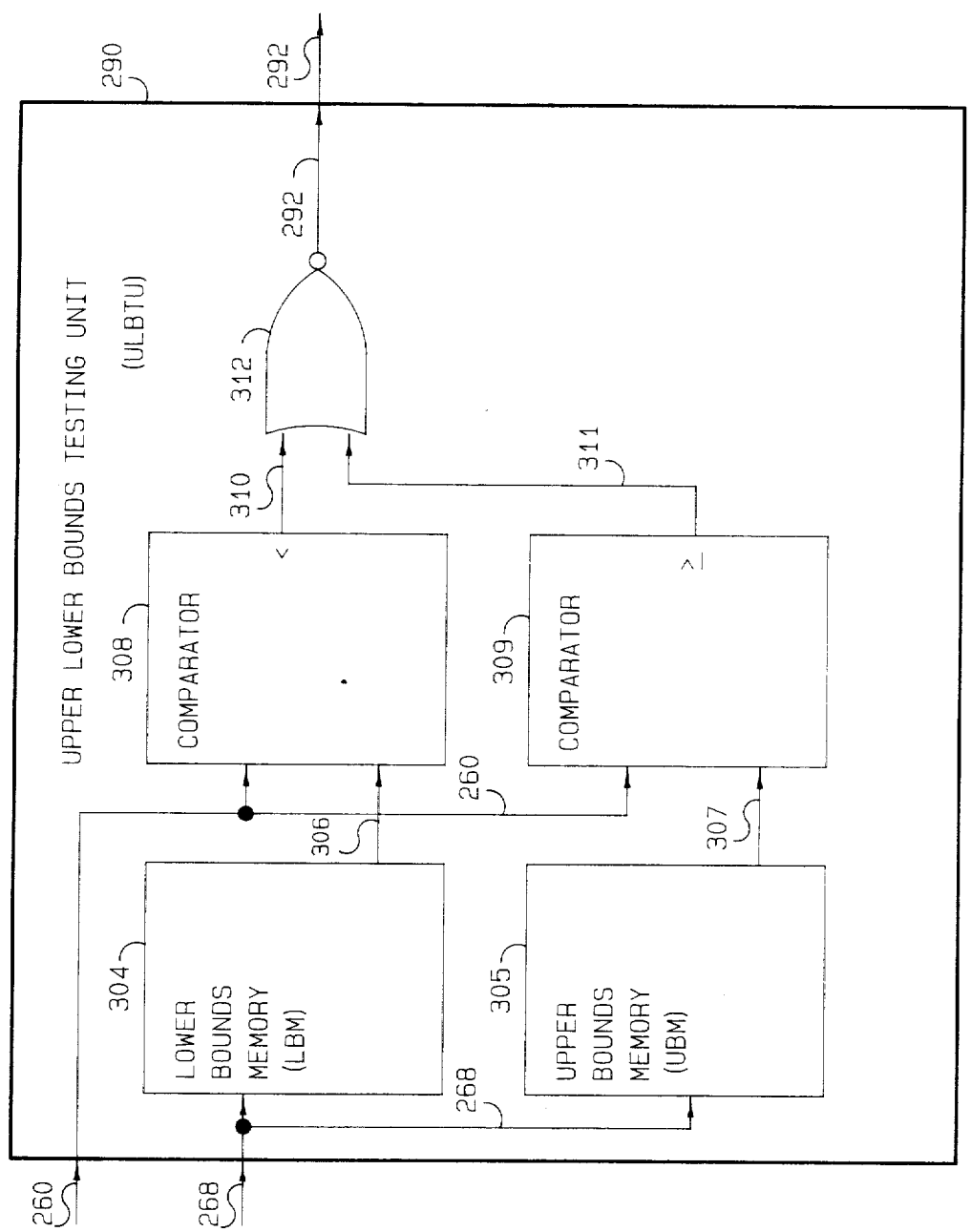
FIG. 10 is a block diagram of the ULBTU used in FIG. 8.

Referring to FIGS. 8 and 10, the ULBTU 290 tests if the value on the program counter bus 260 is within an upper and lower bound specified in an Upper Bound Memory (UBM) 305 and a Lower Bound Memory (LBM) 304. Programming bus 268 is connected to the LBM 304 and the UBM 305 to allow the upper bound to be programmed into the UBM 305 and the lower bound to be programmed into the LBM 304. The UBM 305 and the LBM 304 are read only memories that cannot be erased unless the entire contents of the IROM 206 are also completely erased at the same time.

The program counter bus 260 is connected to a comparator 308 and another comparator 309. The comparator 308 is also connected to the output of the LBM 304 on bus 306. The output of the comparator 308 is a less than signal 310, which indicates when the value of the program counter bus 260 is less than the value programmed into the LBM 304.

The comparator 309 is also connected to the output of the UBM 305 on bus 307. The output of the comparator 309 is a greater than or equal signal 311, which indicates when the value of the program counter bus 260 is greater than or equal to the value programmed into the UBM 305.

The signals 310 and 311 are inputs to a NOR gate 312, which indicates by its output signal 292 when the value on the program counter bus 260 is out of the bounds defined by the LBM 304 and the UBM 305. When the output 292 is low, the program counter bus 260 is out of bounds. When the output 292 is high, the program counter bus 260 is in bounds.

Figure 11:
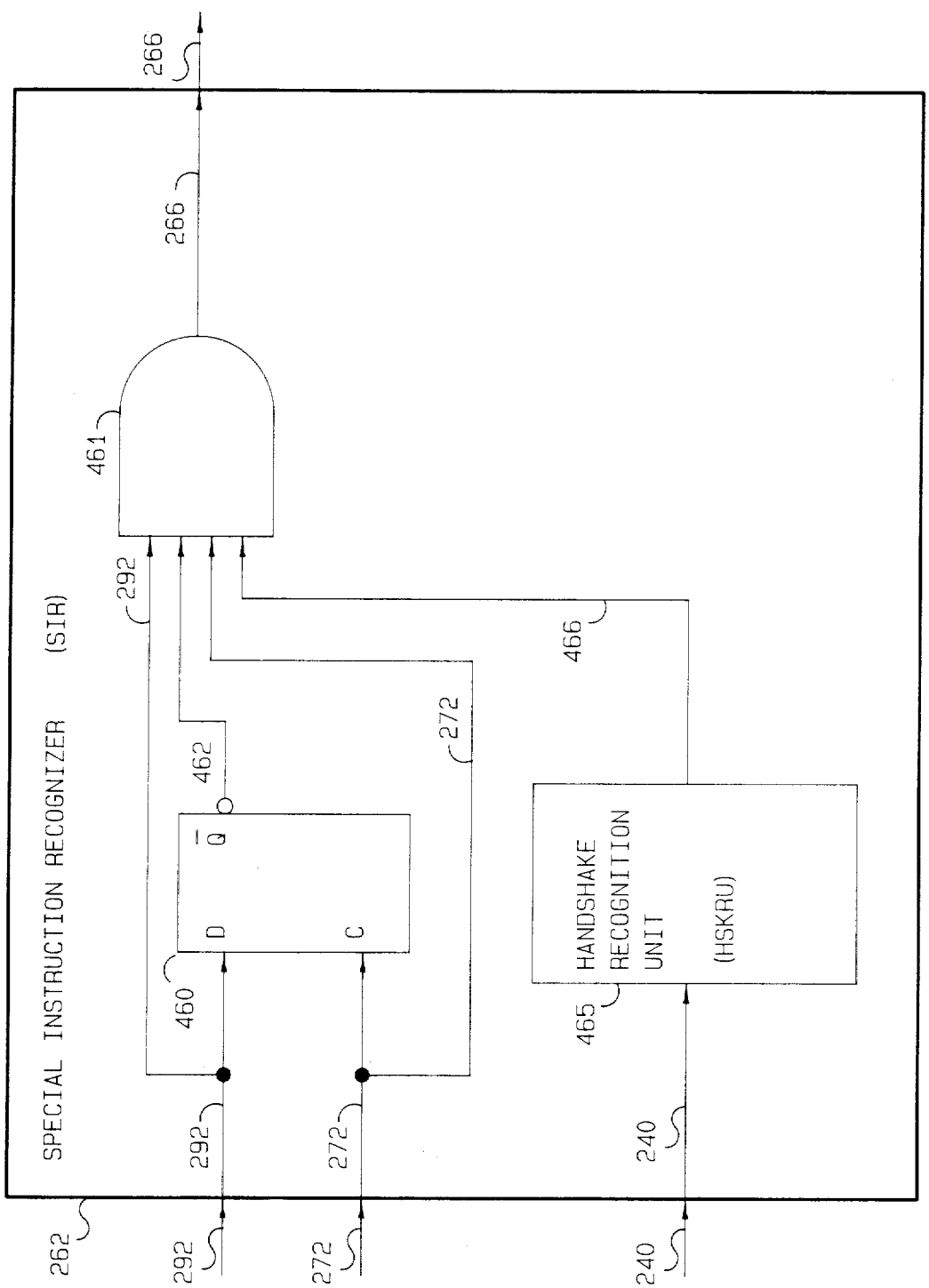
FIG. 11 is a block diagram of the SIR (encapsulation) used in FIG. 7.

Referring to FIG. 11, the portion of the SIR 262 required when encapsulation protection is used includes a Handshake Recognition Unit (HSKRU) 465 that tests for the opcode of the HSK instruction. When bus 240 transmits an HSK instruction, it will be treated as a NOP by the KCPU 204. The HSKRU 465 will generate a low signal on bus 466 when the current instruction on bus 240 is the opcode for the HSK. The HSKRU 465 will generate a high signal on bus 466 when any other instruction or data value is present. Bus 466 is connected to an input of AND gate 461.

The signal on bus 272, which goes high at the start of each instruction fetch, is used as the positive edge triggered clock input to flip flop 460. Bus 292 is high when the instruction currently executing was recalled from inside the IROM 206, and bus 292 is low when the current instruction was not recalled from inside the IROM 206. Bus 292 is used as the D input to the flip flop 460. Inverted flip flop output 462 is high when the last instruction executed was recalled from the IROM 206.

The signal on bus 292 is connected to another input of AND gate 461. The inverted flip flop output 462 is connected to a third input of AND gate 461. Bus 272 is connected to a fourth input of AND gate 461. And gate output 266 is high only when there is a transition in control from a program that resides in external memory to a program that resides in the IROM 206 which does not begin with an HSK instruction. Bus 266 will cause the WOM 400 to make the IROM 206 inaccessible when such conditions occur.

There are several variations of the second embodiment that do not depart from the spirit and scope of the invention. For example, the number of bits in a byte need not be eight; the number of address bits need not be sixteen; and the number of HSK bytes could be more than one. Many combinations of these and other design parameters are possible. In addition, there are structural rearrangements of the second embodiment which fulfill the objects of the invention.

In the implementation of the invention described in the second embodiment, the designer of a dedicated application computer system must select which protection method (encryption or encapsulation) will be used at the time the system is designed. By increasing the size of the IROM 206 and modifying the SIR 262, it would be possible for both encryption and encapsulation to be used in the same dedicated application computer system. In such a combined system, the IROM 206 would hold both encapsulated programs and an execution key. Programs outside of the IROM 206 would be protected by encryption, and the ULBTU 290 would indicate to the SIR 262 where the instructions on bus 240 should come from (the DU 271 if program counter bus 260 is out of bounds; the IROM 206 if program counter bus 260 is in bounds).

It would also be possible for a dedicated application CPU 201 to give the designer no choice of protection method. The CPU 201 could be designed so that all programs must be encrypted. This would eliminate the need for the multiplexers 402 and 410. The IROM 206 would always hold the execution key in such a system, and the SIR 262 need only be designed to handle encrypted programs (and so no HSK is required since there is only one package). The SIR 262 does not need bus 416 in this system.

On the other hand, the CPU 201 could be designed so that encapsulation is the only protection method available. This would allow the DU 271 and the multiplexer 402 to be eliminated from the design of the CPU 201. The multiplexer 410 is still required to choose between unprotected instructions (from outside the IROM 206) and encapsulated instructions (from inside the IROM 206). The SIR 262 does not need bus 416 (since no selection of protection method is allowed) and the SIR 262 does not need instruction field type bus 272 (since the SIR 262 need only look for HSK instructions when execution branches from outside the IROM 206 to inside the IROM 206). Removing the need for bus 272 may allow the complexity of the KCPU 204 to be reduced. Also, since an execution key is not stored in the IROM 206, the WOM 400 could be replaced with a flip flop that would be set by signal 266 and not reset until power is turned off and back on again (thereby forming a volatile write once memory). This would not provide nearly as much security as the WOM 400 described in FIG. 9, but since no encrypted programs are involved, automated cracking methods are limited to branches into and out of the IROM 206. The security on branches into and out of the IROM 206 is provided by the HSK instruction, and so replacing the WOM 400 may be acceptable.

If an architecture that is designed to push interrupt contexts on a data stack (e.g., 6800) were to be used in an implementation of the present invention, care must be taken to insure that all interrupt contexts are pushed and popped from the secure memory 278. Since many typical microprocessor architectures allow the stack pointer to address all of the memory space, including the external memory, an implementation of the present invention which uses such an architecture must check the value of the stack pointer when an interrupt occurs to insure that the interrupt context will be pushed into the secure memory 278. The interrupt is only acknowledged if the stack pointer addresses a location that will allow the entire interrupt context to be stored in the secure memory 278. At the time of the return from the interrupt, the stack pointer is also checked to insure that the entire interrupt context was recalled from the secure memory 278. Similarly, the call (branch to subroutine) and return (from subroutine) instructions will check the stack pointer to insure that return addresses are being pushed and popped only from the secure memory 278.

We claim:

1. A general purpose computer system for executing a plurality of encrypted software packages having provisions that inhibit unauthorized usage of encrypted software instructions comprising:

storage means for storing information;

processing means for executing re-encrypted software instructions from the current package using an execution key common to all re-encrypted software instructions, and for executing unencrypted software instructions;

said processing means including register/flag means for storing information being processed by said processing means under the control of said software instructions;

translation means, coupled to said processing means, operative for re-encrypting said plurality of encrypted software packages using said execution key to form a plurality of re-encrypted software packages;

said translation means including multiple translation prevention means for preventing said translation means from storing a second re-encrypted software package into locations of said storage means occupied by a first re-encrypted software package;

secure communication means, coupled to said processing means and said translation means, operative for buffering information between said processing means and said translation means, including information describing the region of said storage means occupied by said plurality of re-encrypted software packages;

said processing means including destruction means for destroying said execution key and the contents of said register/flag means upon receiving a destroy signal;

package description means for indicating the region of said storage means occupied by said current package;

violation recognition means, coupled to said destruction means, operative for generating said destroy signal if a re-encrypted software instruction came from a region of said storage means other than the region of said storage means indicated by said package description means; and branch allowing means, coupled to said violation recognition means and to said package description means, operative for preventing said violation recognition means from generating said destroy signal when a re-encrypted software instruction executing in said processing means is a handshake instruction originating from a region of said storage means other than the region of said storage means indicated by said package description means, and further for establishing the region of said storage means that contains said handshake instruction as the current package in said package description means, and additionally for erasing a portion of the information contained in said register/flag means.

2. The device of claim 1, wherein said multiple translation prevention means includes:

translation stop register means for holding the address of the highest location at which said translation means stored a re-encrypted software instruction of said first re-encrypted software package;

translation address register means, for holding the address of the location at which a re-encrypted software instruction from said second re-encrypted soft-ware package is to be stored by said translation means;

comparator means, coupled to said translation stop register means and to said translation address register means, operative for testing if the value in said translation address register means is less than the value in said translation stop register means; and storage prevention means, coupled to said comparator means, operative for preventing said translation means from storing a re-encrypted software instruction when said comparator means indicates that the value in said translation address register means is less than the value in said translation stop register means.

3. The device of claim 1, wherein said package description means comprises:

lower bounds memory means for storing a plurality of lowest addresses corresponding to each of said plurality of re-encrypted software packages residing in said storage means;

upper bounds memory means for storing a plurality of highest addresses corresponding to each of said plurality of re-encrypted software packages residing in said storage means;

lower transmitting means, coupled to said lower bound memory means, operative for transmitting from said lower bounds memory means the lowest address in the region of said storage means that contains said current package;

upper transmitting means, coupled to said upper bounds memory means, operative for transmitting from said upper bounds memory means the highest address in the region of said storage means that contains said current package; and reload prevention means, coupled to said lower bounds memory means and to said upper bounds memory means, operative for preventing said lower bounds memory means from being loaded more than once, and for additionally preventing said upper bounds memory means from being loaded more than once.

4. The device of claim 3, wherein said violation recognition means comprises:

bounds testing means, coupled to said lower transmitting means and to said upper transmitting means, operative for testing if the address of the re-encrypted software instruction currently being executed by said processing means is within the region defined by said lowest address from said lower transmitting means and said upper address from said upper transmitting means, thereby generating an in-bounds signal; and bounds destruction means, coupled to said destruction means and to said bounds testing means, operative for generating said destroy signal when said bounds testing means fails to produce an in-bounds signal during the execution of a re-encrypted software instruction by said processing means.

5. The device of claim 4, wherein said branch allowing means further comprises:

bounds re-establishing means, coupled to said lower bounds memory means, to said upper bounds memory means, to said lower transmitting means, and to said upper transmitting means, operative for replacing a first lower bound in said lower transmitting means with a second lower bound from said lower bounds memory means when said processing means changes control from a first package to a second package, and for additionally replacing a first upper bound in said upper transmitting means with a second upper bound from said upper bounds memory means when said processing means changes control from said first package to said second package;

control stack means for storing a plurality of return addresses in secret;

package calling means, coupled to said control stack means and to said bounds re-establishing means, operative for storing into said control stack means the address of the re-encrypted software instruction immeditely following a package call instruction, and for additionally causing said processing means to branch to the target address of the package call instruction;

call permitting means, coupled to said bounds destruction means and to said bounds re-establishing means, operative for preventing said bounds destruction means from generating a destroy signal when the current re-encrypted software instruction being executed by said processing means is a handshake instruction branched to by a package call instruction, and for additionally causing said bounds re-establishing means to replace the bounds in said package description means with the bounds of the region containing the handshake instruction that lies at the target address of said package call instruction; and package returning means, coupled to said control stack means and to said bounds re-establishing means, operative for recalling and removing the last return address from said control stack means, and for additionally causing said processing means to branch to the return address recalled from said control stack means, and for causing said bounds re-establishing means to replace the bounds in said package description means with the bounds of the region inside of which the return address lies.

6. The device of claim 5 wherein said upper bounds memory means and said lower bounds memory means consist of a combined bounds memory means whereby said plurality of re-encrypted software packages are required to be stored contiguously in said storage means, and whereby each value in said combined bounds memory means represents both the upper bound of one package and one less than the lower bound of the next package.

7. The device of claim 5 wherein said bounds re-establishing means consists of searching means operative for searching said upper bounds memory means and said lower bounds memory means, and for finding an upper bound and corresponding lower bound which define a region of said storage means inside of which the re-encrypted software instruction currently being executed by said processing means resides.

8. The device of claim 7, wherein said bounds testing means further comprises:
above bounds testing means for testing if the address of the re-encrypted software instruction currently being executed by said processing means is above the value in said upper transmitting means, thereby producing an above-bounds signal; and
below bounds testing means for testing if the address of the re-encrypted software instruction currently being executed by said processing means is below the value in said lower transmitting means, thereby producing a below-bounds signal.

9. The device of claim 8, wherein said searching means consists of a successive approximation register means, coupled to said bounds testing means, to said upper bounds memory means and to said lower bounds memory means, operative for searching said upper bounds memory means and said lower bounds memory means using a binary search technique, whereby said successive approximation register determines the order of the items to be search in accordance with said in-bounds signal, said above-bounds signal, and said below-bounds signal produced by said bounds testing means, and whereby the values in said upper bounds memory means and said lower bounds memory means are stored in sorted order.

10. The device of claim 1, further comprising:
switching means, coupled to said processing means, operative for switching to execution of unencrypted software instructions when said processing means executes a re-encrypted switch instruction, and additionally for switching to execution of re-encrypted software instructions when said processing means executes an unencrypted switch instruction; and
switch re-establishing means, coupled to said processing means and to said package description means, operative for establishing the region of said storage means that contains said unencrypted switch instruction as said current package, and additionally for clearing at least a portion of the information in said register/flag means when said processing means executes a switch instruction.

11. A method for executing a plurality of encrypted software packages on a processor having a program counter, registers/flags, a decryption unit, and a storage unit, comprising the steps of:
selecting an execution key;
initializing a bounds memory, capable of holding lower bounds and upper bounds, to an empty condition;
choosing a load address;
translating one of said encrypted software packages, to form a reencrypted software package, whereby said re-encrypted software package is composed of a plurality of re-encrypted software instructions that are decryptable using said execution key;
storing said re-encrypted software package in a region of said storage unit beginning at said load address;
terminating said storing step if any re-encrypted software instructions were previously stored in said region;
recording the highest address of said region;
inserting in said bounds memory said load address as the lower bound corresponding to said re-encrypted software package, and said highest address as the upper bound corresponding to said re-encrypted software package;
repeating said steps of choosing, translating, storing, terminating, recording, and inserting for each of said plurality of encrypted software packages, to form a plurality of re-encrypted software packages;
establishing a current lower bound and a current upper bound from said bounds memory;
decrypting the re-encrypted software instruction pointed to by said program counter, using said decryption unit with said execution key, to form an unencrypted software instruction;
executing said unencrypted software instruction, to to perform useful results, and to form a new value in said program counter;
destroying said execution key and said registers/flags if said unencrypted software instruction is not a handshake instruction, and said program counter is above said current upper bound or below said current lower bound;
searching said bounds memory for a zone of said storage unit that surrounds the location pointed to by said program counter, if said unencrypted software instruction is a handshake instruction and said program counter is above said current upper bound or below said current lower bound, to form new values for said current lower bound, and said current upper bound; and
repeating said steps of decrypting, executing, destroying, and searching.

12. The process of claim 11 further comprising the step of relocating said encrypted software package, to form a relocated re-encrypted software package.

* * * * *